US009706338B2

(12) United States Patent
Nakagawa et al.

(10) Patent No.: US 9,706,338 B2
(45) Date of Patent: Jul. 11, 2017

(54) INFORMATION PROCESSING DEVICE, COMMUNICATION SYSTEM, AND CHANNEL SETTING METHOD

(71) Applicant: Sony Corporation, Tokyo (JP)

(72) Inventors: Toshiyuki Nakagawa, Kanagawa (JP); Masayuki Ato, Tokyo (JP); Ikuo Matsumura, Tokyo (JP); Satoshi Nakano, Kanagawa (JP); Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 557 days.

(21) Appl. No.: 13/768,959

(22) Filed: Feb. 15, 2013

(65) Prior Publication Data
US 2013/0231050 A1 Sep. 5, 2013

(30) Foreign Application Priority Data

Mar. 1, 2012 (JP) ................................. 2012-044923
Jul. 10, 2012 (JP) ................................. 2012-154413
Oct. 16, 2012 (JP) ................................. 2012-228701

(51) Int. Cl.
*H04W 4/00* (2009.01)
(52) U.S. Cl.
CPC ................................. *H04W 4/008* (2013.01)
(58) Field of Classification Search
CPC ..... H04W 16/02; H04W 16/10; H04W 16/14; H04W 16/20
See application file for complete search history.

(56) References Cited

U.S. PATENT DOCUMENTS

| | | | |
|---|---|---|---|
| 5,038,399 A * | 8/1991 | Bruckert | 455/447 |
| 5,212,831 A * | 5/1993 | Chuang et al. | 455/450 |
| 5,355,520 A * | 10/1994 | Freeburg et al. | 455/507 |
| 6,219,553 B1 * | 4/2001 | Panasik | 455/446 |
| 6,275,506 B1 * | 8/2001 | Fazel et al. | 370/478 |
| 6,405,018 B1 * | 6/2002 | Reudink et al. | 455/20 |
| 6,871,081 B1 * | 3/2005 | Llewellyn et al. | 455/561 |
| 6,885,846 B1 * | 4/2005 | Panasik et al. | 455/41.2 |
| 7,055,107 B1 * | 5/2006 | Rappaport et al. | 715/848 |
| 7,650,150 B1 * | 1/2010 | Gerakoulis et al. | 455/450 |
| 7,689,228 B2 * | 3/2010 | Labedz | 455/452.1 |
| 7,715,846 B2 * | 5/2010 | Ji et al. | 455/447 |
| 8,135,098 B2 * | 3/2012 | Lee et al. | 375/346 |
| 8,265,638 B2 * | 9/2012 | Rosmann et al. | 455/447 |

(Continued)

FOREIGN PATENT DOCUMENTS

| | | |
|---|---|---|
| CN | 1383624 A | 12/2002 |
| CN | 1697772 A | 11/2005 |

(Continued)

*Primary Examiner* — Lewis West
(74) *Attorney, Agent, or Firm* — Wolf, Greenfield & Sacks, P.C.

(57) ABSTRACT

There is provided an information processing device including a determination unit that, when in each of a plurality of spaces short-range wireless communication is simultaneously performed in each space using a plurality of wireless communication devices, determines a channel to be used in each space for each space based on a predetermined rule, and a control unit that performs control of setting the channel determined in accordance with the space in which the wireless communication device is used in the wireless communication device.

20 Claims, 46 Drawing Sheets

(56) References Cited

U.S. PATENT DOCUMENTS

| | | | |
|---|---|---|---|
| 8,767,580 B2* | 7/2014 | Sundaresan et al. | 370/252 |
| 8,811,891 B2* | 8/2014 | Hwang et al. | 455/41.1 |
| 2001/0049281 A1* | 12/2001 | Duplessis et al. | 455/422 |
| 2003/0153335 A1* | 8/2003 | Johnson et al. | 455/502 |
| 2004/0157613 A1* | 8/2004 | Steer et al. | 455/446 |
| 2004/0213294 A1* | 10/2004 | Hughes | 370/485 |
| 2005/0113112 A1* | 5/2005 | Bolin et al. | 455/456.1 |
| 2007/0202867 A1* | 8/2007 | Waltho et al. | 455/423 |
| 2010/0014496 A1* | 1/2010 | Kalika et al. | 370/338 |
| 2010/0246544 A1* | 9/2010 | Brisebois et al. | 370/338 |
| 2011/0111764 A1* | 5/2011 | Mueck et al. | 455/452.1 |

FOREIGN PATENT DOCUMENTS

| | | |
|---|---|---|
| CN | 102056244 A | 5/2011 |
| CN | 102318277 A | 1/2012 |
| JP | 2000-270362 A | 9/2000 |
| JP | 2004-080130 A | 3/2004 |
| JP | 2006-148258 A | 6/2006 |
| JP | 2007-501566 A | 1/2007 |
| JP | 2008-278388 A | 11/2008 |
| WO | WO 2011/155191 A1 | 12/2011 |

* cited by examiner

FIG. 3
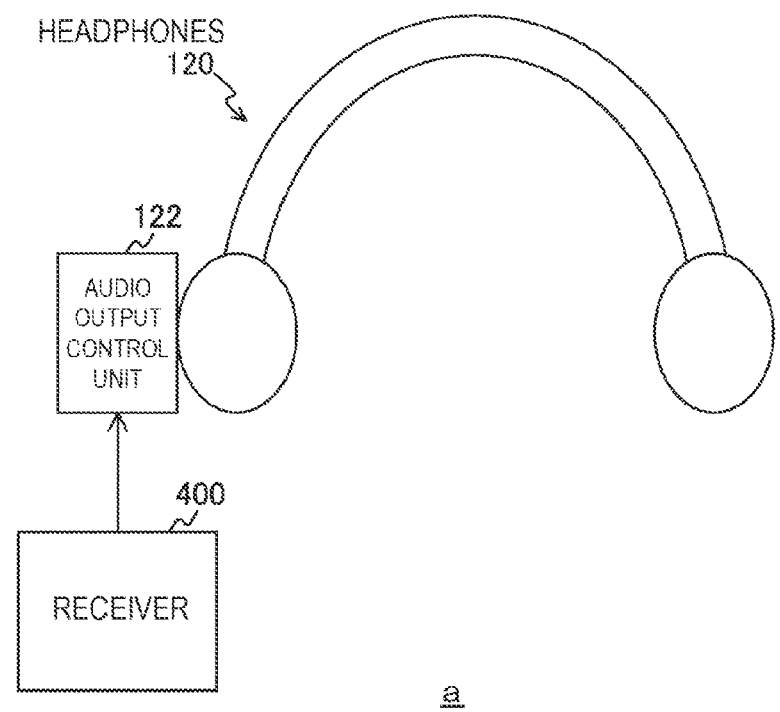
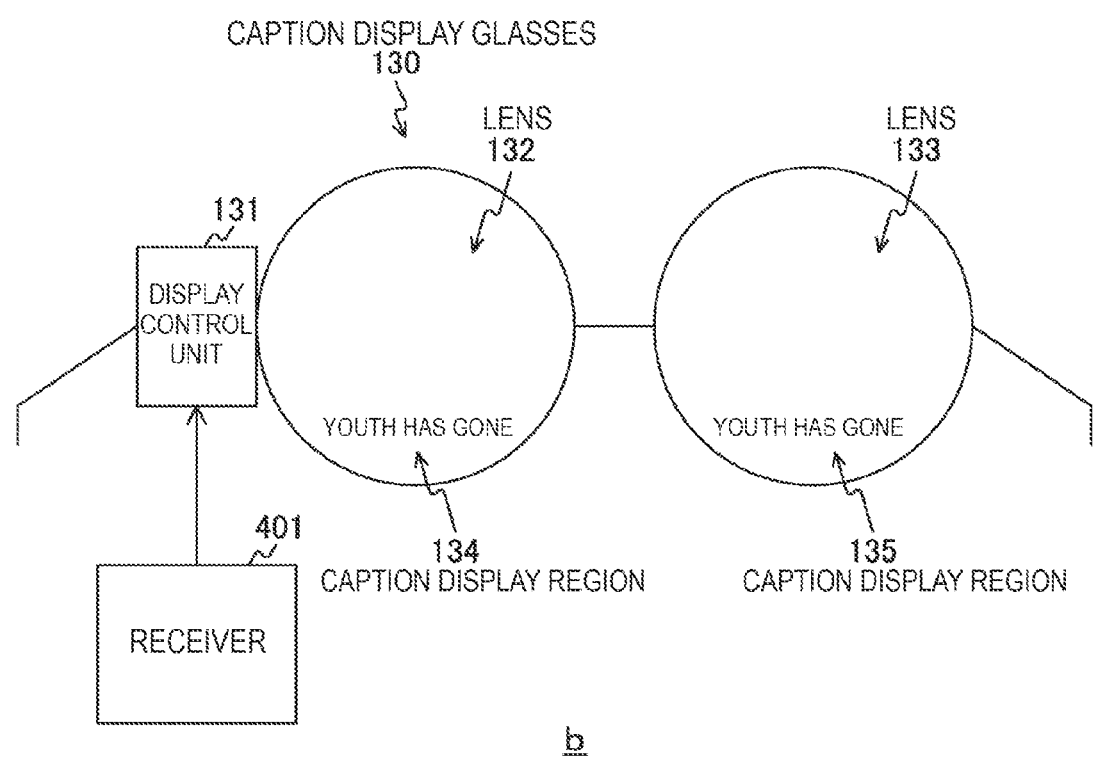

FIG. 9

| RATE | A | A | A | A | A | A | A | A | B | B | B | B | B | B | B | B |
|---|---|---|---|---|---|---|---|---|---|---|---|---|---|---|---|---|
| ID | 0x0011 | 0x0013 | 0x0015 | 0x0017 | 0x0019 | 0x0021 | 0x0023 | 0x0025 | 0x0111 | 0x0113 | 0x0115 | 0x0117 | 0x0119 | 0x0121 | 0x0123 | 0x0125 |
| SET CH | A1 | A3 | A5 | A7 | A9 | A11 | A13 | A15 | B1 | B3 | B5 | B7 | B9 | B11 | B13 | B15 |
| ZigBee CORRES- PONDENT CH | 11 | 13 | 15 | 17 | 19 | 21 | 23 | 25 | 11 | 13 | 15 | 17 | 19 | 21 | 23 | 25 |
| ID | 0x0012 | 0x0014 | 0x0016 | 0x0018 | 0x0020 | 0x0022 | 0x0024 | 0x0026 | 0x0112 | 0x0114 | 0x0116 | 0x0118 | 0x0120 | 0x0122 | 0x0124 | 0x0126 |
| SET CH | A2 | A4 | A6 | A8 | A10 | A12 | A14 | A16 | B2 | B4 | B6 | B8 | B10 | B12 | B14 | B16 |
| ZigBee CORRES- PONDENT CH | 12 | 14 | 16 | 18 | 20 | 22 | 24 | 26 | 12 | 14 | 16 | 18 | 20 | 22 | 24 | 26 |

FIG. 11
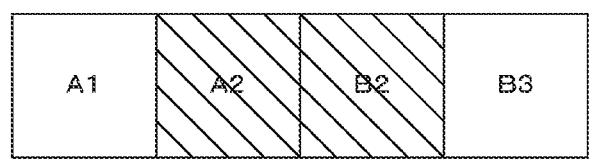
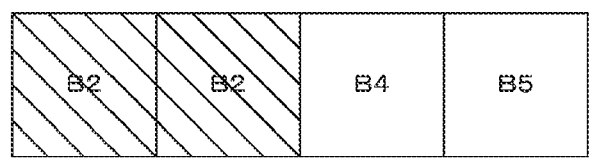
a
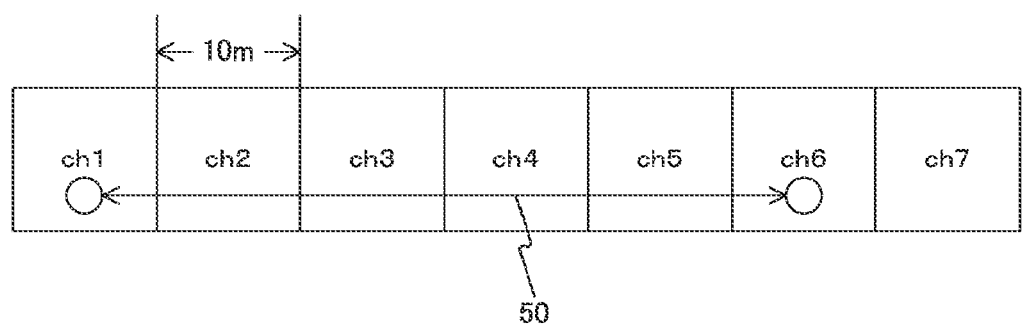
b

FIG. 18

| | RATE | A | A | A | A | A | A | A | B | B | B | B | B | B | B |
|---|---|---|---|---|---|---|---|---|---|---|---|---|---|---|---|
| | SET CH | A1 | A2 | A3 | A4 | A5 | A6 | A7 | B1 | B2 | B3 | B4 | B5 | B6 | B7 |
| CAPTION DATA | ID | 0x0 011 | 0x0 013 | 0x0 015 | 0x0 017 | 0x0 019 | 0x0 021 | 0x0 023 | 0x0 111 | 0x0 113 | 0x0 115 | 0x0 117 | 0x0 119 | 0x0 121 | 0x0 123 |
| | ZigBee CORRES- PONDENT CH | 18 | 20 | 22 | 24 | 12 | 14 | 16 | 18 | 20 | 22 | 24 | 12 | 14 | 16 |
| AUDIO DATA | ID | 0x0 012 | 0x0 014 | 0x0 016 | 0x0 018 | 0x0 020 | 0x0 022 | 0x0 024 | 0x0 112 | 0x0 114 | 0x0 116 | 0x0 118 | 0x0 120 | 0x0 122 | 0x0 124 |
| | ZigBee CORRES- PONDENT CH | 13 | 15 | 17 | 19 | 21 | 23 | 25 | 13 | 15 | 17 | 19 | 21 | 23 | 25 |

FIG. 19

| | SET CH | A1 | A2 | A3 | A4 | A5 | A6 | A7 | A8 | A9 | A10 | A11 | A12 | A13 | A14 | A15 |
|---|---|---|---|---|---|---|---|---|---|---|---|---|---|---|---|---|
| CAPTION DATA | ID | 0x0 011 | 0x0 012 | 0x0 013 | 0x0 014 | 0x0 015 | 0x0 016 | 0x0 017 | 0x0 018 | 0x0 019 | 0x0 01A | 0x0 01B | 0x0 01C | 0x0 01D | 0x0 01E | 0x0 01F |
| | ZigBee CORRES- PONDENT CH | 11 | 12 | 13 | 14 | 15 | 16 | 17 | 18 | 19 | 20 | 21 | 22 | 23 | 24 | 25 |
| AUDIO DATA | ID | 0x0 111 | 0x0 112 | 0x0 113 | 0x0 114 | 0x0 115 | 0x0 116 | 0x0 117 | 0x0 118 | 0x0 119 | 0x0 11A | 0x0 11B | 0x0 11C | 0x0 11D | 0x0 11E | 0x0 11F |
| | ZigBee CORRES- PONDENT CH | 11 | 12 | 13 | 14 | 15 | 16 | 17 | 18 | 19 | 20 | 21 | 22 | 23 | 24 | 25 |

FIG. 20

| | RATE | A | A | A | A | A | A | A | B | B | B | B | B | B | B |
|---|---|---|---|---|---|---|---|---|---|---|---|---|---|---|---|
| | SET CH | A1 | A2 | A3 | A4 | A5 | A6 | A7 | B1 | B2 | B3 | B4 | B5 | B6 | B7 |
| CAPTION DATA | ID | 0x0011 | 0x0013 | 0x0015 | 0x0017 | 0x0019 | 0x0021 | 0x0023 | 0x0111 | 0x0113 | 0x0115 | 0x0117 | 0x0119 | 0x0121 | 0x0123 |
| CAPTION DATA | ZigBee CORRES-PONDENT CH | 12 | 14 | 16 | 18 | 20 | 22 | 24 | 12 | 14 | 16 | 18 | 20 | 22 | 24 |
| AUDIO DATA | ID | 0x0012 | 0x0014 | 0x0016 | 0x0018 | 0x0020 | 0x0022 | 0x0024 | 0x0112 | 0x0114 | 0x0116 | 0x0118 | 0x0120 | 0x0122 | 0x0124 |
| AUDIO DATA | ZigBee CORRES-PONDENT CH | 11 | 13 | 15 | 17 | 19 | 21 | 23 | 11 | 13 | 15 | 17 | 19 | 21 | 23 |

FIG. 21

| | RATE | A | A | A | A | A | A | A | B | B | B | B | B | B | B |
|---|---|---|---|---|---|---|---|---|---|---|---|---|---|---|---|
| | SET CH | A1 | A2 | A3 | A4 | A5 | A6 | A7 | B1 | B2 | B3 | B4 | B5 | B6 | B7 |
| CAPTION DATA | ID | 0x0011 | 0x0013 | 0x0015 | 0x0017 | 0x0019 | 0x0021 | 0x0023 | 0x0111 | 0x0113 | 0x0115 | 0x0117 | 0x0119 | 0x0121 | 0x0123 |
| | ZigBee CORRES-PONDENT CH | 18 | 20 | 22 | 24 | 12 | 14 | 16 | 18 | 20 | 22 | 24 | 12 | 14 | 16 |
| AUDIO DATA | ID | 0x0012 | 0x0014 | 0x0016 | 0x0018 | 0x0020 | 0x0022 | 0x0024 | 0x0112 | 0x0114 | 0x0116 | 0x0118 | 0x0120 | 0x0122 | 0x0124 |
| | ZigBee CORRES-PONDENT CH | 13 | 15 | 17 | 19 | 21 | 23 | 25 | 13 | 15 | 17 | 19 | 21 | 23 | 25 |

FIG. 22

| | RATE | B | B | B | B | B | B | B | B | B | B | B | B | B | B |
|---|---|---|---|---|---|---|---|---|---|---|---|---|---|---|---|
| | SET CH | B1 | B2 | B3 | B4 | B5 | B6 | B7 | B8 | B9 | B10 | B11 | B12 | B13 | B14 |
| CAPTION DATA | ID | 0x0011 | 0x0013 | 0x0015 | 0x0017 | 0x0019 | 0x0021 | 0x0023 | 0x0111 | 0x0113 | 0x0115 | 0x0117 | 0x0119 | 0x0121 | 0x0123 |
| CAPTION DATA | ZigBee CORRES-PONDENT CH | 25 | 25 | 25 | 25 | 25 | 25 | 25 | 26 | 26 | 26 | 26 | 26 | 26 | 26 |
| AUDIO DATA | ID | 0x0012 | 0x0014 | 0x0016 | 0x0018 | 0x0020 | 0x0022 | 0x0024 | 0x0112 | 0x0114 | 0x0116 | 0x0118 | 0x0120 | 0x0122 | 0x0124 |
| AUDIO DATA | ZigBee CORRES-PONDENT CH | 11 | 12 | 13 | 14 | 15 | 16 | 17 | 18 | 19 | 20 | 21 | 22 | 23 | 24 |

FIG. 23

| | RATE | A&B | A&B | A&B | A&B | A&B | A&B | A&B | A&B | A&B | A&B | A&B | A&B | A&B | A&B |
|---|---|---|---|---|---|---|---|---|---|---|---|---|---|---|---|
| | SET CH | AB1 | AB2 | AB3 | AB4 | AB5 | AB6 | AB7 | AB8 | AB9 | AB10 | AB11 | AB12 | AB13 | AB14 |
| CAPTION DATA | ID | 0x0011 | 0x0013 | 0x0015 | 0x0017 | 0x0019 | 0x0021 | 0x0023 | 0x0111 | 0x0113 | 0x0115 | 0x0117 | 0x0119 | 0x0121 | 0x0123 |
| CAPTION DATA | ZigBee CORRES-PONDENT CH | 11 | 13 | 15 | 17 | 19 | 21 | 23 | 12 | 14 | 16 | 18 | 20 | 22 | 24 |
| AUDIO DATA | ID | 0x0012 | 0x0014 | 0x0016 | 0x0018 | 0x0020 | 0x0022 | 0x0024 | 0x0112 | 0x0114 | 0x0116 | 0x0118 | 0x0120 | 0x0122 | 0x0124 |
| AUDIO DATA | ZigBee CORRES-PONDENT CH | 11 | 13 | 15 | 17 | 19 | 21 | 23 | 12 | 14 | 16 | 18 | 20 | 22 | 24 |

FIG. 24

TRANSMITTER

| | RATE | A | A | A | A | A | A | A | B | B | B | B | B | B | B |
|---|---|---|---|---|---|---|---|---|---|---|---|---|---|---|---|
| | SET CH | A1 | A2 | A3 | A4 | A5 | A6 | A7 | B1 | B2 | B3 | B4 | B5 | B6 | B7 |
| CAPTION DATA | ID | 0x0011 | 0x0013 | 0x0015 | 0x0017 | 0x0019 | 0x0021 | 0x0023 | 0x0111 | 0x0113 | 0x0115 | 0x0117 | 0x0119 | 0x0121 | 0x0123 |
| CAPTION DATA | ZigBee CORRESPONDENT CH | 18 | 20 | 22 | 24 | 12 | 14 | 16 | 18 | 20 | 22 | 24 | 12 | 14 | 16 |
| AUDIO DATA | ID | 0x0012 | 0x0014 | 0x0016 | 0x0018 | 0x0020 | 0x0022 | 0x0024 | 0x0112 | 0x0114 | 0x0116 | 0x0118 | 0x0120 | 0x0122 | 0x0124 |
| AUDIO DATA | ZigBee CORRESPONDENT CH | 13 | 15 | 17 | 19 | 21 | 23 | 25 | 13 | 15 | 17 | 19 | 21 | 23 | 25 | a

RECEIVER

| | RATE | A | A | A | A | A | A | A | B | B | B | B | B | B | B |
|---|---|---|---|---|---|---|---|---|---|---|---|---|---|---|---|
| | SET CH | A1 | A2 | A3 | A4 | A5 | A6 | A7 | B1 | B2 | B3 | B4 | B5 | B6 | B7 |
| CAPTION DATA | ID | 0x0011 | 0x0013 | 0x0015 | 0x0017 | 0x0019 | 0x0021 | 0x0023 | 0x0111 | 0x0113 | 0x0115 | 0x0117 | 0x0119 | 0x0121 | 0x0123 |
| CAPTION DATA | ZigBee CORRESPONDENT CH | 18 | 20 | 22 | 24 | 12 | 14 | 16 | 18 | 20 | 22 | 24 | 12 | 14 | 16 |
| AUDIO DATA | ID | 0x0012 | 0x0014 | 0x0016 | 0x0018 | 0x0020 | 0x0022 | 0x0024 | 0x0112 | 0x0114 | 0x0116 | 0x0118 | 0x0120 | 0x0122 | 0x0124 |
| AUDIO DATA | ZigBee CORRESPONDENT CH | 13 | 15 | 17 | 19 | 21 | 23 | 25 | 13 | 15 | 17 | 19 | 21 | 23 | 25 | b

FIG. 25

| | RATE | A | A | A | A | A | A | A | B | B | B | B | B | B | B |
|---|---|---|---|---|---|---|---|---|---|---|---|---|---|---|---|
| | SET CH | A1 | A2 | A3 | A4 | A5 | A6 | A7 | B1 | B2 | B3 | B4 | B5 | B6 | B7 |
| CAPTION DATA | ID | 0x0011 | 0x0013 | 0x0015 | 0x0017 | 0x0019 | 0x0021 | 0x0023 | 0x0111 | 0x0113 | 0x0115 | 0x0117 | 0x0119 | 0x0121 | 0x0123 |
| CAPTION DATA | ZigBee CORRES-PONDENT CH | 18 | 20 | 22 | 24 | 12 | 14 | 16 | 18 | 20 | 22 | 24 | 12 | 14 | 16 |
| AUDIO DATA | ID | 0x0012 | 0x0014 | 0x0016 | 0x0018 | 0x0020 | 0x0022 | 0x0024 | 0x0112 | 0x0114 | 0x0116 | 0x0118 | 0x0120 | 0x0122 | 0x0124 |
| AUDIO DATA | ZigBee CORRES-PONDENT CH | 11 | 13 | 15 | 17 | 19 | 23 | 25 | 11 | 13 | 15 | 17 | 19 | 23 | 25 |

FIG. 27

| RATE | | A | A | A | A | A | A | A | B | B | B | B | B | B | B |
|---|---|---|---|---|---|---|---|---|---|---|---|---|---|---|---|
| SET CH | | A1 | A2 | A3 | A4 | A5 | A6 | A7 | B1 | B2 | B3 | B4 | B5 | B6 | B7 |
| CAPTION DATA | ID | 0x0 011 | 0x0 013 | 0x0 015 | 0x0 017 | 0x0 019 | 0x0 021 | 0x0 023 | 0x0 111 | 0x0 113 | 0x0 115 | 0x0 117 | 0x0 119 | 0x0 121 | 0x0 123 |
| | ZigBee CORRES- PONDENT CH | 18 | 20 | 22 | 24 | 12 | 14 | 16 | 18 | 20 | 22 | 24 | 12 | 14 | 16 |
| AUDIO DATA | ID | 0x0 012 | 0x0 014 | 0x0 016 | 0x0 018 | 0x0 020 | 0x0 022 | 0x0 024 | 0x0 112 | 0x0 114 | 0x0 116 | 0x0 118 | 0x0 120 | 0x0 122 | 0x0 124 |
| | ZigBee CORRES- PONDENT CH | 11 | 13 | 15 | 17 | 19 | 21 | 25 | 11 | 13 | 15 | 17 | 19 | 21 | 25 | a b

FIG. 30

| | RATE | A | A | A | A | A | A | A | B | B | B | B | B | B | B |
|---|---|---|---|---|---|---|---|---|---|---|---|---|---|---|---|
| | SET CH | A1 | A2 | A3 | A4 | A5 | A6 | A7 | B1 | B2 | B3 | B4 | B5 | B6 | B7 |
| CAPTION DATA | ID | 0x0011 | 0x0013 | 0x0015 | 0x0017 | 0x0019 | 0x0021 | 0x0023 | 0x0111 | 0x0113 | 0x0115 | 0x0117 | 0x0119 | 0x0121 | 0x0123 |
| | ZigBee CORRES- PONDENT CH | 18 | 20 | 22 | 24 | 12 | 14 | 16 | 18 | 20 | 22 | 24 | 12 | 14 | 16 |
| AUDIO DATA | ID | 0x0012 | 0x0014 | 0x0016 | 0x0018 | 0x0020 | 0x0022 | 0x0024 | 0x0112 | 0x0114 | 0x0116 | 0x0118 | 0x0120 | 0x0122 | 0x0124 |
| | ZigBee CORRES- PONDENT CH | 11 | 15 | 17 | 19 | 21 | 23 | 25 | 11 | 15 | 17 | 19 | 21 | 23 | 25 |

FIG. 34

| | RATE | A | A | A | A | A | B | B | B | B | B | C | C | C | C |
|---|---|---|---|---|---|---|---|---|---|---|---|---|---|---|---|
| | SET CH | A1 | A2 | A3 | A4 | A5 | B1 | B2 | B3 | B4 | B5 | C1 | C2 | C3 | C4 |
| CAPTION DATA | ID | 0x0011 | 0x0013 | 0x0015 | 0x0017 | 0x0019 | 0x0111 | 0x0113 | 0x0115 | 0x0117 | 0x0119 | 0x0211 | 0x0213 | 0x0215 | 0x0217 |
| | ZigBee CORRES-PONDENT CH | 18 | 20 | 22 | 24 | 16 | 18 | 20 | 22 | 24 | 16 | 18 | 20 | 22 | 24 |
| AUDIO DATA | ID | 0x0012 | 0x0014 | 0x0016 | 0x0018 | 0x0020 | 0x0112 | 0x0114 | 0x0116 | 0x0118 | 0x0120 | 0x0212 | 0x0214 | 0x0216 | 0x0218 |
| | ZigBee CORRES-PONDENT CH | 11 | 13 | 15 | 17 | 25 | 11 | 13 | 15 | 17 | 25 | 11 | 13 | 15 | 17 |

FIG. 35
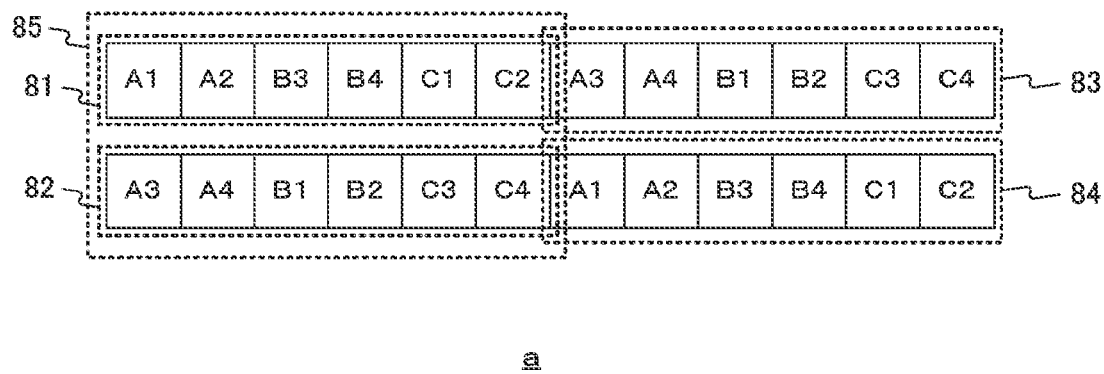
a
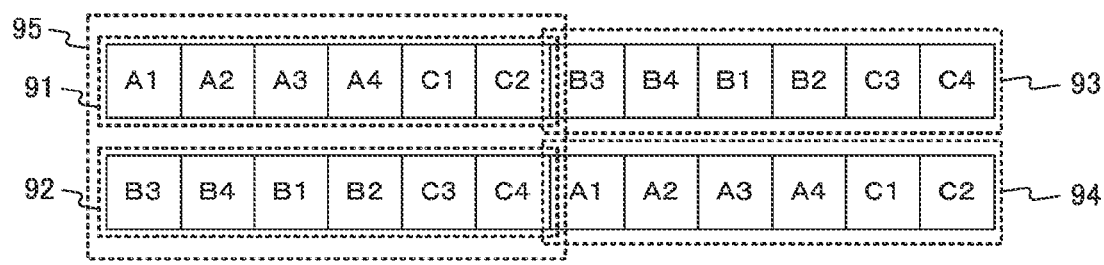
b

FIG. 36

| | RATE | A | A | A | A | A | B | B | B | B | B | C | C | C | C |
|---|---|---|---|---|---|---|---|---|---|---|---|---|---|---|---|
| | SET CH | A1 | A2 | A3 | A4 | A5 | B1 | B2 | B3 | B4 | B5 | C1 | C2 | C3 | C4 |
| CAPTION DATA | ID | 0x0 011 | 0x0 013 | 0x0 015 | 0x0 017 | 0x0 019 | 0x0 111 | 0x0 113 | 0x0 115 | 0x0 117 | 0x0 119 | 0x0 211 | 0x0 213 | 0x0 215 | 0x0 217 |
| | ZigBee CORRES- PONDENT CH | 20 | 22 | 24 | 16 | 18 | 20 | 22 | 24 | 16 | 18 | 20 | 22 | 24 | 26 |
| AUDIO DATA | ID | 0x0 012 | 0x0 014 | 0x0 016 | 0x0 018 | 0x0 020 | 0x0 112 | 0x0 114 | 0x0 116 | 0x0 118 | 0x0 120 | 0x0 212 | 0x0 214 | 0x0 216 | 0x0 218 |
| | ZigBee CORRES- PONDENT CH | 15 | 17 | 19 | 21 | 25 | 15 | 17 | 19 | 21 | 25 | 15 | 17 | 19 | 21 |

FIG. 38
FIRST STORY
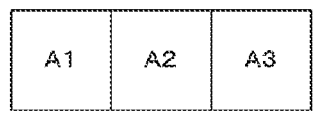
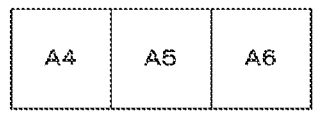
a
SECOND STORY
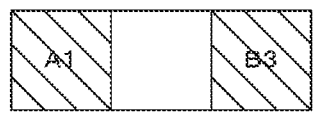
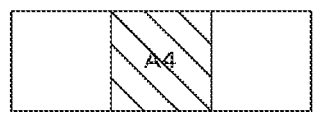
b
THIRD STORY
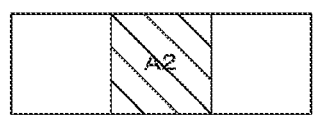
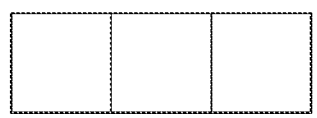
c
FOURTH STORY
d

ASSIGNMENT EXAMPLE OF ONE FLOOR

FIG. 40

ASSIGNMENT EXAMPLE OF FIRST STORY

| A1 | A3 | A5 | A7 |
|----|----|----|----|

| B7 | B2 | B4 | B1 |
|----|----|----|----| a

ASSIGNMENT EXAMPLE OF SECOND STORY

| A2 | A4 | B7 | B2 |
|----|----|----|----|

| B3 | B5 | A1 | A3 |
|----|----|----|----| b

ASSIGNMENT EXAMPLE OF THIRD STORY

| B4 | B1 | B3 | B5 |
|----|----|----|----|

| A5 | A7 | A2 | A4 |
|----|----|----|----| c

ASSIGNMENT EXAMPLE OF FOURTH STORY

| A1 | A3 | A5 | A7 |
|----|----|----|----|

| B7 | B2 | B4 | B1 |
|----|----|----|----| d

FIG. 41

ASSIGNMENT EXAMPLE OF FIRST STORY

| A1 | A3 | A5 | |

| B7 | B2 | | | a

ASSIGNMENT EXAMPLE OF SECOND STORY

| A2 | A4 | B7 | |

| B3 | B5 | | | b

ASSIGNMENT EXAMPLE OF THIRD STORY

| B4 | B1 | B3 | |

| A5 | A7 | | | c

ASSIGNMENT EXAMPLE OF FOURTH STORY

| | | | |

| | | | | d

FIG. 42
ASSIGNMENT EXAMPLE OF FIRST STORY
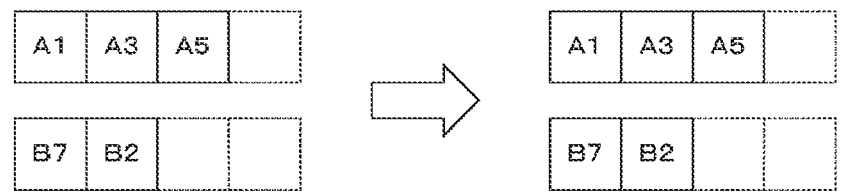
a
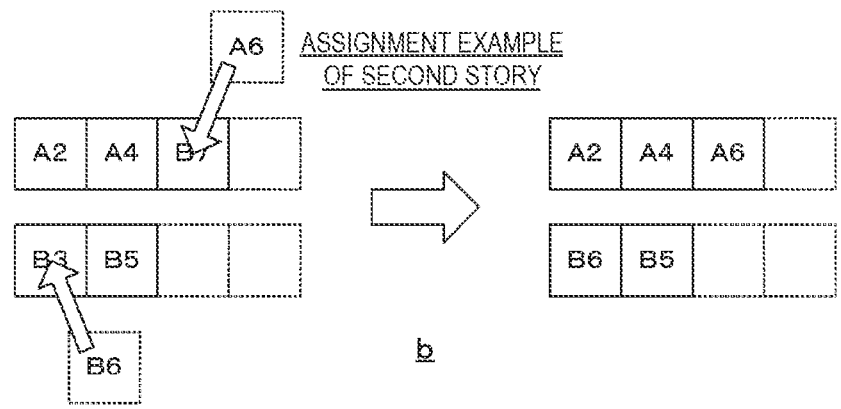
b
ASSIGNMENT EXAMPLE OF THIRD STORY
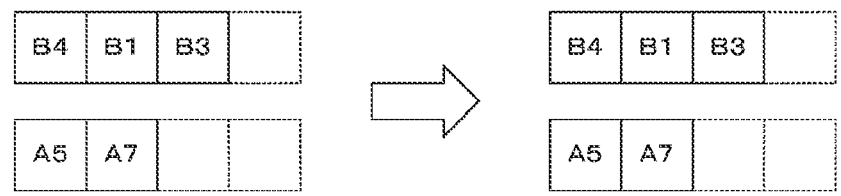
c
ASSIGNMENT EXAMPLE OF FOURTH STORY
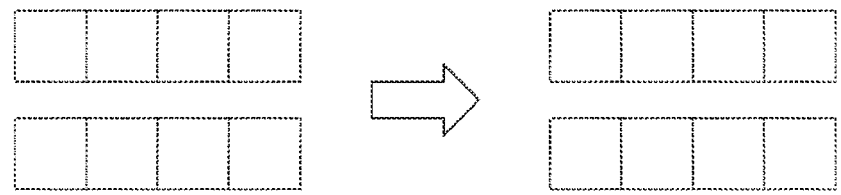
d

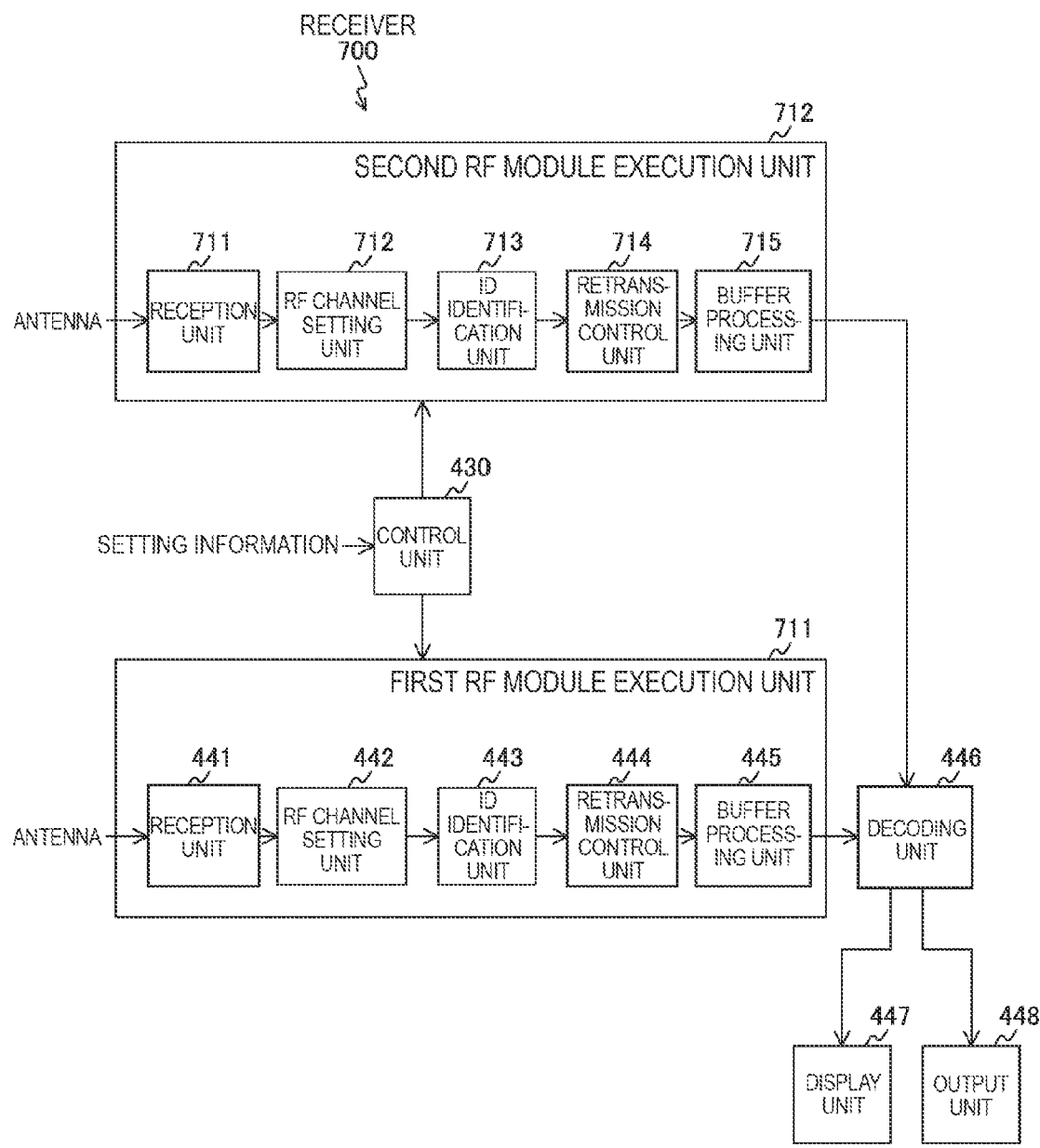

INFORMATION PROCESSING DEVICE, COMMUNICATION SYSTEM, AND CHANNEL SETTING METHOD

BACKGROUND

The present technology relates to an information processing device, and more particularly, to an information processing device setting channels to be used in a plurality of spaces, a communication system including the information processing device, and a channel setting method.

In the past, there were wireless communication technologies for exchanging various kinds of data through wireless communication. For example, information exchange devices exchanging various kinds of data through short-range wireless communication between two wireless communication devices have been suggested (for example, see Japanese Unexamined Patent Application Publication No. 2008-278388).

SUMMARY

According to the above-described technologies of the related art, various kinds of data can be exchanged between two wireless communication devices through short-range wireless communication, even when the two wireless communication devices are not connected to each other via a wired line.

Here, for example, short-range wireless communication is assumed to be performed within a plurality of spaces partitioned by walls. In this case, when the same data is exchanged in all of the spaces, the short-range wireless communication can be performed using the same channel.

However, for example, when different data is exchanged in each space among a plurality of spaces installed in the same facility, it can thus be also assumed that an interference wave or the like is received from other spaces and appropriate data is not exchanged.

It is desirable to provide a technology for appropriately setting channels to be used when short-range wireless communication is simultaneously performed in a plurality of spaces.

Thus, it is possible to achieve an effect of determining the channel to be used in each space for each space based on the predetermined rule and setting the determined channel in the wireless communication device in accordance with the space in which the wireless communication device is used.

Thus, it is possible to achieve an effect of determining the channels to be used in the plurality of spaces for the respective spaces and setting the plurality of communication rates for each channel when the number of the plurality of spaces is greater than the number of channels of the wireless communication devices.

Thus, it is possible to achieve an effect of determining the channels such that the spaces (first and second spaces) in which the first channels are used are the predetermined distance away from each other when the same channel (first channel) is used in the plurality of spaces.

Thus, it is possible to achieve an effect of determining the channels (candidate channels) which rarely receive an influence of the predetermined interfering wave in the first spaces based on the predetermined rule and determining the candidate channels as channels to be newly used for all of the spaces in which the channels (the first channels) determined for the first space are determined.

Thus, it is possible to achieve an effect of setting the candidate channel as a channel which is determined as the channel to be used in one of the plurality of spaces or a channel which is unused in any of the plurality of spaces.

Thus, it is possible to achieve an effect of setting the candidate channel as a channel which does not receive an influence of an interfering wave caused due to a specific wireless LAN.

Thus, it is possible to achieve an effect of transmitting at least one of the audio data and the predetermined data to the receiver.

Thus, it is possible to achieve an effect of sequentially transmitting the audio data and the predetermined data along one communication path.

Thus, it is possible to achieve an effect of transmitting the audio data and the predetermined data at different frequencies along the plurality of communication paths and determining the plurality of channels for one space as the channels to be used in each of the spaces.

Thus, it is possible to achieve an effect of transmitting the audio data and the predetermined data at the different communication rates along the plurality of communication paths and determining the channel to be used in each of the spaces and the plurality of communication rates for one space as the communication rates.

Thus, it is possible to achieve an effect of not performing the retransmission process on the audio data and performing the retransmission process only on the predetermined data.

Thus, it is possible to achieve an effect of identifying the predetermined data using the identification information granted to each of the predetermined data.

Thus, it is possible to achieve an effect of using the frequency of the 2.4 GHz band.

Thus, it is possible to achieve an effect of using the wireless scheme complying with IEEE 802.15.4.

Thus, it is possible to achieve an effect of setting the channels in the plurality of spaces in which the partition is present between the adjacent spaces.

Thus, it is possible to achieve an effect of determining the channel to be used in the space for each space based on the predetermined rule and setting the determined channel in the wireless communication device in accordance with the space in which the corresponding wireless communication device is used.

According to a third embodiment of the present technology, there is provided a communication system including a receiver that is used in each of a plurality of spaces among which a partition is present between the adjacent spaces; and a transmitter that is installed in each of the spaces and simultaneously performs short-range wireless communication with the plurality of receivers installed in the same space. When the number of channels relevant to the short-range wireless communication and necessary based on the number of the plurality of spaces is greater than the settable number of channels relevant to the short-range wireless communication, channels with the same frequency are set in the transmitters installed in at least two spaces among the plurality of spaces based on a predetermined rule. There are provided a method of setting the channels and a program causing a computer to execute the method. Thus, it is possible to achieve an effect of setting the channels with the same frequency in the transmitters installed in at least two spaces among the plurality of spaces based on the predetermined rule, when the number of channels relevant to the short-range wireless communication and necessary based on the number of the plurality of spaces is greater than the settable number of channels relevant to the short-range wireless communication.

In the third embodiment of the present technology, the channels with the same frequency may be channels which have the same communication rate and are identifiable simultaneously in the receivers. Thus, it is possible to achieve an effect of setting the channels which have the same communication rate and are identifiable simultaneously in the receivers as the channels with the same frequency.

In the third embodiment of the present technology, the channels with the same frequency may include plural kinds of channels which have different communication rates and the plural kinds of channels may not be mutually detectable in the receivers. Thus, it is possible to achieve an effect of setting the channels which are the plural kinds of channels which have different communication rates and are not mutually detectable by the receivers as the channels with the same frequency.

According to the embodiments of the present technology, it is possible to obtain the advantage of appropriately setting channels to be used, when short-range wireless communication is simultaneously performed in a plurality of spaces.

BRIEF DESCRIPTION OF THE DRAWINGS

FIGS. 3a and 3b are diagrams schematically illustrating the outer appearances of headphones and caption display glasses connected to receivers according to the first embodiment of the present technology;

FIG. 9 is a diagram illustrating an example of channels set in the communication system according to the first embodiment of the present technology;

FIGS. 11a and 11b are diagrams illustrating assignment examples of the channels in the communication system according to the first embodiment of the present technology;

FIG. 18 is a diagram illustrating an example of channels set in a communication system according to a second embodiment of the present technology;

FIG. 19 is a diagram illustrating an example of channels not used in the communication system according to the second embodiment of the present technology;

FIG. 20 is a diagram illustrating an example of channels set in the communication system according to the second embodiment of the present technology;

FIG. 21 is a diagram illustrating an example of channels set in the communication system according to the second embodiment of the present technology;

FIG. 22 is a diagram illustrating an example of channels set in the communication system according to the second embodiment of the present technology;

FIG. 23 is a diagram illustrating an example of channels set in the communication system according to the second embodiment of the present technology;

FIGS. 24a and 24b are diagrams illustrating examples of channel setting of a transmitter and a receiver according to the second embodiment of the present technology;

FIG. 25 is a diagram illustrating an example of channels set in a communication system according to a third embodiment of the present technology;

FIG. 27 is a diagram illustrating an example of channels set in the communication system according to the third embodiment of the present technology;

FIG. 30 is a diagram illustrating an example of channels set in the communication system according to the third embodiment of the present technology;

FIG. 34 is a diagram illustrating an example of channels set in a communication system according to a fourth embodiment of the present technology;

FIGS. 35a and 35b are diagrams illustrating assignment examples of the channels in the communication system according to the fourth embodiment of the present technology;

FIG. 36 is a diagram illustrating an example of channels set in the communication system according to the fourth embodiment of the present technology;

FIGS. 38a to 38d are diagrams illustrating assignment examples of channels in the communication system according to the fifth embodiment of the present technology;

FIGS. 40a to 40d are diagrams illustrating assignment examples of channels in the communication system according to the fifth embodiment of the present technology;

FIGS. 41a to 41d are diagrams illustrating assignment examples of channels in the communication system according to the fifth embodiment of the present technology;

FIGS. 42a to 42d are diagrams illustrating the flow of a method of avoiding crosstalk or interference by the determination unit according to the fifth embodiment of the present technology;

FIG. 46 is a block diagram illustrating an example of a functional configuration of the receiver according to a modification example of the embodiment of the present technology.

DETAILED DESCRIPTION OF THE EMBODIMENTS

Figure 1:
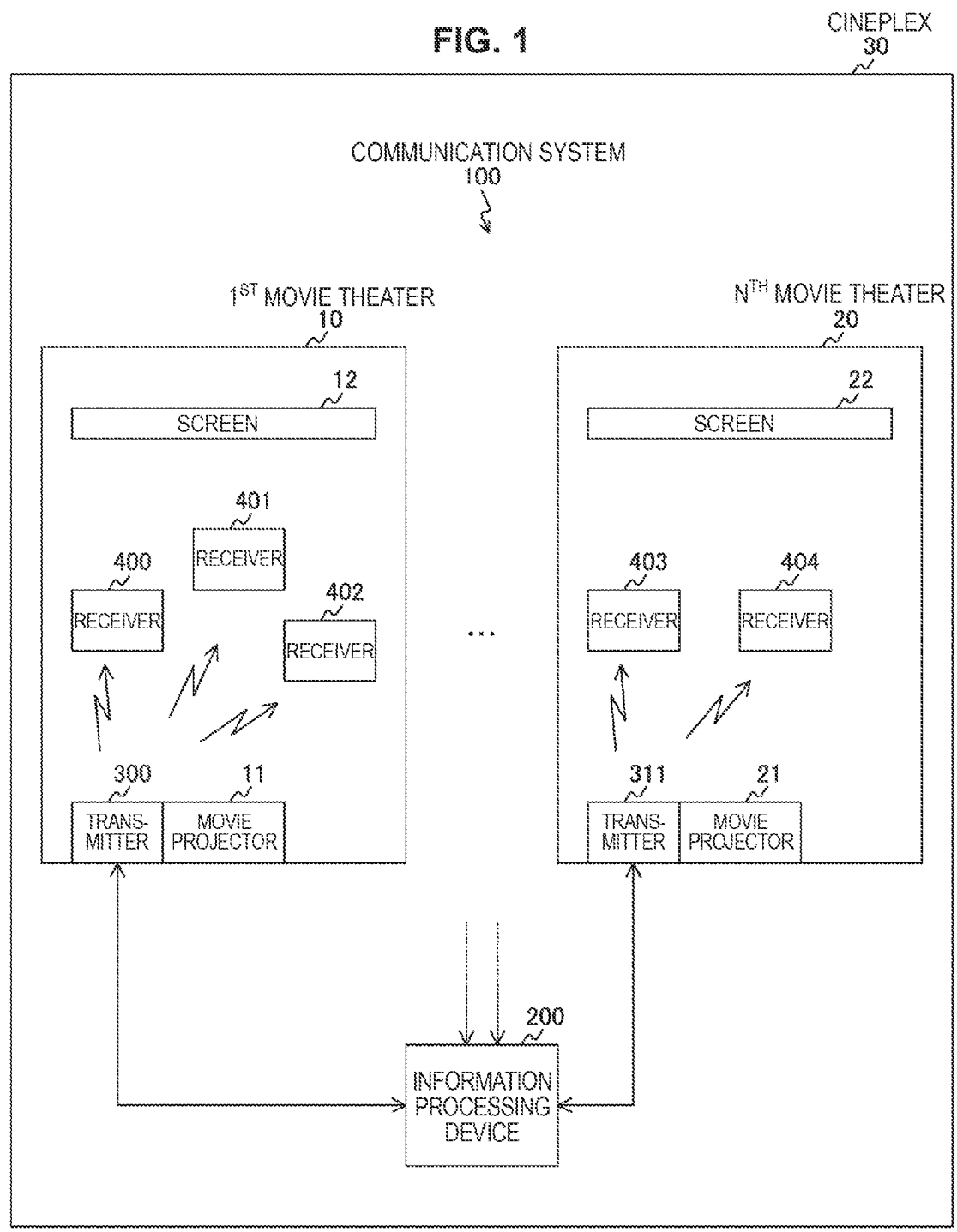
FIG. 1 is a diagram illustrating the system configuration of a communication system according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, modes (hereinafter referred to as embodiments) for carrying out the present technology will be described. The description will be made in the following order.

1. First Embodiment (Channel Setting Control: Example in Which Channels Are Set Based on Assignment Rule)

2. Second Embodiment (Channel Setting Control: Example in Which Audio Data and Caption Data Are Transmitted in Accordance with Different Formats)

3. Third Embodiment (Channel Setting Control: Example in Which Channels to Be Transposed Are Set in Consideration of WiFi Interference)

4. Fourth Embodiment (Channel Setting Control: Example in Which A, B, and C Are Used as Channel Assignment)

5. Fifth Embodiment (Channel Setting Control: Example in Which Channels Are Set for Spaces Assigned in Plurality of Floors)

6. Modification Examples

1. First Embodiment

[Example of Configuration of Communication System]

FIG. 1 is a diagram illustrating the system configuration of a communication system 100 according to a first embodiment of the present technology.

The communication system 100 is, for example, a system that is installed in a place in which a plurality of partitioned spaces are present and wireless communication is individually performed in each space simultaneously. The partitioned space is, for example, a space partitioned by a wall and includes a space which is completely enclosed by walls or of which walls are partially open. Such a place is, for example, a cineplex (that is, a multiplex movie theater (for example, a movie theater in which a plurality of screens are installed and movies are simultaneously shown)), a plurality of conference rooms installed in the same facility, or karaoke boxes.

A case in which the communication system 100 is installed in a cineplex 30 will be exemplified according to the first embodiment of the present technology. In the facility of the cineplex 30, N movie theaters (a $1^{st}$ movie theater 10 to an $N^{th}$ movie theater 20) are assumed to be present and movie projectors 11 and 21 and screens 12 and 22 are assumed to be installed in the movie theaters, respectively. The movie theaters other than the $1^{st}$ movie theater 10 and the $N^{th}$ movie theater 20 will not be illustrated.

The communication system 100 includes an information processing device 200, transmitters 300 and 311 and receivers 400 to 404. The transmitters 300 and 311 are installed near the movie projectors 11 and 21 in the movie theater, respectively. The receivers 400 to 404 are carried by audience members who watch movies. The information processing apparatus 200 is realized by, for example, a personal computer. A relation among the information processing device 200, the transmitters 300 and 311, and the receivers 400 to 404 will be described in detail below with reference to FIG. 2.

Figure 2:
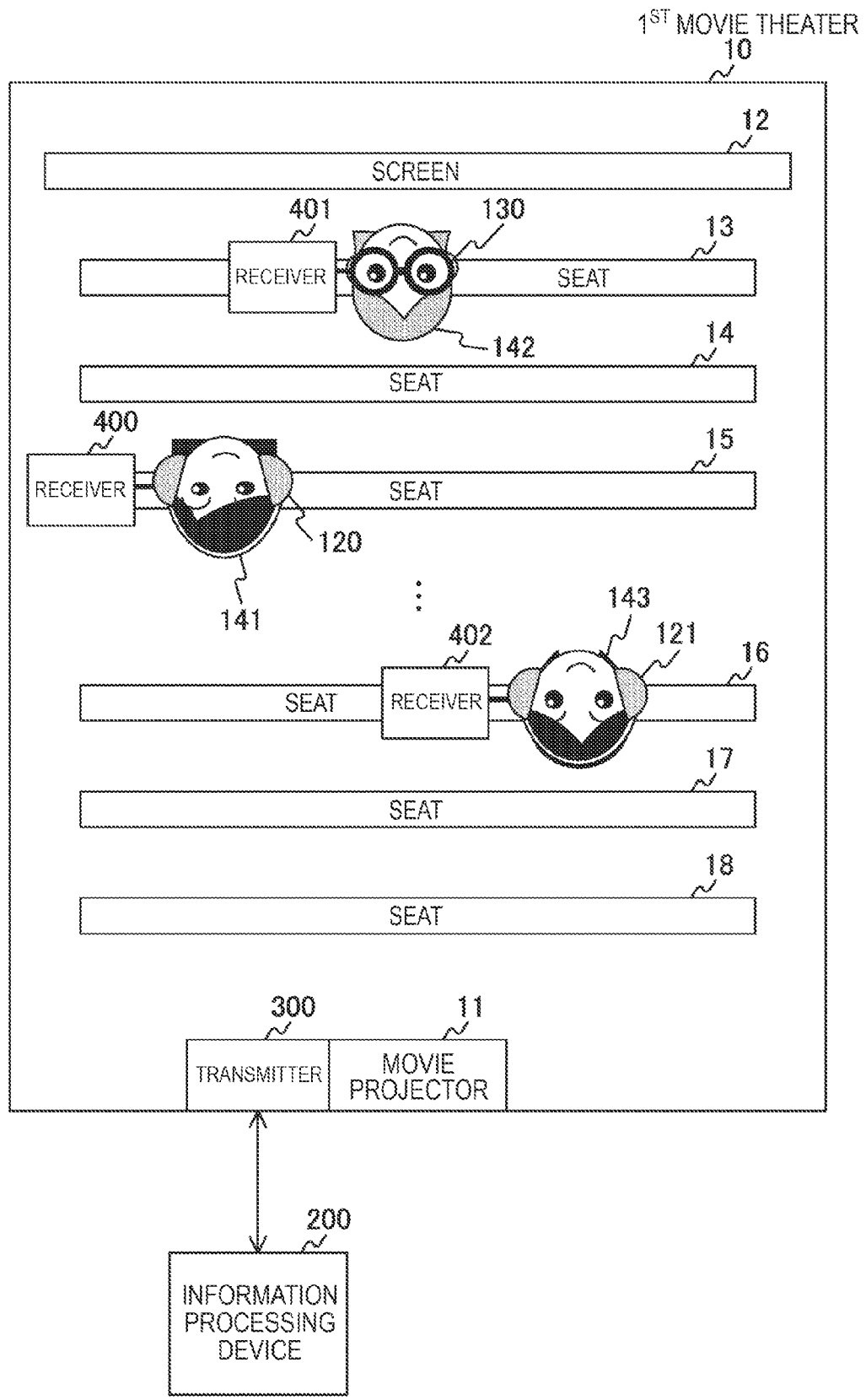
FIG. 2 is a diagram illustrating the system configuration of the communication system according to the first embodiment of the present technology.

FIG. 2 is a diagram illustrating the system configuration of the communication system 100 according to the first embodiment of the present technology. In FIG. 2, only the configuration of the $1^{st}$ movie theater 10 in the communication system 100 shown in FIG. 1 is shown, but the same applies to the configuration of the movie theaters other than the $1^{st}$ movie theater 10.

In the communication system 100, the information processing device 200 and the transmitter 300 are connected to each other via a wired line or a wireless line. Here, when the information processing device 200 and the transmitter 300 are connected to each other via a wireless line, the wireless communication between the information processing device 200 and the transmitter 300 is not preferably performed during wireless communication between the transmitter 300 and the receivers 400 to 402.

Headphones 120 and 121 or caption display glasses 130 are connected to the receivers 400 to 402. For example, when a video is being projected from the movie projector 11 and an audience member 141 seated in a seat 15 is viewing the video projected on the screen 12, the audience member 141 carrying the receiver 400 can wear the headphones 120 to listen to the audio from the headphones 120. For example, when the video is being projected from the movie projector 11 and an audience member 142 seated in a seat 13 is viewing the video projected on the screen 12, the audience member 142 carrying the receiver 401 can wear the caption display glasses 130 to view captions displayed on the caption display glasses 130. The headphones 120 and the caption display glasses 130 will be described in detail with reference to FIGS. 3a and 3b.

[Examples of Configurations of Headphones and Caption Display Glasses Connected to Receivers]

FIGS. 3a and 3b are diagrams schematically illustrating the outer appearances of the headphones 120 and the caption display glasses 130 connected to the receivers 400 and 401 according to the first embodiment of the present technology.

FIG. 3a shows the outer appearance of the headphones 120 connected to the receiver 400. The headphones 120 include an audio output control unit 122.

The audio output control unit 122 is connected to the receiver 400 via a wired line and sequentially acquires audio data output from the receiver 400. Then, the audio output control unit 122 performs control of an audio output from the headphones 120 based on the audio data output from the receiver 400. The audio data output from the receiver 400 is audio data transmitted from the transmitter 300.

FIG. 3b shows the outer appearance of the caption display glasses 130 connected to the receiver 401. The caption display glasses 130 include a display output control unit 131. In the caption display glasses 130, caption display regions 134 and 135 are formed in the lower portions of the lenses 132 and 133. That is, the audience member 142 wearing the caption display glasses 130 can view the video projected on the screen 12 through the lenses 132 and 133 and can also view captions displayed in the caption display regions 134 and 135.

The display output control unit 131 is connected to the receiver 401 via a wired line and sequentially acquires caption data output from the receiver 401. Then, the display output control unit 131 performs display control of the captions displayed in the caption display regions 134 and 135 of the caption display glasses 130 based on the caption data output from the receiver 401. The caption data output from the receiver 401 is caption data transmitted from the transmitter 300.

[Institute of Electrical and Electronic Engineers (IEEE) 802.15.4 Standard]

Hereinafter, the IEEE 802.15.4 standard used in the embodiment of the present technology will be described. The IEEE 802.15.4 standard is regulated for low-speed and short-range network communication and has characteristics by which power consumption can be decreased. Further, ZigBee utilizes the IEEE 802.15.4 standard as the MAC layer.

In the IEEE 802.15.4 scheme, 250 kbps is defined as the RF data rate in the frequency of a 2.4 GHz band. On the other hand, higher rates such as 500 kbps, 667 kbps, 1 Mbps, and the like can be set in compliance with the IEEE 802.15.4. In the case of the higher rates, since a scheme other than the IEEE 802.15.4 is used, the compliance with the IEEE 802.15.4 is applied.

The IEEE 802.15.4 scheme is regulated for a short-range network, but some regulations thereof also support long-range communication.

[Example of Functional Configuration of Information Processing Device]

Figure 4:
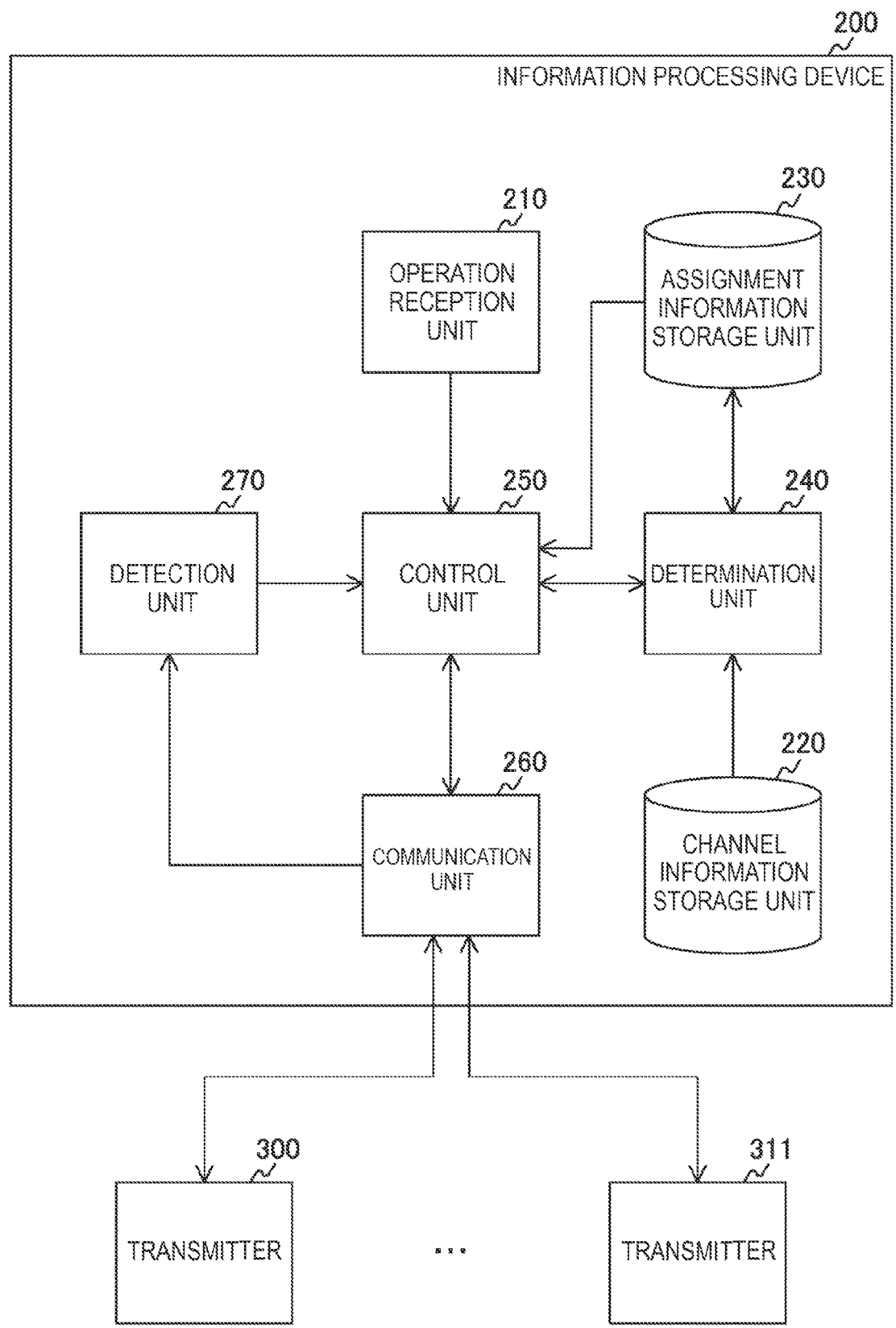
FIG. 4 is a block diagram illustrating an example of a functional configuration of an information processing device according to the first embodiment of the present technology.

FIG. 4 is a block diagram illustrating an example of a functional configuration of the information processing device 200 according to the first embodiment of the present technology.

The information processing device 200 includes an operation reception unit 210, a channel information storage unit 220, an assignment information storage unit 230, a determination unit 240, a control unit 250, a communication unit 260, and a detection unit 270.

The operation reception unit 210 receives various input operations and outputs the contents of the received operations to the control unit 250. For example, information regarding assignment of the movie theaters or information indicating that an interference wave occurs in a receiver is input. For example, when the information regarding the assignment of the movie theaters is input, the information is used for the determination unit 240 to determine channel assignment.

The channel information storage unit 220 is a storage unit that stores information (channel information) regarding a channel assigned in each space and supplies the stored channel information to the determination unit 240. For example, the channel information storage unit 220 stores information (for example, information shown in FIG. 9) regarding channel assignment.

The assignment information storage unit 230 is a storage unit that stores information (assignment information) regarding the channel assignment determined by the determination unit 240 and supplies the stored assignment information to the control unit 250 and the determination unit 240. For example, the assignment information stored in the assignment information storage unit 230 is information regarding assignment shown in, for example, FIGS. 10a to 10f. That is, the assignment of the plurality of spaces and the channels assigned in each space are stored in association therewith in the assignment information storage unit 230.

The determination unit 240 determines a channel to be used in each of the spaces (for example, the $1^{st}$ movie theater 10, . . . , and the $N^{th}$ movie theater 20) for each space based on predetermined rules (basic assignment rules and recommended assignment rules) and stores the determined assignment information in the assignment information storage unit 230. Such determination is performed in response to an instruction of the control unit 250. The predetermined rules used for the determination will be described in detail with reference to FIGS. 10a to 10f and 11a and 11b.

For example, when the same channel (first channel) is used in a plurality of spaces, the determination unit 240 determines the channel so that spaces (first and second spaces) in which the first channel is used are separated from each other by only a predetermined distance. This example will be described in detail with reference to FIGS. 10a to 10f and 11a and 11b.

Here, for example, a case in which the number of the plurality of spaces is greater than the number of channels usable in the short-range wireless communication will be assumed. In this case, the determination unit 240 determines a channel to be used in each of the plurality of spaces and sets a plurality of communication rates as communication rates to be used in the short-range wireless communication in each channel. This example will be described in detail with reference to FIGS. 20 to 23.

For example, a case in which the detection unit 270 detects a space (first space) in which there is a wireless communication device receiving a predetermined interference wave from wireless communication devices (for example, the transmitter 300 and the receiver 400) performing short-range wireless communication using the determined channel will be assumed. In this case, the determination unit 240 determines a channel which rarely receives an influence of the predetermined interference wave in the first space as a candidate channel based on a predetermined rule. Here, the candidate channel is a channel determined as a channel to be used in a given space of the plurality of spaces or a channel which is not used in any space of the plurality of spaces. Further, the determination unit 240 determines the candidate channel as a channel to be newly used in all of the spaces in which the channel (first channel) determined to be used in the first space is determined. This example will be described in detail with reference to FIGS. 12a to 12d and 13a to 13c. The detection of the first space may be performed by a user's input operation.

For example, the determination unit 240 determines a channel to be used in each space and a plurality of communication rates as the communication rates in one space. This example will be described in detail with reference to FIGS. 20 to 23.

For example, the determination unit 240 determines a plurality of channels in one space as channels to be used in each space. This example will be described in detail with reference to FIGS. 20 to 23.

Thus, the determination unit 240 determines a channel to be used in each space for each space based on a predetermined rule when the short-range wireless communication is simultaneously performed for each space using the plurality of wireless communication devices in each of the plurality of spaces. Further, when the number of channels relevant to short-range wireless communication and necessary based on the number of the plurality of spaces is greater than the settable number of channels relevant to the short-range wireless communication, the determination unit 240 may perform such determination. In this case, for example, based on a predetermined rule, the channels of the same frequency are set in the transmitter installed in at least two spaces among the plurality of spaces.

The control unit 250 performs control to set the channel determined by the determination unit 240 in a wireless communication device in accordance with a space in which the wireless communication device is used. For example, the control unit 250 sets a predetermined channel via the communication unit 260 of each receiver based on the assignment information (information regarding the channel assignment determined by the determination unit 240) stored in the assignment information storage unit 230. Further, for example, the control unit 250 may output instruction information (for example, assignment information shown in FIGS. 10a to 10f) used to set the predetermined channel and causes a user to set the predetermined channel. In the setting of the receiver, the control unit 250 may automatically set the receiver by performing connection via the communication unit 260 or the user may set the receiver.

The communication unit 260 transmits and receives various kinds of information to and from the transmitters 300, . . . , and 311 under the control of the control unit 250. Further, the communication unit 260 may transmit and receive various kinds of information to and from each receiver.

The detection unit 270 detects a space in which there is a wireless communication device receiving a predetermined interference wave from a wireless communication device performing the short-range wireless communication using the channel determined by the determination unit 240, and outputs the detection result to the control unit 250. For example, the transmitter (the transmitter 300, . . . , or 311) regularly or irregularly receives an estimation result (estimation result of an interference radio wave) acquired by the receiver from each transmitter within the same space. Further, the transmitter (the transmitter 300, . . . , or 311) transmits an estimation result (including information (information used to specify a space) regarding an assigned space) acquired through the reception to the information processing device 200. Further, the detection unit 270 acquires the estimation result (estimation result of an interference radio wave) transmitted from the transmitter (the transmitter 300, . . . , or 311) via the communication unit 260 and specifies the wireless communication device receiving a predetermined interference wave. Then, the detection unit 270 specifies the transmitter outputting the estimation result of the wireless communication device receiving the predetermined interference wave and detects the space in which this transmitter is assigned. Further, a detection method (a method of estimating an interference radio wave) will be described as estimation methods (1) and (2) below. The detection may be performed based on a user's input operation (an input operation indicating detection through a user's observation). In this case, the control unit 250 performs the detection based on an input operation received by the operation reception unit 210.

[Example of Internal Configuration of Transmitter]

Figure 5:
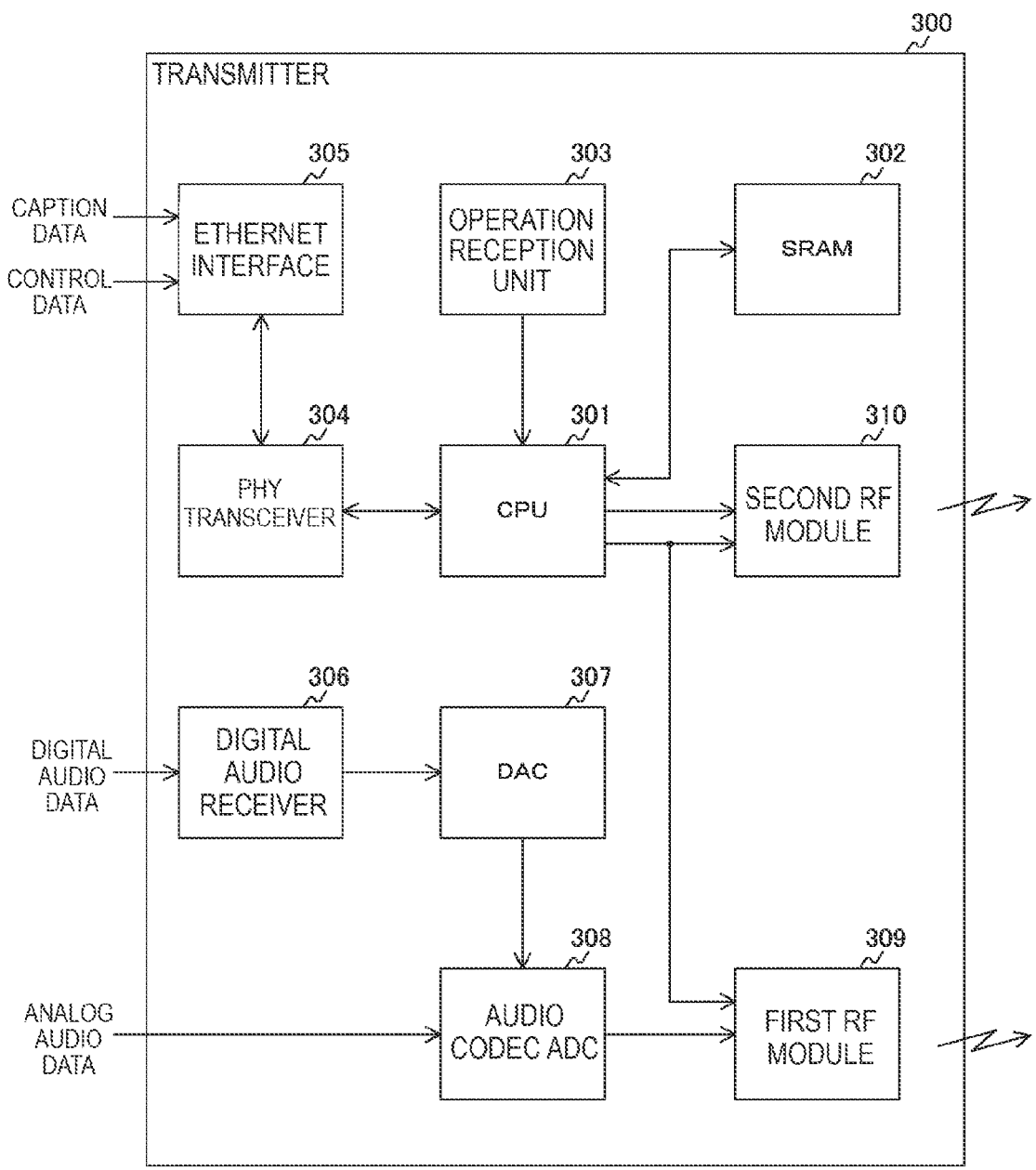
FIG. 5 is a block diagram illustrating an example of an internal configuration of the transmitter according to the first embodiment of the present technology.

FIG. 5 is a block diagram illustrating an example of an internal configuration of the transmitter 300 according to the first embodiment of the present technology. The other transmitters (the transmitter 311 and the like) will not be described here, since the other transmitters have the same internal configuration as the transmitter 300. FIG. 5 shows an example of the transmitter that includes two radio frequency (RF) modules to wirelessly transmit two pieces of independent information (for example, audio data and caption data).

The transmitter 300 includes a central processing unit (CPU) 301, a static random access memory (SRAM) 302, an operation reception unit 303, and a physical layer (PHY) transceiver 304. The transmitter 300 further includes an Ethernet (registered trademark) interface 305, a digital audio receiver 306, a D/A converter (DAC) 307, and an audio codec A/D converter (ADC) 308. The transmitter 300 further includes a first RF module 309 and a second RF module 310.

The CPU 301 controls each unit of the transmitter 300 based on various programs. For example, the CPU 301 performs a process of switching between the first RF module 309 and the second RF module 310 based on a channel switch input or a rate switch input received by the operation reception unit 303. In this case, for example, the control is performed by a universal asynchronous receiver transmitter (UART (asynchronous serial/parallel conversion transmitting and receiving interface)).

The SRAM 302 is a memory connected to the CPU 301 via a bus and stores firmware used for the CPU 301 to perform various kinds of control.

The operation reception unit 303 receives an operation of selecting a wireless channel or various input operations and outputs the contents of a received operation to the CPU 301.

The PHY transceiver 304 receives data (for example, caption data) via, for example, an Ethernet interface (for example, an Ethernet (registered trademark) rj-45) 305 and outputs the received data to the CPU 301. The CPU 301 and the PHY transceiver 304 are connected to each other via a reduced media independent interface (RMII (an interface connecting the physical layer and the logical layer in an Ethernet)). The CPU 301 outputs the received data to the second RF module 310 by a general purpose input/output (GPIO).

The digital audio receiver 306 receives audio data (a digital signal) and outputs the received audio data (digital signal) to the audio codec ADC 308 via the DAC 307.

The DAC 307 is a D/A converter that converts the audio data (digital signal) output from the digital audio receiver 306 into an analog signal and outputs the converted audio data (analog signal) to the audio codec ADC 308.

The audio codec ADC 308 is an A/D converter that receives audio data (an analog signal), converts the audio data (analog signal) into a digital signal, and outputs the converted audio data (digital signal) to the first RF module 309. Further, the audio codec ADC 308 and the first RF module 309 are connected to each other by I2S (Inter-IC Sound (a serial interface for audio data communication)) communication.

The first RF module 309 and the second RF module 310 are RF modules that perform a wireless communication process under the control of the CPU 301. Specifically, the first RF module 309 performs a process of transmitting the audio data and the second RF module 310 performs a process of transmitting the caption data. The first RF module 309 and the second RF module 310 are connected to the CPU 301 via a UART. The caption data received by the PHY transceiver 304 is output from the CPU 301 to the first RF module 309.

Data (for example, the audio data and the caption data) input to the transmitter 300 is output from, for example, the movie projector 11. Further, control data input to the transmitter 300 is output from the information processing device 200 via a wired line.

[Example of Functional Configuration of Transmitter]

Figure 6:
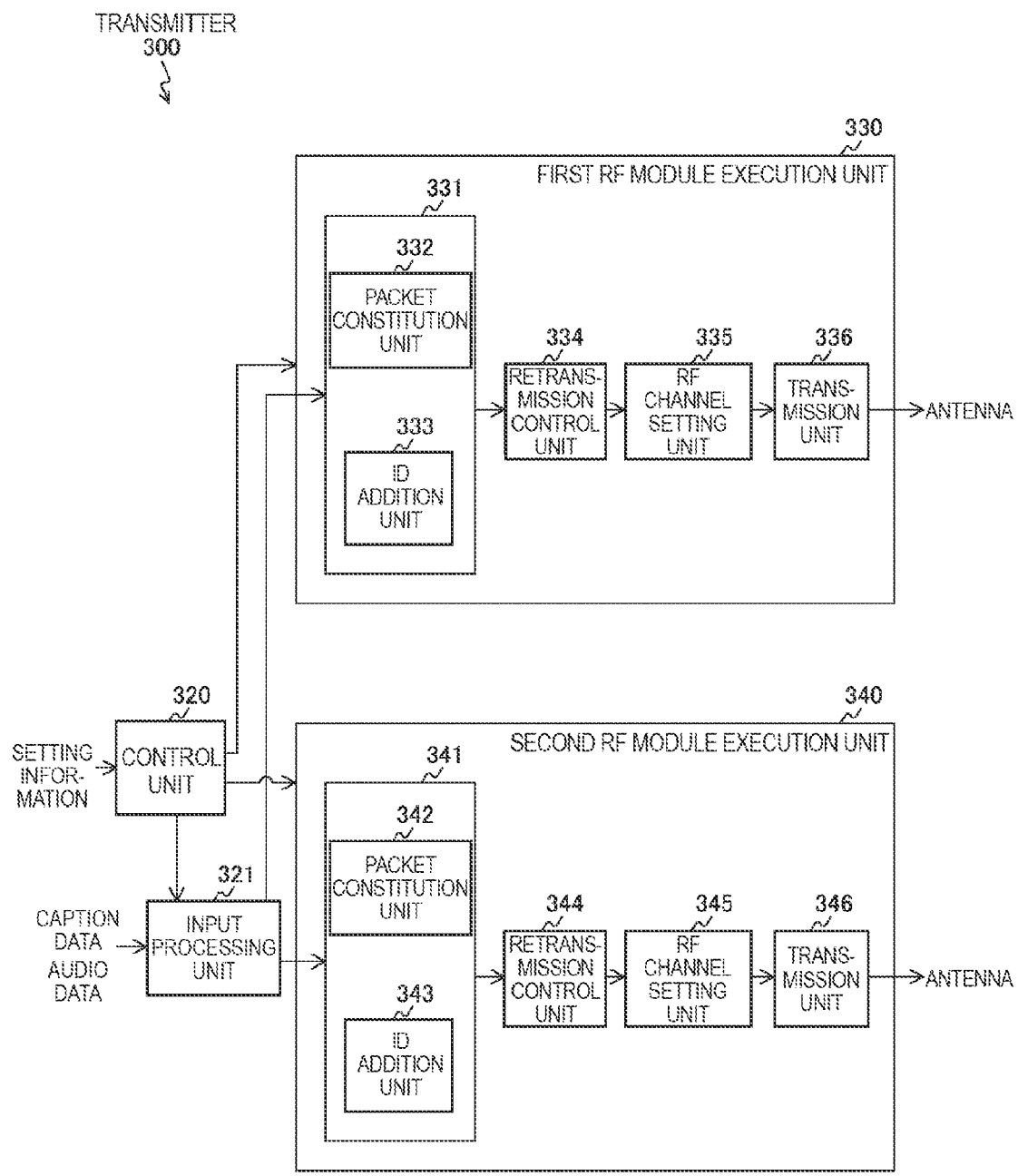
FIG. 6 is a block diagram illustrating an example of a functional configuration of the transmitter according to the first embodiment of the present technology.

FIG. 6 is a block diagram illustrating an example of a functional configuration of the transmitter 300 according to the first embodiment of the present technology. The other transmitters (the transmitter 311 and the like) will not be described here, since the other transmitters have the same functional configuration as the transmitter 300. FIG. 6 shows an example of a transmitter corresponding to the transmitter 300 shown in FIG. 5 and including two RF modules.

The transmitter 300 includes a control unit 320, an input processing unit 321, a first RF module execution unit 330, and a second RF module execution unit 340. The first RF module execution unit 330 includes a packet constitution unit 332, an ID addition unit 333, a retransmission control unit 334, an RF channel setting unit 335, and a transmission unit 336. The second RF module execution unit 340 includes a packet constitution unit 342, an ID addition unit 343, a retransmission control unit 344, an RF channel setting unit 345, and a transmission unit 346. Since the first RF module execution unit 330 and the second RF module execution unit 340 are substantially the same, the description of common portions will be partially omitted below.

The control unit 320 controls each of the input processing unit 321, the packet constitution units 332 and 342, the ID addition units 333 and 343, the retransmission control units 334 and 344, the RF channel setting units 335 and 345, and the transmission units 336 and 346.

Based on control information from the control unit 320, the input processing unit 321 performs a process of switching an input or the like in order to output one of the caption data, the digital audio data, and the analog audio data.

The packet constitution unit 332, the ID addition unit 333, and the retransmission control unit 334 generate a packet with a format necessary at the time of performing wireless transmission. Specifically, the packet constitution unit 332 reassigns a data string supplied from the input processing unit 321 into a packet with a predetermined packet size. The ID addition unit 333 adds header information necessary for the packet generated by the packet constitution unit 332. The header information is header information complying with, for example, the IEEE 802.15.4. As the header information, ID information is added to identify the completely identical channel (the same frequency and the same rate). Thus, identification information is added to all data. Therefore, each receiver identifies the data by referring to the identification information added to the data.

The retransmission control unit 334 performs a process of retransmitting packets of the data packeted by the packet constitution unit 332, as necessary. Here, the number of retransmissions is determined in consideration of, for example, a transmission rate of a transmission path. For example, a case in which a set rate is 250 kbps is assumed. In this case, when the constituted packet has a size of a 60 kbps of the audio data, a maximum of three (1 first transmission+3 retransmissions=total of 4 transmissions of the same packet) can be set as the number of retransmissions. Since the caption data can be generally configured to have a smaller packet size, the number of retransmissions can be adjusted in the range of the rate (250 kbps). At this time, a time (that is, a time in which the transmission may not be performed) necessary at the time of transmitting the packets is considered in some cases. This is because there is a portion or the like dependent on a module performance as hardware. Further, the transmitter 300 may not perform the process of retransmitting the audio data and may perform a process of retransmitting only the caption data.

The RF channel setting unit 335 sets a predetermined RF channel based on the control information from the control unit 320.

The transmission unit 336 outputs, via the antenna, the packet on which the number of retransmissions is controlled by the retransmission control unit 334. In this case, the channel set by the RF channel setting unit 335 is selected, a predetermined rate is selected, and the packet is transmitted via an antenna.

Here, the channel is, for example, a channel that complies with the IEEE 802.15.4 and any one channel of 11 to 26 is set. The rate is, for example, 250 kbps, 500 kbps, 667 kbps, 1 Mbps, or 2 Mbps. Here, two channels with different rates may be configured to have a relation in which the channels are not mutually detectable, by changing a detection circuit even on a reception side according to the different rates.

Here, the control unit 320 can be configured to change a channel and a rate based on the control information input via the Ethernet interface 305 (shown in FIG. 5). For example, when there are a plurality of movie theaters, as in FIG. 1, a plurality of transmitters installed in the movie theaters can be connected to each other via the Ethernet so that information regarding the assignment can be mutually exchanged and set.

The control unit 320 may be configured to change a channel and a rate based on the contents of an operation received by the operation reception unit 303 (shown in FIG. 5).

Thus, in the first embodiment of the present technology, data having two different schemes, that is, the audio data and the caption data, is transmitted. That is, the transmitter 300 transmits at least one of audio data and predetermined data to the receiver. When the configurations shown in FIGS. 5 and 6 are realized, the data having two different schemes, that is, the audio data and the caption data, can be simultaneously transmitted. That is, the transmitter can be configured to simultaneously transmit the plurality of data (the data having two different schemes) in addition to the channels having the same frequency and different schemes. However, by switching the data having two different schemes, that is, the audio data and the caption data, the data may be sequentially transmitted. This example will be described in a modification example.

The example in which the input of the analog signal and the input of the digital signal are performed as the input of the audio data has been described. However, the digital signal may be input via the Ethernet interface 305. Thus, the audio data (digital signal) is input via the Ethernet interface 305, the audio data can be acquired via the PHY transceiver 304 and the CPU 301. In this case, connection can be achieved in a predetermined format (for example, the format of the I2S interface) via a data line from the CPU 301 to the first RF module 309. Further, for example, a general purpose input/output (GPIO: a general input/output interface from a CPU) can be set as the data line. Further, a signal may be connected from the CPU 301 to the DAC 307 in a predetermined format.

Here, the transmitter and the receiver are connected to each other in conformity with, for example, the general IEEE 802.15.4 standard. Further, in the first embodiment of the present technology, the transmitter 300 performs broadcast transmission. The broadcast transmission is transmission in which data communication is performed from the transmitter in a one-way manner without return to the ACK information from the receiver. Thus, by performing the broadcast transmission, data from the transmitter in a given space can be individually or simultaneously received by many receivers. Further, when there are not many receivers, the broadcast transmission may not be performed, but both sides may confirm communication using ACK or the like.

[Example of Internal Configuration of Receiver]

Figure 7:
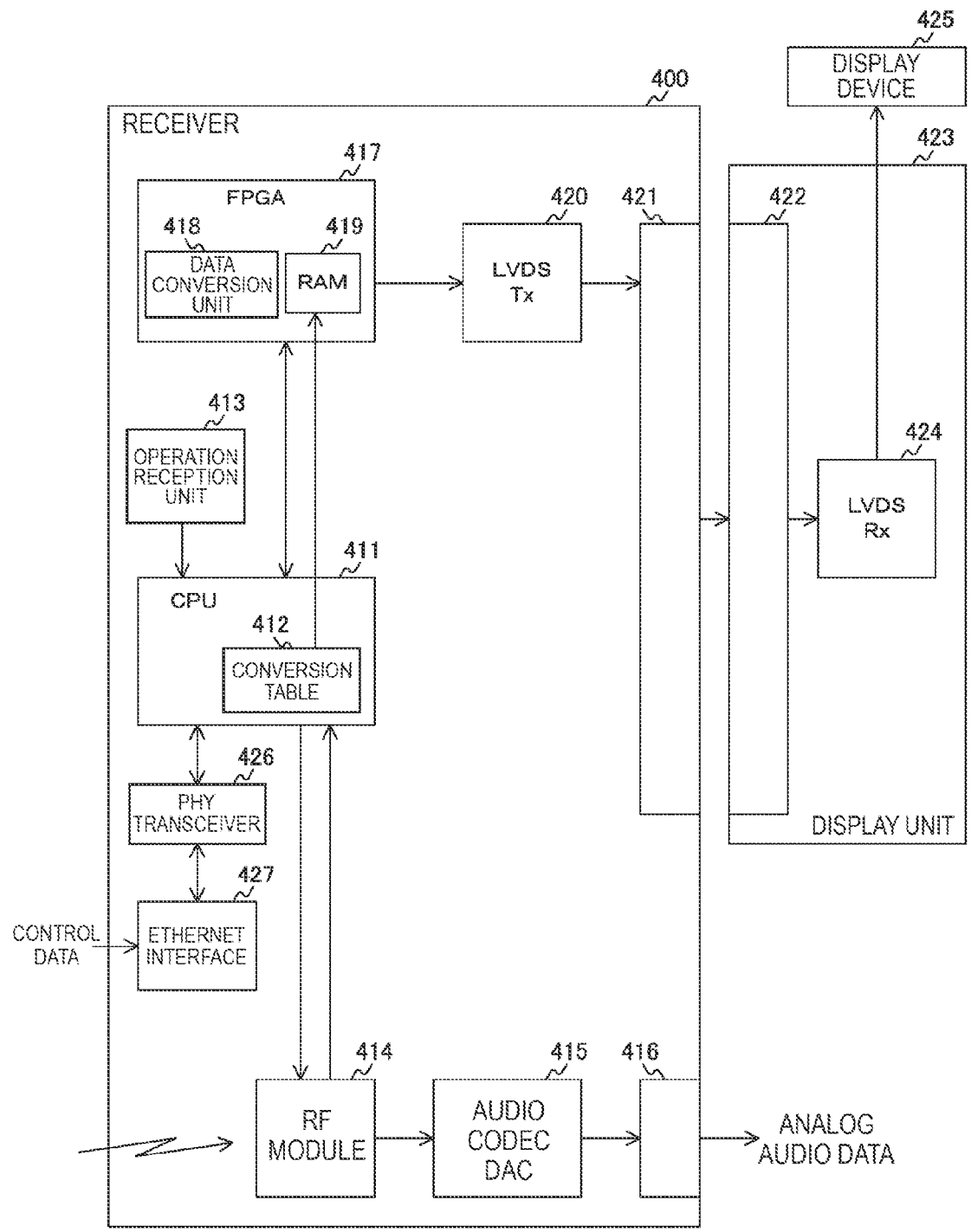
FIG. 7 is a block diagram illustrating an example of an internal configuration the receiver according to the first embodiment of the present technology.

FIG. 7 is a block diagram illustrating an example of an internal configuration the receiver 400 according to the first embodiment of the present technology. Since the other receivers (the receiver 401 and the like) have the same internal configuration as the receiver 400, the description thereof will not be repeated here. FIG. 7 shows the example of the transmitter including one RF module.

The receiver 400 includes a CPU 411, an operation reception unit 413, an RF module 414, an audio codec DAC 415, and interfaces 416, 421, and 422. The receiver 400 further includes a field programmable gate array (FPGA) 417, a low voltage differential signaling (LVDS) 420, a display unit 423, and a display device 425. The receiver 400 further includes a physical layer (PHY) transceiver 426 and an Ethernet interface 427.

The CPU 411 control s each unit of the receiver 400 based on various programs. For example, the CPU 411 includes a conversion table 412 and converts a display format based on information of the conversion table 412 necessary for each conversion concerning display. The CPU 411 supplies all conversion information concerning the display to the RAM 419 of the FPGA 417. Here, the data conversion process by the FPGA 417 is performed as necessary. The CPU 411 and the FPGA 417 are connected to each other by a serial peripheral interface (SPI: synchronous serial communication interface).

The operation reception unit 413 receives various input operations and outputs the content of the received operations to the CPU 411.

The audio codec DAC 415 is a D/A converter that receives audio data (a digital signal) from the RF module 414 and converts the audio data (digital signal) into an analog signal. The audio codec DAC 415 outputs the converted audio data (analog signal) to the outside via the interface 416. For example, the audio data is output to the audio output control unit 122 shown in FIG. 3a.

The RF module 414 is an RF module that performs a wireless communication process under the control of the CPU 411. The RF module 414 and the CPU 411 are connected to each other by a UART. The RF module 414 outputs the audio data (digital signal) to the audio codec DAC 415 through I2S communication.

The FPGA 417 includes a data conversion unit 418, performs each data conversion process concerning display, and outputs the converted information to the display device 425 via the LVDS 420 and an LVDS 424. The LVDS 420 and the LVDS 424 are digital wired transmission differential interfaces for a short range. The LVDS interface is a transmission example when the display device is not integrally formed and is an example in which wired connection to the display unit 423 is realized.

The display device 425 displays various kinds of information in accordance with a predetermined display method. For example, the data (caption data) concerning display may be configured to be output to the display control unit 131 shown in FIG. 3b.

The PHY transceiver 426 receives data (for example, control data) via the Ethernet interface (for example, an Ethernet rj-45) 427 and outputs the received data to the CPU 411. Since the CPU 411, the PHY transceiver 426, and the Ethernet interface 427 correspond to the CPU 301, the PHY transceiver 304, and the Ethernet interface 305 shown in FIG. 5, respectively, the detailed description thereof will not be repeated. For example, the PHY transceiver 426 is connected to the information processing device 200 via the Ethernet interface 427 and receives control data (for example, a channel switch signal) output from the information processing device 200. In the embodiment of the present technology, the receiver 400 including the PHY transceiver 426 and the Ethernet interface 427 has been exemplified, but the PHY transceiver and the Ethernet interface may not be included. In this case, the receiver 400 may perform channel switch through a user's operation, or may acquire control data from the information processing device 200 via the transmitter 300 and perform the channel switch based on the control data.

[Example of Functional Configuration of Receiver]

Figure 8:
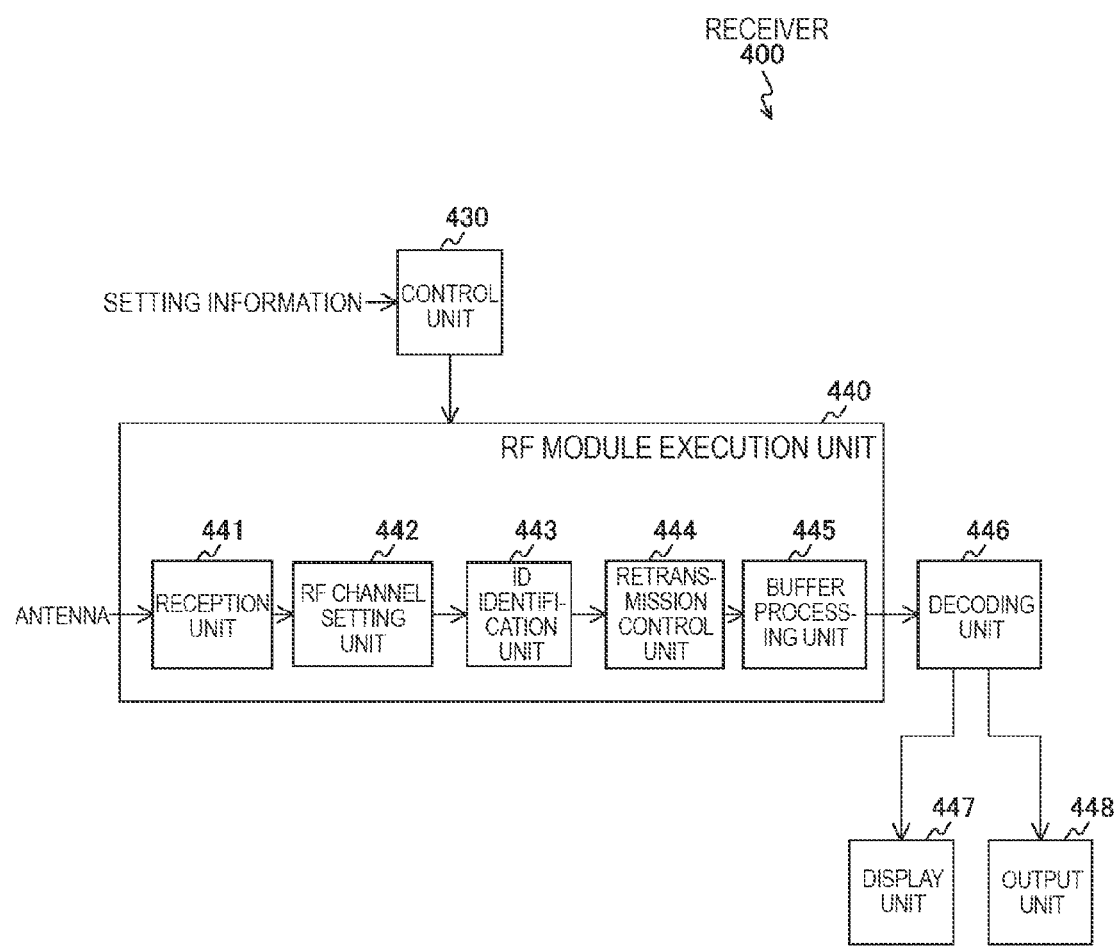
FIG. 8 is a block diagram illustrating an example of a functional configuration of the receiver according to the first embodiment of the present technology.

FIG. 8 is a block diagram illustrating an example of a functional configuration of the receiver 400 according to the first embodiment of the present technology. Since the other receivers (the receiver 401 and the like) have the same functional configuration as the receiver 400, the description thereof will not be repeated here. FIG. 8 shows the example of the transmitter corresponding to the receiver 400 shown in FIG. 7 and including one RF module.

The receiver 400 includes a control unit 430, an RF module execution unit 440, a decoding unit 446, a display unit 447, and an output unit 448. The RF module execution unit 440 further includes a reception unit 441, an RF channel setting unit 442, an ID identification unit 443, a retransmission control unit 444, and a buffer processing unit 445.

The control unit 430 controls each unit and corresponds to, for example, the CPU 411 and the FPGA 417 shown in FIG. 7. For example, the control unit 430 retains RF channel setting, an ID, and information regarding retransmission control and outputs such information to each unit.

The reception unit 441 detects a frequency and reception of the system of the frequency from a signal received from the antenna based on the RF channel set by the RF channel setting unit 442. However, a transmission signal with a system or a rate different from that of a reception target is not detectable. Further, transmission signals with the same frequency and other different rates are considered to be interference waves, and thus there is a concern that the transmission signals have an influence as the interference waves.

The reception signal detected by the reception unit 441 is restored to the packet information through a predetermined restoration process. The ID identification unit 443 refers to an ID to determine whether the ID is a designated ID. When the ID is the designated ID, the buffer processing unit 445 stores the received data in a buffer memory. Here, when a packet retransmission process is performed and one packet can be read correctly among the same packet transmitted a plurality of times, the packet is stored in the buffer memory. The buffer memory is configured to have a sufficient size to perform an overrun or underrun process, as necessary, since the clocks of the transmission unit and the reception unit 441 are deviated from each other within a minute range of a manufacture error. Thus, transmission and reception of continuous information such as audio data can be appropriately performed.

The decoding unit 446 decodes all of the data and outputs the decoded data to the display unit 447 or the output unit 448.

The data fragmented for transmission is restored and, for example, an analog audio is output or information is displayed on the display unit 447.

Here, since the receiver 400 includes one RF module, it is necessary to switch between wireless reception of the caption data and wireless reception of the audio data. For example, the switch control may be performed by the CPU 411 or may be retained in a memory of the RF module 414. Further, as another example, the interface 421 may be separated by a connecter, and the caption data may be selected when it is detected that the connector is inserted.

[Definition of Crosstalk and Interference]

Hereinafter, crosstalk and interference will be described. In the first embodiment of the present technology, as described above, multiple and simultaneous operations are assumed.

Here, a case of compliance with IEEE 802.15.4 (that is, IEEE 802.15.4 is not essential, but any standard can be used as a wireless scheme as long as the standard has the same channel not mutually detected) is assumed. In this case, ZB11 to ZB26 of ZigBee (hereinafter, also referred to as ZB) are used. Therefore, for example, when the number of spaces to be assigned is greater than 20, the completely identical channel is used in some cases. The phrase "completely identical" means a state in which the ZB channels are the same, the rates are the same, and mutual detection can be performed.

In some communication systems including a transmitter and a receiver, IDs are also assumed to be operated in a coincident state. In this case, for example, as an actual operation, it is assumed that an audience member can hear an irrelevant audio from the completely identical transmitter with the own transmitter. This is defined as crosstalk. Although the crosstalk may occur for a relatively short time, the occurrence of the crosstalk itself is a big problem.

On the other hand, a case in which the completely identical channel is used but IDs are different is assumed or a case in which mutual detection may not be performed since the same channel is used but rates are different is assumed. In this case, an audience member does not hear an irrelevant audio in a set channel. However, in a process of detecting and excluding the ID, a radio wave interfering with an own detection signal is generated in some cases. Thus, this is defined as interference.

Thus, in the first embodiment of the present technology, a state in which an audience member can hear an audio or the like from another space through the completely identical channel is defined as crosstalk. Further, a state in which a frequency band of a predetermined channel is shared with an unnecessary own system or another wireless system and there is some influence is defined as interference.

[Difference Between Influences of Crosstalk and Interference and Wall Transmission 3 dB Attenuation]

Crosstalk has an influence even on small input when the same ID is present in a plurality of operational systems. For example, the sensitivity in a module specification can be referred to. However, in actual use, the actual sensitivity is reduced more than the sensitivity described in the module specification due to an environment of a circumferential interference wave or the like. However, when the sensitivity is, for example, about −90 dBm, the detection may be performed even in interruption. That is, there is a probability that a crosstalk problem may occur with the above-described degree of input.

For example, when a transmission power is set to 0 dBm, the sensitivity becomes −90 dBm in a place in which a free space has a distance of 320 m. That is, when the distance from a transmitter which is not a partner is estimated to be less than 320 m in a view from a receiver, it can be said that there is a concern that crosstalk occurs. A calculation example of such a path will be described below.

Here, the interference is a disrupting radio wave which is not detected, as described above. Therefore, the interference is different from the crosstalk and is regarded to be good when the own radio wave can be purely detected. For example, when there is a level difference of about 5 dB, identification with others is possible. This is a necessary difference between the intensity of a radio wave from a transmitter which is an own partner and the intensity of a radio wave from a transmitter which is not a partner when viewed from the receiver.

For example, when a transmission power is set to 0 dBm and the own receiver is located at a distance of 25 m in a free space, communication is possible when the transmitter which is not the partner is a distance of more than 45 m away.

Here, in the first embodiment of the present technology, each partitioned space is assumed even in the multiple and simultaneous operational system. As described above, the occurrence of the interference can be assumed by the distance relation of the transmitter in interference, but the definition is difficult in the same space.

For example, when a threshold of a general room is made of plasterboard, −3 dB (in a case of glass, almost −3 dB) is considered transmission attenuation when its common thickness is 40 mm. Here, when a wall is a cement wall or a wall including metal, the transmission attenuation is larger.

[Estimation Calculation Example of Reach Distance Using Path Quality Coefficient]

In order to estimate a reach distance of crosstalk or interference, a path loss calculation expression will be described.

In general, the following experimentally obtained expression is known as a path loss calculation expression of a wireless LAN:

PathLoss [dB]=20×log($f$)+10×$n$×log($d$)−28.0, where d is a propagation distance (m) and f is a frequency (MHz) and n is a path quality coefficient.

In the expression, f is a 2.4 GHz band. Therefore, when f=2450 (2.45 GHz) is set for facilitation, the path loss can be calculated based on n and d, as in Expression 1 below.

PathLoss=39.78+10×$n$×log($d$)  Expression 1

As the normally used "reach distance," n=2 is set. Examples of the path quality coefficient are as follows:

2.0=outdoors where prospect is good (also called a free space), 2.5=indoors where radio wave propagation environment is good, 3.0=indoors where radio wave propagation environment is not good, and 4.0=indoors where radio wave propagation environment is quite bad.

Next, the maximum reach distance (a case in which exogenous noise is not considered) will be described. For example, a reception power can be calculated by Expression 2 below.

Reception Power [dBm]=Transmission pwr−Path-Loss  Expression 2

In this expression, a normally used path quality coefficient is n=2.0. Further, when Reception=−100 dBm and Transmission pwr=0 dBm are set, the maximum communicable distance d can be calculated as in Expression 1 and Expression 2:

100=39.78+10×$n$×log($d$), and $d$=10^(100−39.78/(10×$n$))=10^(3.011)=1025 [m].

That is, in a free space, the maximum communicable distance is about 1000 m, when the reception power is −100 dBm.

For example, the transmission attenuation of a plasterboard can be set to −3 dBm (a thickness of 40 mm) per sheet. The transmission attenuation of glass (float plate glass) can be set to −2.7 dBm (a thickness of 10 mm) per sheet. Further, with cement, transmission attenuation is about 15 dB for the thickness of 100 mm of an assumed ground.

[Example of Structure of Assignment Table]

FIG. 9 is a diagram illustrating an example of channels set in the communication system 100 according to the first embodiment of the present technology.

In the first embodiment of the present technology, channel assignment is assumed to be performed on twenty six channels from the ZB11 channel complying with IEEE 802.15.4 and combinations of the transmitters and the receivers performing the channel assignment are assumed to be a total of 32. Hereinafter, the ZB11 channel is also referred to as ZB correspondent 11ch or the like.

Here, only sixteen combinations can be provided in ZigBee assignment. Therefore, as shown in FIG. 9, 32 combinations are broadly classified in pairs and the combinations are referred to as A1 to A16 and B1 to B16.

A rate A is set in series A (A1 to A16) and a rate B (where the rate B≠the rate A) is set in series B (B1 to B16). Here, two rates can be selected and set as the rates A and B from, for example, 250 kbps, 500 kbps, 667 kbps, 1 Mbps, and 2 Mbps.

In series A (A1 to A16) and series B (B1 to B16), the same ZB channel is set for the same number (for example, A1 and B1). However, even when the ZB channel is the same number (for example, A1 and B1), these channels have a relation in which the channels are not mutually detected due to the fact that the rates are different from each other. As shown in FIG. 9, an ID (PAN-ID) may be granted to each of the 32 combinations. FIG. 9 shows an example in which an ID number with two bytes is granted to each ZB channel.

[Assignment Example of Channels]

FIGS. 10a to 10f and FIGS. 11a and 11b are diagrams illustrating assignment examples of the channels in the communication system 100 according to the first embodiment of the present technology. As described above, FIGS. 10a to 10f show an assignment example in which the channels have the relation in which the channels have the same frequency and are not mutually detected, when a plurality of partitioned spaces are adjacent. The assignment determination is performed through an assignment determination process performed by the determination unit 240.

As described above, when the channels are inappropriately assigned in a case in which the plurality of channels are assigned in a plurality of partitioned adjacent spaces, there is a concern that interference or crosstalk occurs due to the influence of the channels of the other spaces. Therefore, when the plurality of channels are assigned in the plurality of partitioned adjacent spaces, it is necessary to assign the channels based on predetermined rules.

Here, 32 settable channels of A1 to A16 and B1 to B16 shown in FIG. 9 are assumed to be present. Further, the presence of unused channels is inconsequential.

The principle rules (basic assignment rules) of the channel assignment are the following rules (1) to (3).

(1) Use of a completely identical channel (for example, A1 and A1) is avoided whenever possible. However, when it is necessary to use the completely identical channel, the completely identical channel is used in places which are as distant as possible.

(2) When the plurality of partitioned spaces are assigned in a line, the spaces are assigned so that the same numeral (for example, A1 and A1 or A1 and B1) is not lined nearby. Therefore, for example, the spaces are preferably assigned in numerical order such as A1, A2, A3, A4, etc.

(3) When the plurality of partitioned spaces are assigned in two lines, the spaces are assigned so that not only is the same number (for example, A1 and A1 or A1 and B1) not lined nearby ((2) described above) but also the same number is not lined nearby back and forth or obliquely.

Here, in the plurality of partitioned spaces assigned in two lines, the following rules (4) to (7) will be described as recommended assignment rules (recommendation assignment rules) to realize a stable wireless system.

(4) When An and An (for example, A1 and A1) or Bm and Bm (for example, B4 and B4) which are completely identical are assigned in the spaces, An and An or Bm and Bm are assigned by separating the completely identical channels from each other as far as possible. When An and An (for example, A1 and A1) or Bm and Bm (for example, B4 and B4) which are the completely identical channels are assigned in two lines, An and An or Bm and Bm are assigned in different lines.

(5) Unused channels are set aside. In this case, the unused channels are set aside to have a paired relation (for example, A6 and B6). A use example of the unused channels set aside to have the paired relation will be described in detail with reference to FIGS. 12a to 12d.

(6) When An and Bm have a relation of (n=m) (for example, A1 and B1), An and Bm are assigned so as not to be close to the right, left, front and back, the oblique directions, or the upper and lower stages of the space and An and Bm are assigned in different lines.

(7) When the channels are assigned in the plurality of partitioned spaces assigned in two lines, An and Bm have a relation of n and m in which facing assignment is formed such that the values of n and m are first shifted only by 3 or 4 and the values gradually increase. Further, when the other value for one value reaches an upper limit of the set value, the other value returns to 1 and the same process proceeds. Thus, the assignment of An and Bm which are not the completely identical channels can be set to be one group.

The basic assignment rule and the recommendation assignment rules are referred to collectively as assignment rules.

FIG. 11a is a diagram illustrating an assignment example of wireless channels when the basic assignment rules (1) to (3) are not obeyed. In FIG. 11a, the assignment example of the wireless channels when the plurality of partitioned spaces are assigned in two lines is shown. A rectangle shown in FIG. 11a simply indicates one partitioned space. The numeral shown in each rectangle indicates a kind of wireless channel assigned in the space. A rectangle indicated by diagonal lines therein means a space in which the basic assignment rules (1) to (3) are not obeyed.

For example, among the spaces constituting the upper one line shown in FIG. 11a, two middle spaces (A2 and B2) are spaces in which the basic assignment rule (3) is not obeyed. For example, among the spaces constituting the lower one line shown in FIG. 11a, two left spaces (B2 and B2) are spaces in which the basic assignment rule (3) is not obeyed.

Here, for example, in a practice operation, two spaces (the space (B2) assigned in the lower left of the space (A2)) having an oblique assignment relation are assumed not to interfere with each other. For example, whether interference occurs largely depends on a place (for example, a cineplex) in which the spaces are present. Further, whether interference occurs can be also assumed be influenced by the position, a direction, a structure, or the like of a transmitter. Therefore, in regard to a relation between the space (A2) constituting the upper one line shown in FIG. 11a and the lower end space (B2) constituting the lower one line shown in FIG. 11a, the assignment of these spaces can be permitted in some cases depending on the configuration of a practice partition material or the distance or the like of the two spaces. That is, the assignment of the spaces in which the basic assignment rule (3) is not obeyed can be permitted in some cases depending on the position, direction, structure, or the like of a transmitter.

Figure 10:
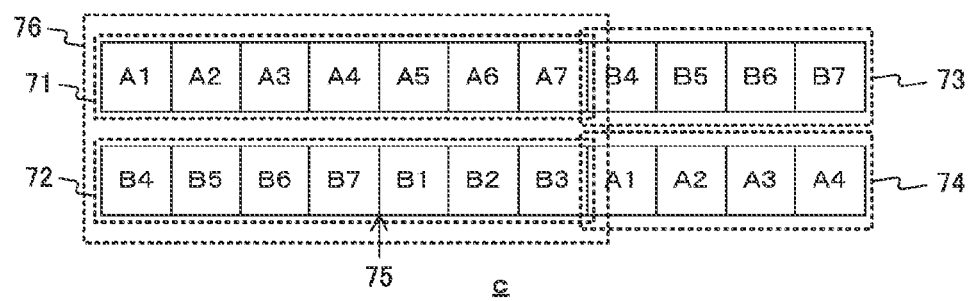
FIGS. 10a to 10f are diagrams illustrating assignment examples of the channels in the communication system according to the first embodiment of the present technology.

FIGS. 10a to 10f show the assignment examples of the wireless channels based on the assignment rules. In FIGS. 10a to 10f, to facilitate the description, the upper limits of n and m in An and Bm to be set are set to 6 or 7 in the following description. FIGS. 10a and 10b show assignment examples of the wireless channels when the plurality of partitioned spaces are assigned in one line. FIGS. 10c, 10d, and 10e show assignment examples of the wireless channels when the plurality of partitioned spaces are assigned in two lines. FIG. 10f shows an assignment example of the wireless channels when the plurality of partitioned spaces are assigned in two lines and are also assigned in an L shape.

Here, for example, An and Bm (where n=1 to 16) have the same frequency, but have different rates, as described above. Therefore, An and Bm may not be adjacent to each other, but may be assigned closer than in the positional relation between the completely identical An and another An. That is, the assignment can be realized more easily.

Specifically, the assignment examples shown in FIGS. 10a and 10b will be described. For example, the spaces shown in FIGS. 10a and 10b correspond to eight movie theaters assigned in one line along a straight passage in a cineplex.

A1 to A16 and B1 to B16 may be irregularly assigned. However, as described above, a reception intensity difference of 5 dB or more is necessary between the channels which may interfere with each other. Here, when the partition wall of each space is formed of plasterboard and the transmission attenuation of one wall is assumed to be about −3 dB, the influence of the interference nearby may be received in some cases even in the consideration of a space loss. Therefore, when An and Bm which are the same frequency are not assigned nearby and are disposed at positions two or more apart, a preferred configuration can be realized.

Next, the assignment examples shown in FIGS. 10c to 10f will be described. For example, the spaces shown in FIGS. 10c and 10d correspond to twenty two movie theaters assigned in two lines along a straight passage which is formed between the movie theaters in the cineplex. For example, the spaces shown in FIG. 10e correspond to twenty movie theaters (here, there is a place (for example, a resting place) which is not a movie theater near the middle of the passage) assigned in two lines along the straight passage which is formed between the movie theaters in the cineplex. For example, the spaces shown in FIG. 10f correspond to twenty two movie theaters assigned in two lines along an L-shaped passage which is formed between the movie theaters in the cineplex.

FIGS. 10c to 10f show examples of a relation in which the spaces face each other. An and Bm (where n=m) have a relation in which An and Bm are not assigned in the same line, but are assigned to face each other. For example, when an antenna of a transmitter has directivity, a radio wave is assumed to be radiated in the spaces in a spreading direction. In this case, when the facing relation is realized, a more preferred configuration can be realized due to the fact that radio waves are radiated in mutual reverse directions. Further, even when the above-described radiation of the radio waves is not realized, a distance can be ensured more when the channels are assigned to face each other than when the channels are assigned in the same line.

Next, the assignment rules (6) and (7) will be described mainly with reference to FIG. 10d. For example, groups (groups A) formed by An are indicated by dotted rectangles 71 and 74. Further, groups (groups B) formed by Bm are indicated by dotted rectangles 72 and 73. In this example, the upper limit of the setting value is set to be 7. In this case, An are assigned in numerical order (1 to 7) from the left end of the upper line (that is, group A 71). Bm are assigned in numerical order (4 to 7) shifted only by three from the left end of the lower line (that is, group B 72). Here, when the value (m) of Bm reaches the upper limit (where m=7) of the setting value (indicated by an arrow 75), m returns to 1 and the same process proceeds. Thus, a group (a rectangle 76 indicated by a dotted line) constituted by fourteen is formed. After the group A 71 and the group B 72, the lines of An and Bm are transposed and assigned. That is, when one group 76 is assigned, the horizontal lines are transposed and the assignment restarts. Specifically, the assignment of the left four of the group A 71 is the same as that of the group A 74. Further, the assignment of the left four of the group B 72 is the same as that of the group B 73. Thus, the assignment of An and Bm which are not the completely identical channels can be realized as one group. Further, even when the number of channels in one line increases, the same assignment can be realized.

Further, as a difference between FIGS. 10*c* and 10*d*, A6 and B6 having a paired relation of unused channels are ensured in FIG. 10*d*. As a result, in FIG. 10*c*, one group 76 is constituted by fourteen. In FIG. 10*d*, one group (indicated by a dotted rectangle 77) is constituted by twelve. In the case of FIG. 10*d*, the completely identical channels are assigned as far as possible. For example, the channels A1 are assigned at the left end position of the upper line and the fifth position from the right end of the lower line. Therefore, the channels A1 are assigned at the positions six apart and in the different lines.

In FIG. 10*e*, the channels of the spaces which are not movie theaters are removed from the assignment shown in FIG. 10*c*.

Next, a problem of crosstalk caused due to the completely identical channel will be described with reference to FIG. 11*b*. For example, as indicated by an arrow 50, a case of calculation for five adjacent rooms is assumed. For example, the width of the room is set to 10 m. Since the five rooms are adjacent, five walls are necessary. In this case, when an output is 0 dBm, $-(39.78+20\times\log 50+5\times 3.0)=-88.8$ dBm is calculated. Here, as described above, for example, there is a probability that the problem of the crosstalk may occur since detection can be made even in the pause in about −90 dBm. Therefore, there is a high probability that the influence can be avoided. Since this environment is not a free space, the coefficient n can be expected to be 2.0 or more. Therefore, a case of further attenuation can be considered. For this reason, when the distance is separated up to five adjacent rooms, there is a high probability that the influence can be avoided even in −88.8 dBm.

In the multiple and simultaneous operations of the wireless communication of the plurality of partitioned spaces, the crosstalk and interference can be prevented from occurring even in the communication system in which there is a probability that the crosstalk and interference can occur. That is, by assigning the wireless channels of the plurality of partitioned spaces based on the basic assignment rules and the recommendation assignment rules, the crosstalk and interference can be prevented from occurring.

[Prevention Example of Crosstalk and Interference]

As described above, the crosstalk and interference can be prevented from occurring by assigning the wireless channels based on the basic assignment rules and the recommendation assignment rules. However, when an operation is confirmed in an individual space after the assignment of the wireless channels, the crosstalk or interference is also assumed to occur. For example, in a movie theater, an audio or a caption of a video other than a video which is being projected in the movie theater may be produced (crosstalk), an audio may be paused, or a caption may be fragmented (interference). For example, when a problem such as frequent audio interruption occurs in a normal viewing state, it can be determined that there is a probability of the influence of crosstalk or interference being received.

Thus, when the crosstalk or interference occurs, the following two reasons (1) and (2) are mainly considered.

The reason (1) is a case in which actual assignment of the wireless channels is not the assignment based on the basic assignment rules and the recommendation assignment rules. In this case, it is necessary to assign the wireless channels again based on the basic assignment rules and the recommendation assignment rules.

The reason (2) is a case in which an influence of interference with another wireless communication system is caused. Since the communication system 100 performs wireless communication using the 2.4 GHz band, a radio wave from another wireless communication system using the same frequency band may be an interfering wave, and thus the audio or caption may be influenced.

Thus, when the crosstalk or interference occurs, the reason (1) or the reason (2) can be considered. Therefore, it is necessary to attempt to use the following avoidance methods (avoidances (1) to (3)).

Here, for example, in the example shown in FIG. 10*e*, a case in which an audio problem occurs in the space (indicated by an arrow 60) in which the channel B4 is assigned is assumed. Further, since the specific avoidance methods are described in detail with reference to FIGS. 12*a* to 12*d* and 13*a* to 13*c*, the avoidance methods will be simply described in order here.

Avoidance (1) is confirmation of the basic assignment rules and the recommendation assignment rules.

The basic assignment rules and the recommendation assignment rules are confirmed once again, and the wireless channels are assigned again, if necessary. When the problem is not resolved, the following two avoidance rules are attempted.

Avoidance (2) is an avoidance rule of substituting the channel with A7 or B7.

When A7 and B7 are assumed to have a low probability of the problem occurring, the problem can be resolved by substituting the channel with the channel A7 or B7.

Avoidance (3) is an avoidance rule of substituting the channel with an unused channel.

For example, the avoidance (2) is first executed. When the problem is still not resolved, the avoidance (3) is applied. When an unused channel uses a frequency different from the channel in which the problem occurs, the problem can be resolved by substituting the channel. Here, the execution order of the avoidance (2) and the avoidance (3) may not necessarily be one direction. For example, after the avoidance (3) is executed, the avoidance (2) may be executed in a case in which the problem is not resolved.

Figure 12:
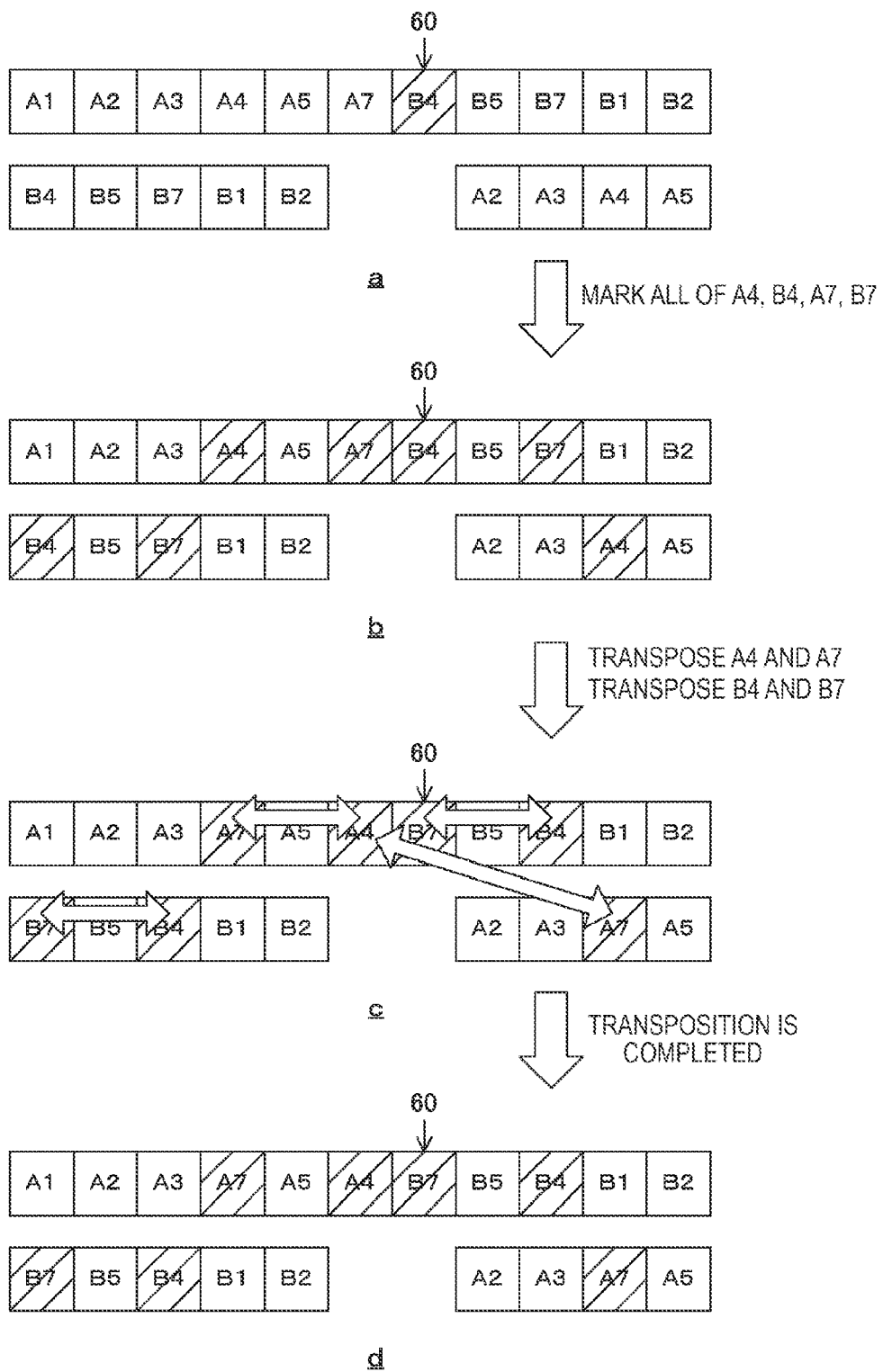
FIGS. 12a to 12d are diagrams illustrating the flow of a method of avoiding crosstalk or interference by a determination unit according to the first embodiment of the present technology.

FIGS. 12*a* to 12*d* are diagrams illustrating the flow of a method of avoiding crosstalk or interference by the determination unit 240 according to the first embodiment of the present technology. FIGS. 12*a* to 12*d* show avoidance examples in which the channels in which there is no influence are transposed among the assigned channels. The channel assignment shown in FIG. 12*a* is the same as that shown in FIG. 10*e*.

In FIGS. 12*a* to 12*d*, a case in which audio interruption occurs in the space (indicated by the arrow 60) in which the channel B4 is assigned is assumed. Even when caption fragmentation occurs, an avoidance process is the same. Therefore, the description thereof will not be repeated here.

When the channel assigned in a space in which the crosstalk or interference is to be avoided is the series B (B4), as in FIG. 12a, the channel (B4) of the series B is transposed with B7. Specifically, the channels of the series A and the series B with the same number as B4 are first marked. The channels of the series A and the series B with the same number as B7 with which the channel is to be substituted are marked. That is, as shown in FIG. 12b, the channels (A4, B4, A7, and B7) assigned in the rectangles indicated by diagonal lines therein are marked.

Next, as indicated by arrows in FIG. 12c, B4 and B7 are transposed with each other among the marked channels. Further, A4 and A7 are transposed with each other among the marked channels. Thus, by performing the transposition, the basic assignment rules can be automatically maintained. That is, by performing the transposition in this way, the configuration can be realized without mutual interruption in the channels assigned in advance.

When the transposition ends, it is confirmed that the audio interruption or caption fragmentation does not occur in the transposed channels at the time of turning on the power of the entire cineplex. In this case, on a receiver side, the settings of the receiver are reflected only for the receivers in which the channels A and B to be set are changed. Then, in all of the movie theaters, the avoidance process ends when it is confirmed that no problem occurs.

Figure 13:
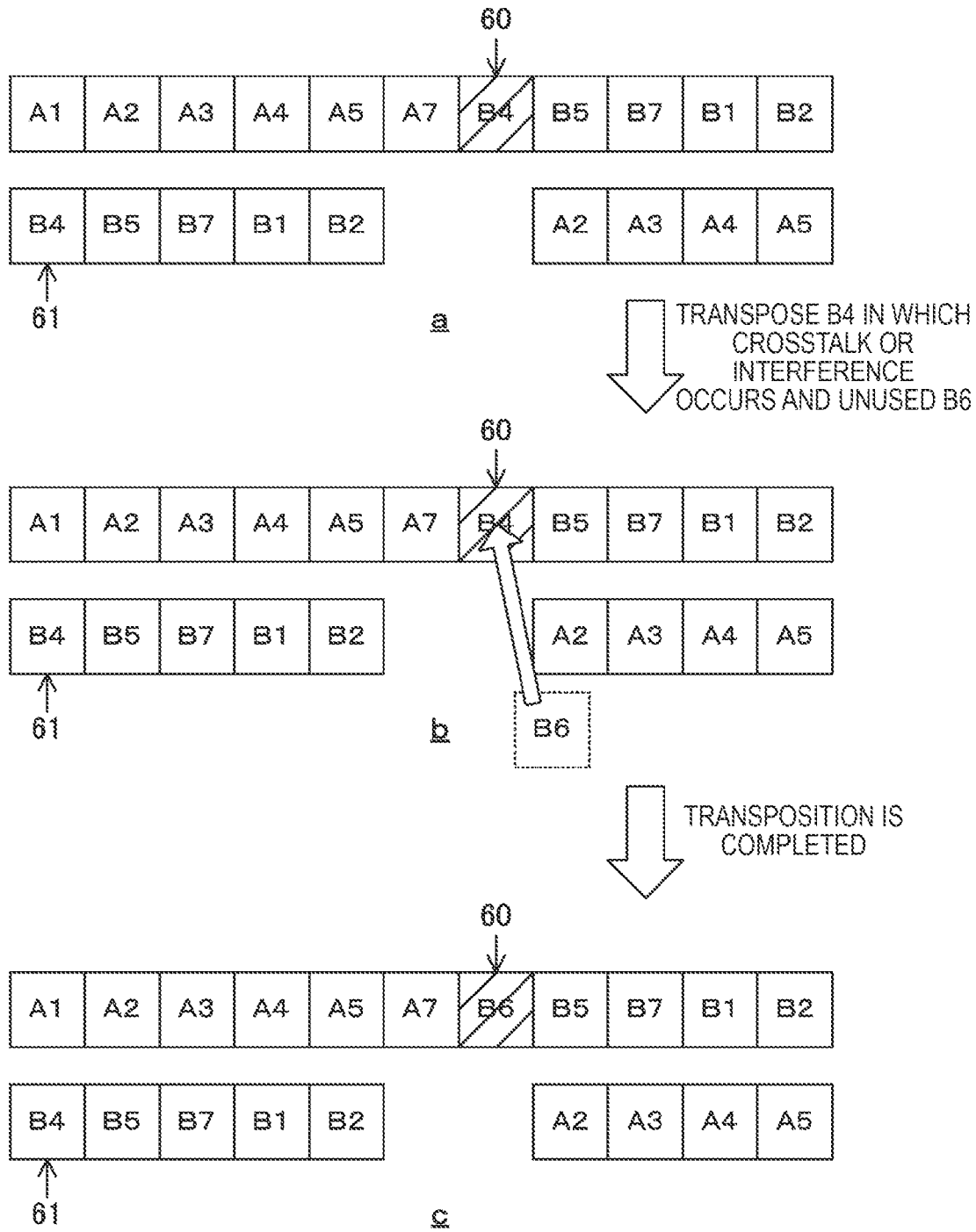
FIGS. 13a to 13c are diagrams illustrating the flow of a method of avoiding crosstalk or interference by the determination unit according to the first embodiment of the present technology.

FIGS. 13a to 13c are diagrams illustrating the flow of a method of avoiding crosstalk or interference by the determination unit 240 according to the first embodiment of the present technology. FIGS. 13a to 13c show an avoidance example in which when there are unassigned channels, a channel in which there is no influence is transposed among the channels. Further, the assignment of the channels shown in FIG. 13a is the same as that shown in FIG. 10e.

In FIGS. 13a to 13c, a case in which audio interruption occurs in the space (indicated by the arrow 60) in which the channel B4 is assigned is assumed. Further, a case in which there are unused channels (A6, B6, and the like) is assumed. Even when caption fragmentation occurs, an avoidance process is the same. Therefore, the description thereof will not be repeated here.

When the channel assigned in a space in which the crosstalk or interference is to be avoided is the series B (B4), as in FIG. 13a, the channel (B4) is transposed with the unused channel (B6) of the series B. Specifically, as shown in FIG. 13b, the channel (B4) assigned in the rectangle indicated by diagonal lines therein and the unused channel (B6) of the series B are transposed with each other.

Here, the unused channel of the series B may be assigned in any space. That is, since the channel (A6) having the paired relation with the unused channel (B6) of the series B is not used either, the degree of freedom of the unused channel (B6) of the series B is enhanced.

As shown in FIG. 13a, the channel (B4) which is completely identical with the channel B4 (indicated by an arrow 60) in which the crosstalk or interference occurs is assigned in another space (indicated by an arrow 61). Therefore, the number of unused channels decreases by transposing the channel B4 (indicated by the arrow 60) in which the crosstalk or interference occurs with the unused channel (B6) of the series B.

Thus, by performing the transposition, the basic assignment rules can be automatically maintained. That is, by performing the transposition in this way, the configuration can be realized without mutual interruption in the channels assigned in advance.

When the transposition ends, it is confirmed that the audio interruption or caption fragmentation does not occur in the transposed channels at the time of turning on the power of the entire cineplex. In this case, on a receiver side, the settings are reflected only for the receivers in which the channel B4 to be set is changed. Then, in all of the movie theaters, the avoidance process ends when it is confirmed that no problem occurs. In this example, a pair of B6 and A6 is set as the unused channels. However, even when A6 is used instead of B6 described above, the same avoidance can be achieved.

[Example of Process of Information Processing Device]

Next, a process of the information processing device 200 according to the first embodiment of the present technology will be described with reference to the drawings.

Figure 14:
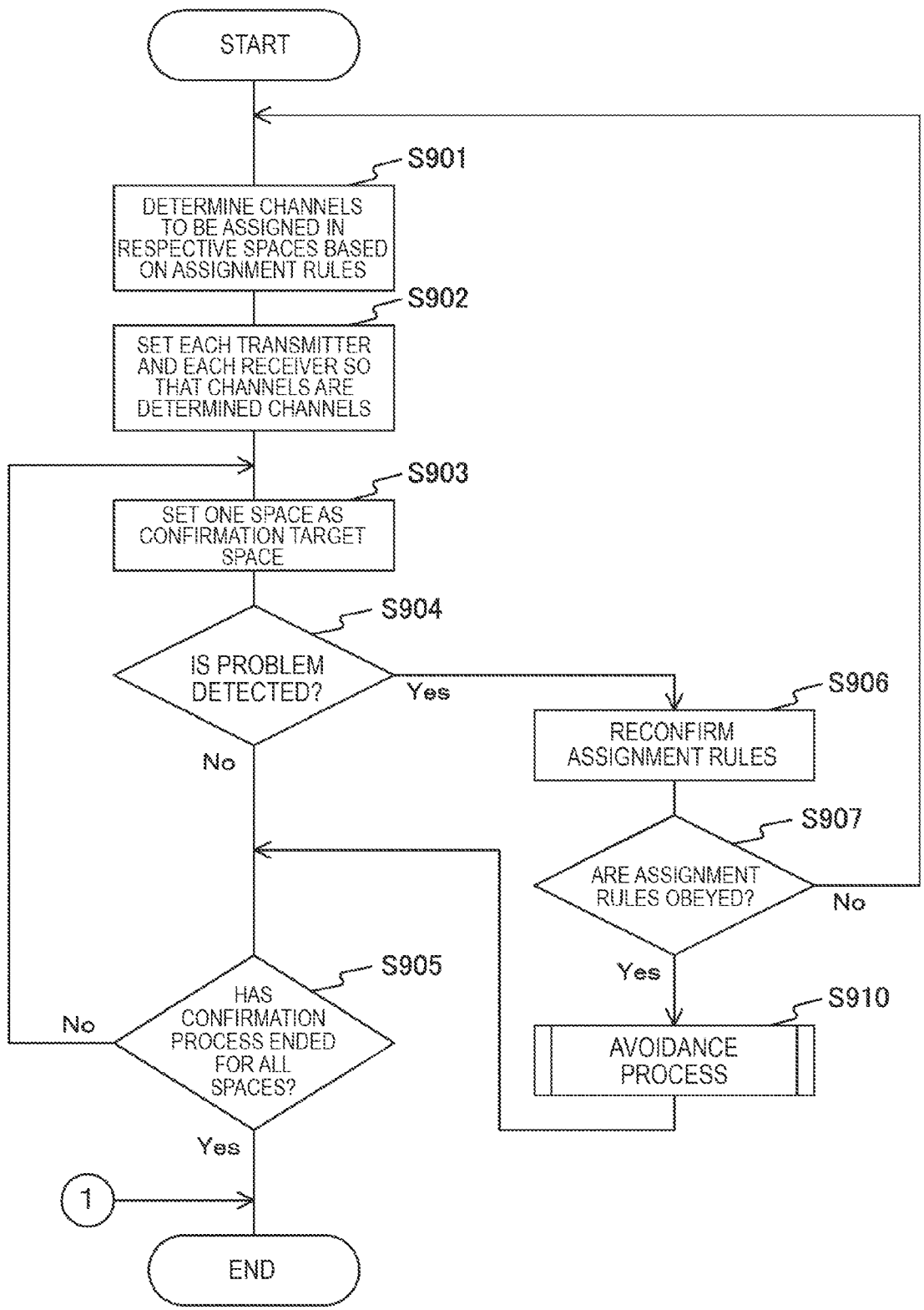
FIG. 14 is a flowchart illustrating an example of the processing order of a channel assignment control process performed by an information processing device according to the first embodiment of the present technology.

FIG. 14 is a flowchart illustrating an example of the processing order of a channel assignment control process performed by the information processing device 200 according to the first embodiment of the present technology.

First, the determination unit 240 determines channels to be assigned in the spaces based on the assignment rules (the basic assignment rules and the recommendation rules) (step S901). Next, the control unit 250 sets the channels of each transmitter and each receiver so that the channels are the determined channels (step S902). The channels may be automatically set when each transmitter and each receiver is connected to the information processing device 200, or a user may set the channels based on instruction information output from the information processing device 200. Thus, after the channels of each transmitter and each receiver are set, each transmitter and each receiver is used in a space (inside a move theater). Step S901 is an example of a determination order described in the claims. Further, step S902 is an example of a setting order described in the claims.

Next, the determination unit 240 sets, as a confirmation target space, one space for which the process of confirming occurrence of a problem does not end (step S903). For example, the confirmation target space for which the process of confirming the occurrence of the problem does not end is set based on the assignment information stored in the assignment information storage unit 230. Next, based on the detection result of the detection unit 270, the control unit 250 determines whether the problem (for example, occurrence of an interfering wave) occurs in the confirmation target space (step S904). When the problem does not occur in the confirmation target space (step S904), it is determined whether the confirmation process ends for all of the spaces (step S905). When the confirmation process ends for all of the spaces, the process of controlling the channel assignment ends. Conversely, when the confirmation process does not end for all of the spaces (step S905), the process returns to step S903.

When the problem occurs in the confirmation target space (step S904), the determination unit 240 reconfirms the assignment rules for the assignment information stored in the assignment information storage unit 230 (step S906). That is, it is confirmed whether the assignment of the previously determined channels is appropriate. When the assignment rules are obeyed as the confirmation result (step S907), the avoidance process is performed (step S910). The avoidance process will be described in detail with reference to FIG. 15. Conversely, when the assignment rules are not obeyed (step S907), the process returns to step S901.

Figure 15:
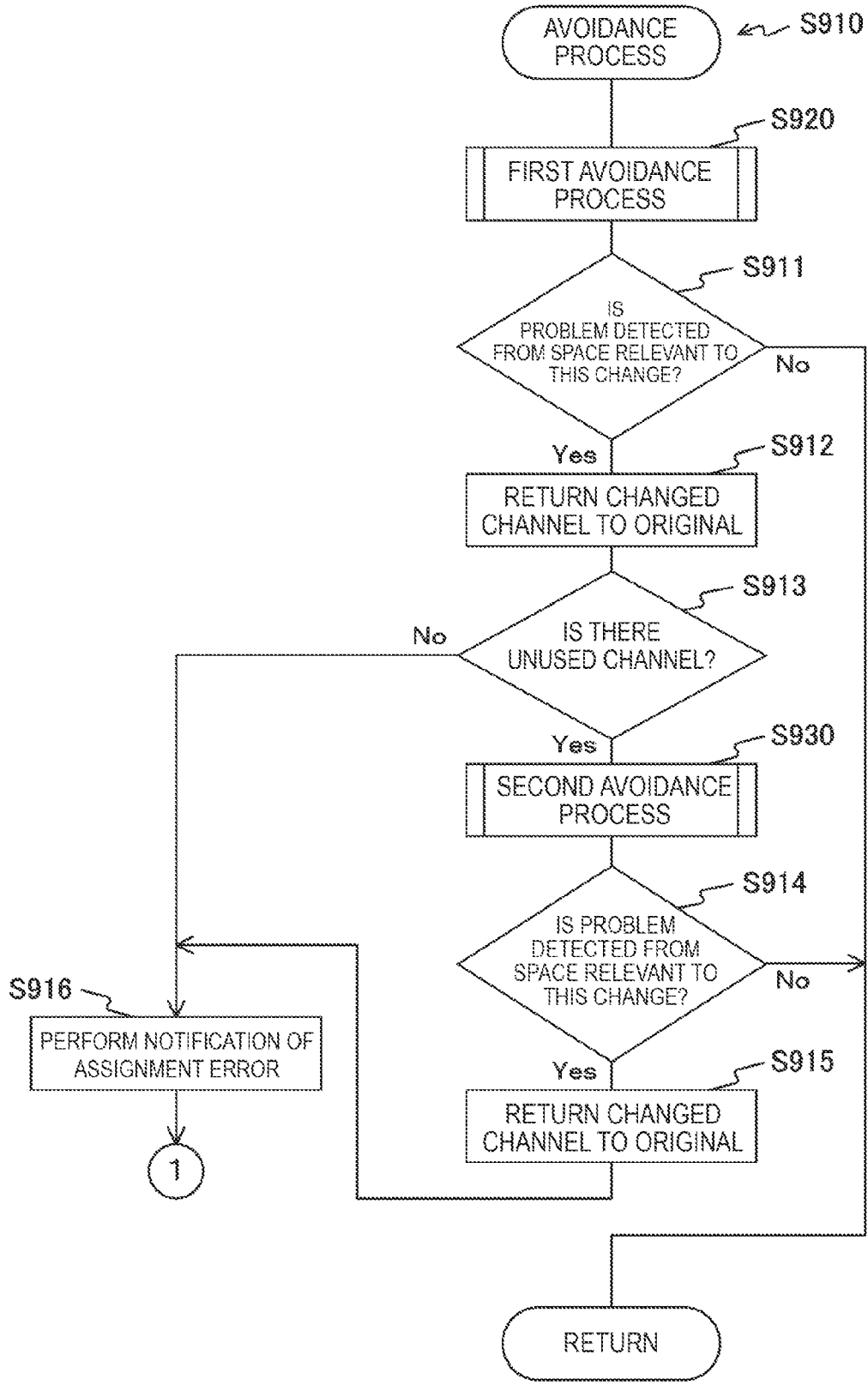
FIG. 15 is a flowchart illustrating an avoidance process (the processing order of step S910 shown in FIG. 14) in the processing order of the channel assignment control process performed by the information processing device according to the first embodiment of the present technology.

FIG. 15 is a flowchart illustrating an avoidance process (the processing order of step S910 shown in FIG. 14) in the processing order of the channel assignment control process performed by the information processing device 200 according to the first embodiment of the present technology.

First, a first avoidance process is performed (step S920). The first avoidance process will be described in detail with reference to FIG. 16.

Next, based on the detection result of the detection unit 270, the control unit 250 determines whether a problem is detected from a space in which a channel is changed through the first avoidance process (step S911). When the problem is not detected from the space in which the channel is changed through the first avoidance process (step S911), the problem is avoided and the process returns to step S905 shown in FIG. 14.

Conversely, when the problem is detected from the space in which the channel is changed through the first avoidance process (step S911), the control unit 250 performs a process of returning the changed channel to the original channel (step S912). Next, based on the assignment information stored in the assignment information storage unit 230, the control unit 250 determines whether there is an unused channel (step S913). When there is no unused channel (step S913), the user is notified of an assignment error due to the fact that it is difficult to avoid the problem (step S916). For example, the user is notified of the assignment error through an audio or display. In this case, the user can attempt to resolve the problem himself or herself, for example, by examining the assignment again.

Conversely, when there is an unused channel (step S913), the second avoidance process is performed (step S930). The second avoidance process will be described in detail with reference to FIG. 17.

Next, based on the detection result of the detection unit 270, the control unit 250 determines whether the problem is detected from a space in which the channel is changed through the second avoidance process (step S914). When the problem is not detected from the space in which the channel is changed through the second avoidance process (step S914), the problem is avoidance and the process returns to step S905 shown in FIG. 14.

Conversely, when the problem is detected from the space in which the channel is changed through the second avoidance process (step S914), the control unit 250 performs a process of returning the changed channel to the original (step S915). In this case, the user is notified of an assignment error, since it is difficult to avoid the problem (step S916).

Figure 16:
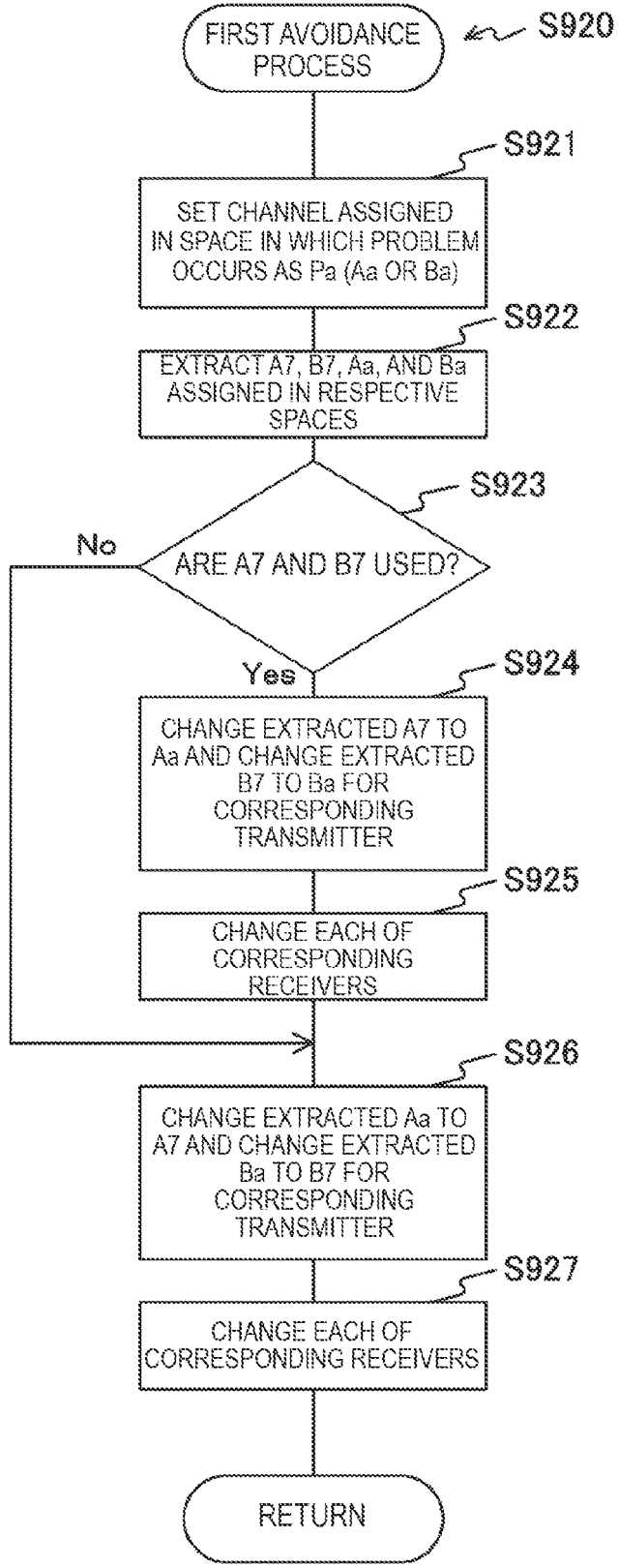
FIG. 16 is a flowchart illustrating a first avoidance process (the processing order of step S920 shown in FIG. 15) in the processing order of the channel assignment control process performed by the information processing device according to the first embodiment of the present technology.

FIG. 16 is a flowchart illustrating the first avoidance process (the processing order of step S920 shown in FIG. 15) in the processing order of the channel assignment control process performed by the information processing device 200 according to the first embodiment of the present technology.

First, the determination unit 240 sets, as Pa (Aa or Ba), the channel assigned in a space in which it is detected that the problem occurs (step S921). Next, the determination unit 240 extracts A7, B7, Aa, and Ba from the channels assigned in the spaces (step S922). For example, A7, B7, Aa, and Ba are extracted based on the assignment information stored in the assignment information storage unit 230.

Next, the determination unit 240 determines whether at least one of A7 and B7 is used (step S923). When any one of A7 and B7 is not used (step S923), the process proceeds to step S926.

Conversely, when at least one of A7 and B7 is used (step S923), the determination unit 240 changes the extracted channel A7 to Aa and changes the extracted channel B7 to Ba for the corresponding space (step S924). In this case, the control unit 250 changes the extracted channel A7 to Aa and changes the extracted channel B7 to Ba for the transmitter disposed in the space (step S924). Next, the control unit 250 performs the corresponding change on each receiver to be used in the space (step S925).

Next, the determination unit 240 changes the extracted channel Aa to A7 and changes the extracted channel Ba to B7 for the corresponding space (step S926). In this case, the control unit 250 changes the extracted channel Aa to A7 and changes the extracted channel Ba to B7 for the transmitter disposed in the space (step S926). Next, the control unit 250 performs the corresponding change on each receiver used in the space (step S927).

Figure 17:
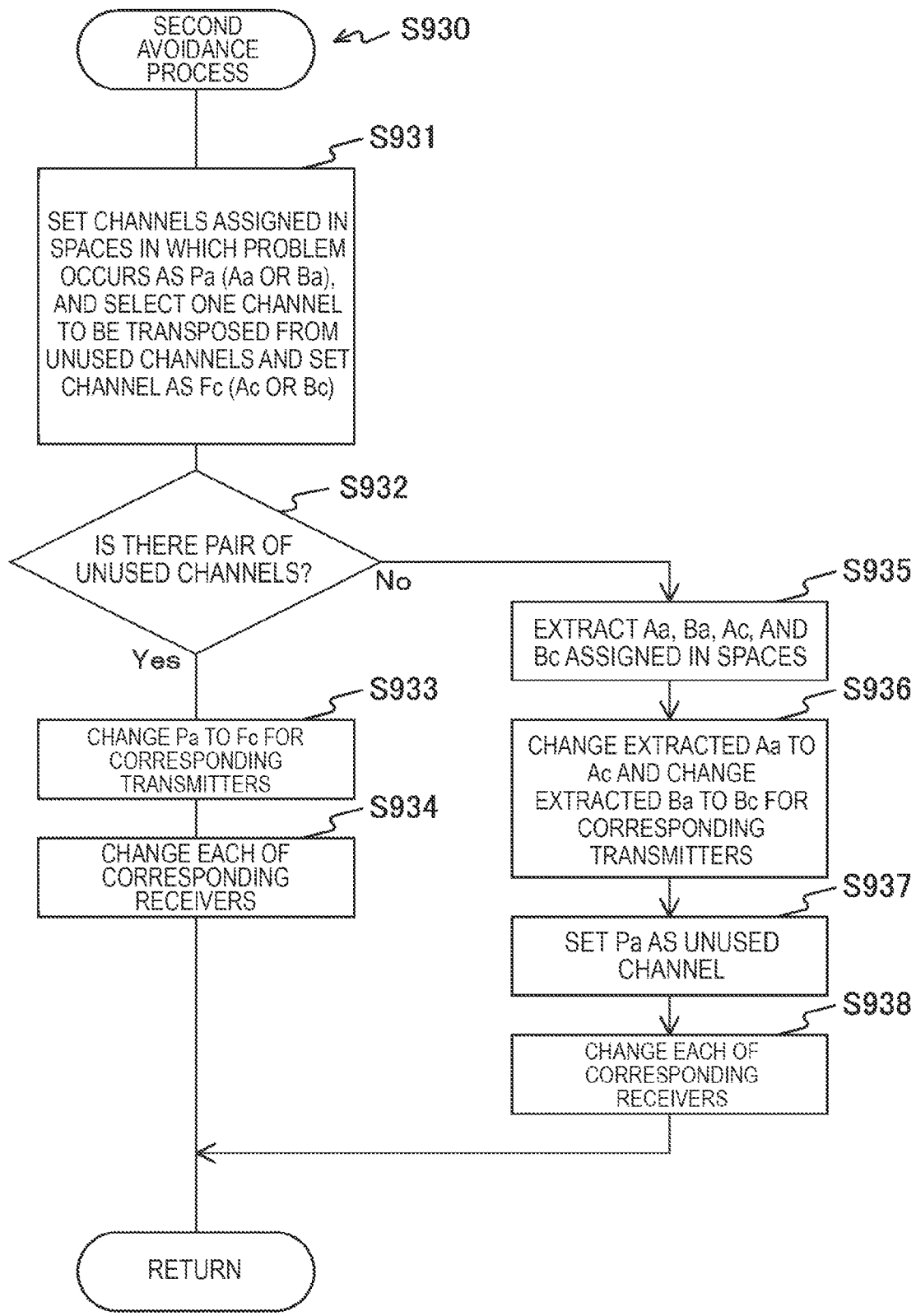
FIG. 17 is a flowchart illustrating a second avoidance process (the processing order of step S930 shown in FIG. 15) in the processing order of the channel assignment control process performed by the information processing device according to the first embodiment of the present technology.

FIG. 17 is a flowchart illustrating the second avoidance process (the processing order of step S930 shown in FIG. 15) in the processing order of the channel assignment control process performed by the information processing device 200 according to the first embodiment of the present technology.

First, the determination unit 240 sets, as Pa (Aa or Ba), the channel assigned in a space in which it is detected that the problem occurs (step S931). Further, the determination unit 240 selects one channel to be transposed from unused channels and sets the channel as Fc (Ac or Bc) (step S931).

Next, the determination unit 240 determines whether there is a pair of unused channels (for example, a pair of A5 and B5) (step S932). When there is a pair of unused channels (step S932), the determination unit 240 changes Pa to Fc for the corresponding spaces (step S933). In this case, the control unit 250 changes Pa to Fc for the transmitters disposed in the spaces (step S933). Next, the control unit 250 performs the corresponding change on each receiver used in the spaces (step S934).

Conversely, when there is no pair of unused channels (step S932), the determination unit 240 extracts Aa, Ba, Ac, and Bc from the channels assigned in the spaces (step S935). Next, the determination unit 240 changes the extracted channel Aa to Ac and changes the extracted channel Ba to Bc for the corresponding spaces (step S936). In this case, the control unit 250 changes the extracted channel Aa to Ac and changes the extracted channel Ba to Bc for the transmitters disposed in the spaces (step S936). In this case, since Pa is the unused channel, the information is stored in the assignment information storage unit 230 (step S937). Next, the control unit 250 performs the corresponding change on each receiver used in the spaces (step S938).

Here, setting the channel Pa to be transposed as the "unused channel Pa" in another space in the future in step S933 can be performed by simultaneously performing the following processes. First, all of the assigned channels Pa are extracted. Next, all of the extracted channels Pa are changed to Fc. Thus, the channels Pa can be set as the unused channels.

The case in which such a processing order is performed by the information processing device 200 has been described. However, for example, a part of the processing order may be performed by a user. That is, in the part of the processing order, each processing order may be performed by causing the user to operate a device. Further, when there is an unused channel in the order of the avoidance process shown in FIG. 15, the process of step S930 may be first performed. In this case, when the problem is not resolved in step S930, the avoidance processes of step S916 and step S920 are performed. Thus, the problem can be resolved.

Thus, according to the first embodiment of the present technology, the number of channels equal to or greater than the normally settable number of ch can be assigned to a collective of the spaces in which there is a high probability that the spaces have an influence on each other. That is, when the short-range wireless communications are simultaneously performed in the plurality of spaces, it is possible to appropriately set the channels to be used.

2. Second Embodiment

In the first embodiment of the present technology, the example in which the channels are assigned based on the assignment rules has been described. Here, since the transmitter includes two RF modules, audio data and caption data can be transmitted in different communication forms.

Thus, in a second embodiment of the present technology, an example in which audio data and caption data are transmitted in different communication forms will be described. The configuration of a communication system according to the second embodiment of the present technology is the same as the configuration shown in FIG. 1, etc. Therefore, the same reference numerals are given to constituent elements common to those of the first embodiment of the present technology, and the description thereof will be partially omitted.

[Channel in which there is No Influence of Wireless Fidelity (WiFi)]

Hereinafter, a channel in which there is no influence of WiFi will be described.

First, a method of estimating a channel covered with WiFi in the channels in compliance with IEEE 802.15.4 will be described.

As a method of estimating an interfering radio wave, for example, the following methods (1) and (2) are known.

The estimation method (1) is a method of measuring and determining packet loss (for example, a specific influence of audio interruption or the like in the audio data) by setting a channel for transmission and reception and performing the transmission and reception in practice.

The estimation method (2) is a method of measuring an interfering radio wave in a channel before transmission and determining that there is an interfering radio wave when the measured interfering radio wave is equal to or greater than a given value.

Next, a ZB channel for which there is no influence of WiFi will be described.

In Japan, since the 802.11b/g/n scheme has ch1 to ch13, a ZB channel which has an influence is changed depending on which channel is set.

For example, in the ZB channel of one WiFi channel, there is a probability that the 4-interval influence is present. For example, in 1ch of WiFi having a use band of 22 MHz, there is a probability that the influence is present in 11, 12, 13, and 14 of the ZB.

Since the band is effectively used in the general setting of WiFi, 1ch, 6ch, and 11ch are used in many cases. Therefore, when 1ch, 6ch, and 11ch are used as the WiFi setting, ZB15, ZB20, ZB25, and ZB26 can be set as channels in which there is no influence. Further, WiFi is an example of a specific wireless LAN described in the claims.

[Example of Structure of Assignment Table]

FIG. 18 is a diagram illustrating an example of channels set in a communication system 100 according to a second embodiment of the present technology. In the example shown in FIG. 18, two different wireless communications are simultaneously performed using one set channel.

Here, two different wireless communications are data communications in which one communication is consecutive data communication of audio data or the like and the other communication is relative discrete caption data or the like.

In the example shown in FIG. 18, channels (for example, a ZB correspondent CH (13) of audio data in A1 and a ZB correspondent CH (18) of caption data) are configured by a relation in which there is no simultaneous influence in channels of a single 802.11 wireless scheme.

Here, in an ISM band, there are many external interfering radio waves. In particular, since 802.11 wireless schemes are widely proliferated, it is necessary to consider interference from a wireless system of an 802.11 wireless scheme. Further, among 802.11 wireless schemes, authenticated schemes are referred to as WiFi.

Thus, in the second embodiment of the present technology, even when a channel is interfered by one 802.11 wireless system, the ZB correspondent channel relevant to the audio data and the ZB correspondent channel relevant to the caption data are both configured not to receive the influence of the interference.

For example, when WiFi-1ch becomes an interfering wave, the ZB-correspondent channels to be influenced are channels "11, 12, 13, and 14." Thus, in the second embodiment of the present technology, there is a probability that the audio data in the set channel A1 receives the influence in the ZB correspondent 13, but the caption data is configured not to receive the influence due to ZB correspondent 18.

For example, when the audio data is interfered and interruption thus occurs, the ZB correspondent 13 and the ZB correspondent 18 are transposed with each other in the set channel A1. Thus, the ZB correspondent channel of the audio data may not receive the influence of the interfering WiFi. Here, since the capacity of the caption data is dispersive, the fact that it is relatively difficult to receive the influence is used. Thus, by setting each channel and transposing the channels of the audio data and the caption data depending on the influence from the interfering WiFi, the influence from the interfering WiFi can be avoided. Therefore, the more stable communication system can be provided.

A transmitter can transmit audio data and predetermined data along a plurality of communication paths using different frequencies. Thus, in the multiple and simultaneous operation of wireless communication in a plurality of spaces, channels can be transposed when there is interference of a radio wave of another ISM band such as WiFi. Further, by preventing a problem from occurring in the multiple and simultaneous operation, the wireless communication can be appropriately performed.

[Example of Structure of Unused Assignment Table]

FIG. 19 is a diagram illustrating an example of unused channels in the communication system 100 according to the second embodiment of the present technology.

Here, it is also assumed that two antennas (two antennas connected to two RF modules) included in a receiver are installed to be relatively close. That is, it is assumed that the antennas for the audio data and the caption data are installed to be relatively close. In this case, as shown in FIG. 19, the same channel is preferably not assigned.

For example, when a combination of the audio data and the caption data is the same ZigBee correspondent CH (for example, the ZB correspondent CH is 11 for each), a packet of any one of the data is detected on the receiver side. Further, the data is discriminated by a difference in the ID of header information.

However, when the packet is detected, a time of the portion becomes a loss. Therefore, in the audio data which is consecutive and has a large communication capacity, the packet loss easily occurs. The packet loss can be covered by retransmission, but there is a concern that an interfering radio wave may occur in the partner by the stable degree obtained by increasing the retransmission. In a method present in the IEEE 802.15.4 standard (a gap transmission process by CCA and PAN-ID and a method of performing discrimination and output using an ID), there is a module which may not be completely controlled due to a deviation of an operational clock of a transmitter or the like. Therefore, this method is preferably not used.

That is, for example, since a sufficient communication path is preferably ensured for data such as audio data with a large communication capacity for stability, it is important to use no channel assignment shown in FIG. 19.

[Another Example of Channel Assignment]

Hereinafter, an example in which a total of fourteen combinations of transmitters and receivers to be set by assigning eleven channels to twenty six channels of the ZigBee (hereinafter referred to as ZB) correspondent channels complying with IEEE 802.15.4 will be described. In the fourteen combinations, audio data and caption data are independently transmitted. In this case, it is not necessary to interlock both data.

In the assignment, the above-described fourteen combinations are broadly classified into two of A and B with different rates, seven combinations of a rate A are referred to as A1 to A7 and seven combinations of a rate B are referred to as B1 to B7. Here, in regard to the rates, two rates can be selected from, for example, 250 kbps, 500 kbps, 667 kbps, 1 Mbps, and 2 Mbps and used as the rates A and B. For example, 1 Mbps can be set as the rate A and 500 kbps can be set as the rate B. For example, 250 kbps can be set as the rate A and 500 kbps can be set as the rate B.

A1 of the series A (A1 to A7) and B1 of the series B (B1 to B7) are the same ZB correspondent channel. However, as described above, the channels have a relation in which the channels may not be mutually detected. Further, an ID may be added to each of 14 combinations×2 (2 of the audio data and the caption data). In this case, completely non-identical channels can be assigned to 14 combinations×2.

Specific examples of the channel assignment are shown in FIGS. 20 to 23.

FIGS. 20 to 23 are diagrams illustrating examples of channels set in the communication system 100 according to the second embodiment of the present technology. In the examples shown in FIGS. 20 to 23, two different wireless communications are simultaneously performed using one set channel.

FIG. 20 shows an example in which different ZB correspondent channels are set for the audio data and the caption data. In this case, the receivers can independently receive the audio data and the caption data by changing the reception channel.

Here, when the multiple and simultaneous operation is performed, different settings of the fourteen combinations may not be performed using only a single rate. For example, when the completely identical channel is assigned, there is a large restriction on the multiple and simultaneous operation. That is, when the channel is completely identical, a considerable distance has to be ensured to avoid a concern that an unnecessary different communication may be detected and reproduced.

Thus, in the example shown in FIG. 20, the identical channel is used using different rates (the rates A and B). By doing so, the above-described restriction can be largely eased. That is, since the channel can be regarded as an interfering radio wave, a signal intensity difference by which the interfering radio wave can be discriminated and reproduced is set. Thus, by performing channel assignment shown in FIG. 20, it is possible to stably transmit two pieces of information at the time of the multiple and simultaneous operation.

FIG. 21 shows an example in which the ZB channels for the audio data and the caption data are assigned separately.

For example, in the ISM band, there are many interfering radio waves from the outside. In particular, since an 802.11 wireless scheme as represented by WiFi is widely proliferated, it is important to consider the interference from the same scheme. Therefore, in the example shown in FIG. 21, when interference occurs due to the single same scheme, the channels are assigned so that the channel relevant to the audio data and the channel relevant to the caption data are not both simultaneously influenced. For example, when WiFi-1ch interferes, the ZB correspondent channels that are likely to be influenced are channels "11, 12, 13, and 14." Thus, in setting A1 of the example shown in FIG. 21, there is a probability that the audio data is influenced in ZB13, but the caption data is not influenced in ZB18. Thus, by performing the channel assignment shown in FIG. 20, the more stable system can be realized.

FIG. 22 shows an example in which channels (25 and 26) assigned for the caption data are aggregated in sevens. By doing so, for example, in B1, reception can be performed in another ZB correspondent channel.

For example, the caption data has a considerably smaller packet size than the audio data. Therefore, for example, even when retransmission is performed a plurality of times for stability, a small percentage is considered to be necessary as the communication capacity. Therefore, as shown in FIG. 22, a single rate is used and the channels for the caption data are aggregated when the audio data and the caption data are communicated simultaneously and individually. Thus, the stable wireless communication can be performed at the time of the multiple and simultaneous operation.

FIG. 23 shows an example of combinations in which the same channel in each set CH is assigned but rates are different for the audio data and the caption data. That is, in the example shown in FIG. 23, communication of the audio data and the caption data is performed using the ZB correspondent 11CHs which are the same channel, for example, in AB1. However, both are not mutually detected since the rates of both are different from each other. Therefore, in the ZB correspondent 11 relevant to the audio data, the ZB correspondent 11 relevant to the caption data is regarded as an interfering radio wave, and thus even ID discrimination may not be performed. Thus, in the example shown in FIG. 23, it is not necessary to discriminate the ID, and the audio data and the caption data can be distinguished from each other.

Thus, the transmitter can transmit the audio data and the predetermined data along a plurality of communication paths using different communication rates.

[Setting Example of Channels of Transmitter and Receiver]

FIGS. 24a and 24b are diagrams illustrating examples of channel setting of a transmitter and a receiver according to the second embodiment of the present technology. FIGS. 24a and 24b show setting examples when the channel assignment shown in FIG. 21 is performed.

FIG. 24a shows the setting example in the transmitter and FIG. 24b shows the setting example in the receiver. As shown in FIGS. 24a and 24b, the channels are set so that the transmitter and the receiver belong to the same combination.

Here, as described in the first embodiment of the present technology, the case in which one RF module (wireless unit) is installed in the receiver has been assumed. In this case, a switch unit of the audio data and the caption data can be installed in the receiver. The switch unit can switch the data received by one RF module. Specifically, for example, an application necessary for audio and an application necessary independently only for data (for example, caption) are switched.

As will be described in modification examples (shown in FIGS. 45 and 46), two RF modules (wireless units) may be installed in the receiver. In this case, an application using both audio data and caption data can be realized.

Thus, according to the second embodiment of the present technology, even when the capacity of a communication path corresponding to one ch is insufficient, ch assignment can be appropriately set using two combinations of the communication paths. That is, when the short-range wireless communications are simultaneously performed in the plurality of spaces, the channels to be used can be appropriately set.

3. Third Embodiment

In the first embodiment of the present technology, the example in which the channels in the spaces in which a problem occurs are transposed has been described. Here, for example, since the WiFi standard is different in each country, it is necessary to appropriately set the channels to be transposed in spaces in which WiFi interference occurs.

Thus, in a third embodiment of the present technology, an example in which channels to be transposed are set in consideration of WiFi interference will be described. The configuration of the communication system according to the third embodiment of the present technology is substantially the same as the example shown in FIG. 1 and the like. Therefore, the same reference numerals are given to constituent elements common to those of the first embodiment of the present technology, and the description thereof will be partially omitted.

[Example of Structure of Assignment Table]

FIG. 25 is a diagram illustrating an example of channels set in a communication system 100 according to a third embodiment of the present technology. The example shown in FIG. 25 is a modification example in which FIG. 21 is partially modified.

Specifically, for the audio data, ZB channel 23 distant from the groups of A1 to A5 and B1 to B5 is set in a pair of A6 and B6 assigned to a space in which a problem occurs. Further, ZB channel 19 is assigned to a pair of A5 and B5. ZB channel 21 is assumed not to be assigned.

Figure 26:
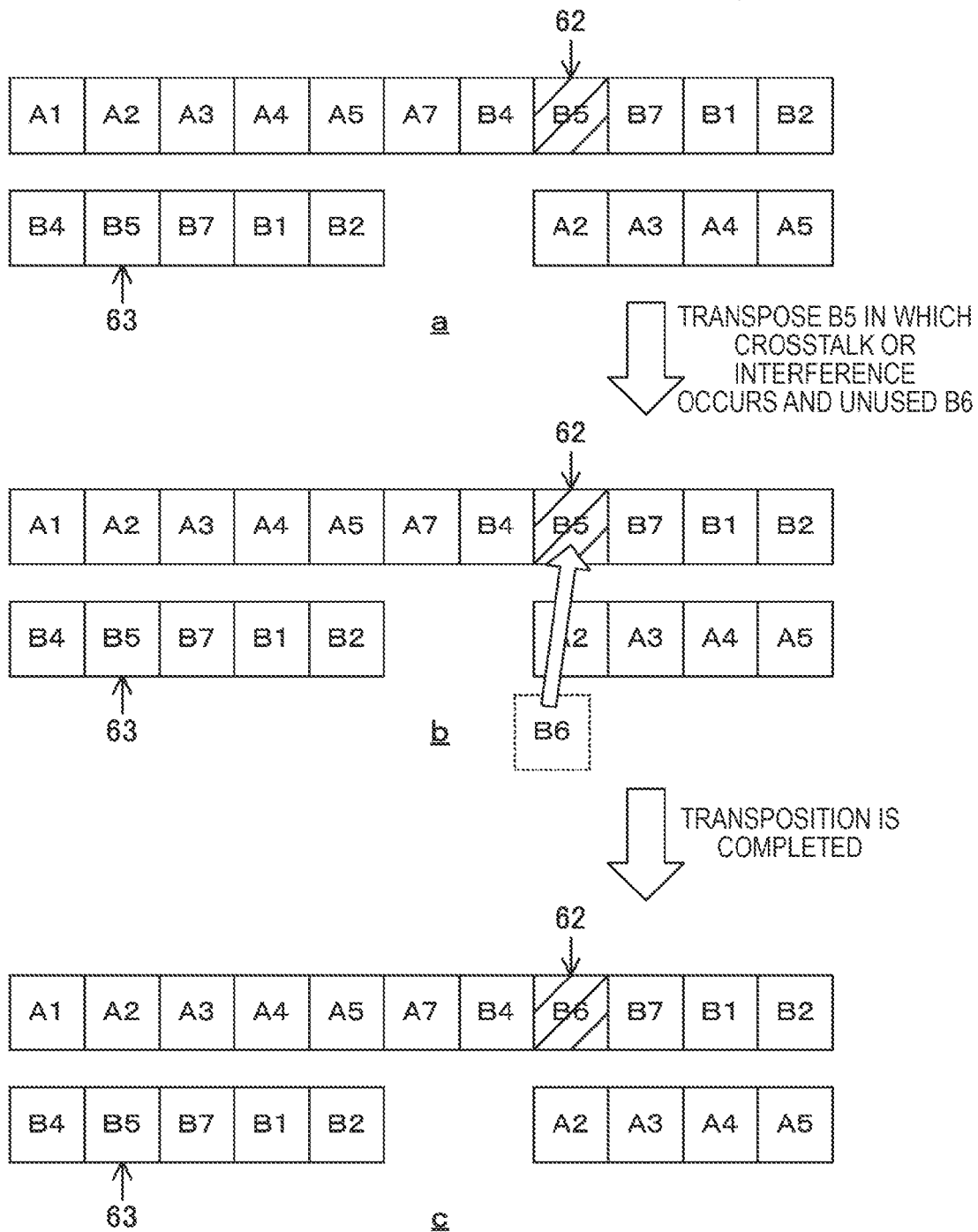
FIGS. 26a to 26c are diagrams illustrating the flow of a method of avoiding crosstalk or interference by the determination unit according to the third embodiment of the present technology.

Here, a case in which a problem occurs in audio in the space (a space right adjacent to the space indicated by the arrow 60) to which the channel B5 shown in FIG. 13*a* is assigned is assumed using the assignment table shown in FIG. 21. In the assignment table shown in FIG. 21, B5 is CH21 assigned for the audio data and B6 to be transposed is CH23. In this case, when it is assumed that an interfering wave is WiFi and the channel is WiFi-11, a problem may not be resolved even by transposing to B6 in some cases. Even in this case, the problem can be resolved by using the assignment table shown in FIG. 25 and transposing the channel to a special unused channel. This example is shown in FIG. 26.

[Avoidance Example of Crosstalk and Interference]

FIGS. 26*a* to 26*c* are diagrams illustrating the flow of a method of avoiding crosstalk or interference by the determination unit 240 according to the third embodiment of the present technology. Since the example shown in FIGS. 26*a* to 26*c* is a modification example of FIGS. 13*a* to 13*c*, the same reference numerals are given to portions common to those shown in FIGS. 13*a* to 13*c* and the description thereof will not be repeated.

In FIGS. 26*a* to 26*c*, a case in which audio interruption occurs in the space (indicated by an arrow 62) to which the channel B5 is assigned is assumed. A case in which there are unused channels (A6, B6, and the like) is assumed. Even when caption fragmentation occurs, the avoidance process is the same, and thus the description thereof will not be repeated.

When the channel assigned in a space in which the crosstalk or interference is to be avoided is the series B (B5), as in FIG. 26*a* the channel (B5) is transposed with the unused channel (B6) of the series B. Specifically, as shown in FIG. 26*b*, the channel (B5) assigned in the rectangle indicated by diagonal lines therein and the unused channel (B6) of the series B are transposed with each other.

Here, the unused channel of the series B may be assigned in any space. This is because, since the channel (A6) having the paired relation with the unused channel (B6) of the series B is also unused, the same ZB channel having a rate different from the rate of the unused channel (B6) of the series B is not present.

As shown in FIG. 26*a*, the channel (B5) which is completely identical with the channel B5 (indicated by an arrow 62) in which the crosstalk or interference occurs is assigned in another space (indicated by an arrow 63). Therefore, the number of unused channels decreases by transposing the channel B5 (indicated by the arrow 62) in which the crosstalk or interference occurs with the unused channel (B6) of the series B. Further, the transposition of B6 can be also performed in a space indicated by an arrow 63 in addition to the space indicated by the arrow 62. That is, in FIG. 26*a*, since the channel in which crosstalk or interference occurs is B5, all of B5 in the spaces in FIG. 26*a* may be extracted and may be transposed with B6.

Thus, by performing the transposition, the basic assignment rules can be automatically maintained. That is, by performing the transposition in this way, the configuration can be realized without mutual interruption in the channels assigned in advance.

When the transposition ends, it is confirmed that the audio interruption or caption fragmentation does not occur in the transposed channels at the time of turning on the power of the entire cineplex. In this case, on a receiver side, the settings are reflected only for the receivers in which the channel B5 to be set is changed. Then, in all of the movie theaters, the avoidance process ends when it is confirmed that no problem occurs.

Thus, B5 in which the problem occurs is CH19 for the audio data and B6 to be transposed is CH23. Here, as described above, in the ZB channel of one WiFi channel, there is a probability that the 4-interval influence is present when the use band of WiFi is a 22 MHz band. However, in the example shown in FIGS. 26*a* to 26*c*, WiFi interference does not simultaneously occur in CH19 and CH23, since the gap between CH19 and CH23 is larger than four intervals. Specifically, the four intervals including CH19 are CH19 to CH22 and four intervals including CH23 are CH20 to CH23, WiFi interference does not simultaneously occur in CH19 and CH23.

Next, a case in which substitution of another channel is performed using the assignment table shown in FIG. 25 will be described. For example, when the WiFi interference occurs in B1 to B5, the WiFi interference can be avoided by transposing the channel of the space and the unused channel B6. Further, A6 is also set as a pair and the unused channel, but A6 can be likewise avoided even using A6.

For example, when the WiFi interference occurs in A1 to A5, the WiFi interference can be avoided by transposing the space and the unused channel A6. Further, B6 is also set as a pair and the unused channel, but B6 can be likewise avoided even using B6.

Here, the standards of some countries are shown in (a) to (h) as references of the present technology.

(a) Japan (Telecom Engineering Center (TELEC) and other accreditation organizations)

2.412 to 2.472 GHz, 13 channels (orthogonal frequency division multiplexing (OFDM))

2.412 to 2.484 GHz, 14 channels (complementary code keying (CCK)) where only ch14=11b can be used) (b) US (FCC) US Federal Communications Commission (FCC)

2.412 to 2.462 GHz, 11 channels (c) North America (excluding FCC) IC (Canada)

2.412 to 2.462 GHz, 11 channels (d) European Telecommunications Standards Institute (ETSI)

2.412 to 2.472 GHz, 13 channels (e) China 2.412 to 2.472 GHz, 13 channels (f) Korea 2.412 to 2.472 GHz, 13 channels (g) Singapore 2.412 to 2.472 GHz, 13 channels (ETSI) (h) Taiwan 2.412 to 2.462 GHz, 11 channels (FCC)

Next, A7 and B7 in the assignment table shown in FIG. 25 will be described. As shown in FIG. 25, the audio data of A7 and B7 are CH25. Here, as described above, the frequency permitted in each country is different. In the US FCC standard, the North America and Canada IC standard, and the Taiwan standard, the channels of WiFi are 11 channels. Therefore, originally, CH25 of A7 and B7 is a channel which does not receive the WiFi interference.

As each standard described above is shown in the assignment table shown in FIG. 25, the interference can be avoided by transposing the unused channels B6 and A6 in any space in which the WiFi interference occurs in the US, Canada, and Taiwan.

[Application Example in Japan, Europe, and the Like]

Next, an application example in Japan, Europe, and the like will be described.

[Example of Structure of Assignment Table]

FIG. 27 is a diagram illustrating an example of channels set in the communication system 100 according to the third embodiment of the present technology. The example shown in FIG. 27 is a modification example in which FIG. 21 is partially modified.

Specifically, for the audio data, ZB channel 25 distant from the groups of A1 to A6 and B1 to B6 is set in a pair of A7 and B7 assigned to a space in which a problem occurs. Further, ZB channel 21 is assigned to a pair of A6 and B6. ZB channel 23 is assumed not to be assigned.

[Assignment Example of Channels]

Figure 28:
FIGS. 28a and 28b are diagrams illustrating assignment examples of the channels in the communication system according to the third embodiment of the present technology.

FIGS. 28a and 28b are diagrams illustrating assignment examples of the channels in the communication system 100 according to the third embodiment of the present technology. Since the example shown in FIGS. 28a and 28b is a modification example of FIGS. 10d and 10e, the same reference numerals are given to portions common to those shown in FIGS. 10a to 10f and the description thereof will be partially omitted. The determination of the assignment is performed through the assignment determination process performed by the determination unit 240.

In the example shown in FIGS. 28a and 28b, A7 and B7 shown in FIGS. 10e and 10e are changed to A6 and B6 to set A7 and B7 as unused channels. Specifically, A7 shown in FIGS. 10d and 10e is changed to A6 and B7 shown in FIGS. 10d and 10e is changed to B6. Further, a dotted rectangle 78 shown in FIG. 28a corresponds to the dotted rectangle 77 shown in FIG. 10d. An arrow 64 shown in FIG. 28a corresponds to the arrow 60 shown in FIG. 10e.

[Avoidance Example of Crosstalk and Interference]

Figure 29:
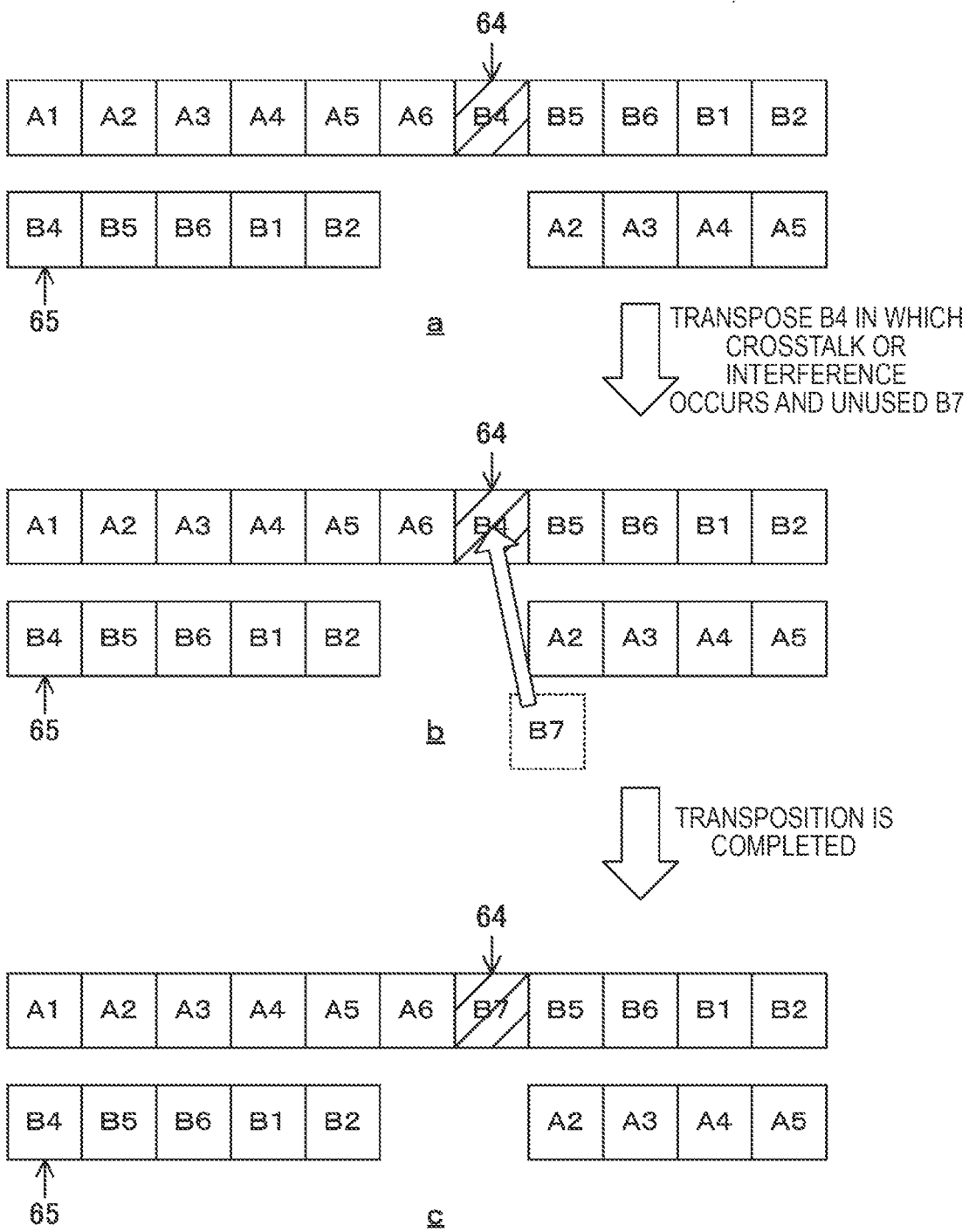
FIGS. 29a to 29c are diagrams illustrating the flow of a method of avoiding crosstalk or interference by the determination unit according to the third embodiment of the present technology.

FIGS. 29a to 29c are diagrams illustrating the flow of a method of avoiding crosstalk or interference by the determination unit 240 according to the third embodiment of the present technology. The assignment of the channels shown in FIG. 29a is the same as the assignment shown in FIG. 28b. Further, since the example shown in FIGS. 29a to 29c is a modification example of FIGS. 13d to 13c, the same reference numerals are given to portions common to those shown in FIGS. 13a to 13c and the description thereof will not be repeated.

In FIGS. 29a to 29c, a case in which audio interruption occurs in the space (indicated by an arrow 64) to which the channel B4 is assigned is assumed. A case in which there are unused channels (A7, B7, and the like) is assumed. Even when caption fragmentation occurs, the avoidance process is the same, and thus the description thereof will not be repeated.

When the channel assigned in a space in which the crosstalk or interference is to be avoided is the series B (B4), as in FIG. 29a the channel (B4) is transposed with the unused channel (B7) of the series B. Specifically, as shown in FIG. 29b, the channel (B4) assigned in the rectangle indicated by diagonal lines therein and the unused channel (B7) of the series B are transposed with each other.

Here, the unused channel of the series B may be assigned in any space. That is, since the channel (A7) having the paired relation with the unused channel (B7) of the series B is also unused, the degree of freedom of the unused channel (B7) of the series B is enhanced. This is because, since the channel (A7) having the paired relation with the unused channel (B7) of the series B is also unused, the same ZB channel having a rate different from the rate of the unused channel (B7) of the series B is not present.

As shown in FIG. 29a, the channel (B4) which is completely identical with the channel B4 (indicated by an arrow 64) in which the crosstalk or interference occurs is assigned in another space (indicated by an arrow 65). Therefore, the number of unused channels decreases by transposing the channel B4 (indicated by the arrow 64) in which the crosstalk or interference occurs with the unused channel (B7) of the series B. Further, the transposition of B7 can be also performed in a space indicated by an arrow 65 in addition to the space indicated by the arrow 64. That is, in FIG. 29a, since the channel in which crosstalk or interference occurs is B4, all of B4 in the spaces in FIG. 29a may be extracted and may be transposed with B7.

Thus, by performing the transposition, the basic assignment rules can be automatically maintained. That is, by performing such transposition, the channels assigned in advance can be configured not to interfere with each other.

When the transposition ends, it is confirmed that the audio interruption or caption fragmentation does not occur in the transposed channels at the time of turning on the power of the entire cineplex. In this case, on a receiver side, the settings are reflected only for the receivers in which the channel B4 to be set are changed. Then, in all of the movie theaters, the avoidance process ends when it is confirmed that no problem occurs. In this example, a pair of B7 and A7 are set as the unused channels, but the same avoidance can be realized even when A7 is used instead of B7 described above.

Here, among A1 to A6, the channel which is the closest to the unused A7 (that is, CH25) is CH21 of A6. Further, among B1 to B6, the channel which is the closest to the unused B7 (that is, CH25) is CH21 of B6. When a problem occurs in the closest A6, the channel for the audio data is CH21 and A7 to be transposed is CH25. Here, as described above, in the ZB channel of one WiFi channel, there is a probability that the 4-interval influence is present when the use band of WiFi is a 22 MHz band. However, in the example shown in FIGS. 29a to 29c, WiFi interference does not simultaneously occur in CH21 and CH25, since the gap between CH21 and CH25 is larger than four intervals. Specifically, the four intervals including CH21 are CH21 to CH24, four intervals including CH25 are CH22 to CH25, and WiFi interference does not simultaneously occur in CH21 and CH25. Eventually, when the WiFi interference occurs in each space shown in FIGS. 29a to 29c, the WiFi interference can be avoided by transposing the unused channels A7 and B7.

Thus, by using the assignment table shown in FIG. 27, the interference can be avoided by transposing the unused channels B7 and A7 in any space in which the WiFi interference occurs.

Here, a modification example in which CH=11 is set as CH distant from a group is shown in FIG. 30.

[Example of Structure of Assignment Table]

FIG. 30 is a diagram illustrating an example of channels set in the communication system 100 according to the third embodiment of the present technology. The example shown in FIG. 30 is a modification example in which FIG. 21 is partially modified.

Specifically, for the audio data, ZB channel 11 distant from the groups of A2 to A7 and B2 to B7 is set in a pair of A1 and B1 assigned to a space in which a problem occurs. No pair is assigned to ZB channel 13. Further, the avoidance example of the interference and crosstalk when the assignment table shown in FIG. 30 is used can be applied to the avoidance of the interference and crosstalk when the assignment table shown in FIG. 27 is used.

[Example of Process of Information Processing Device]

Next, a process of an information processing device 200 according to the third embodiment of the present technology will be described with reference to the drawings.

Figure 31:
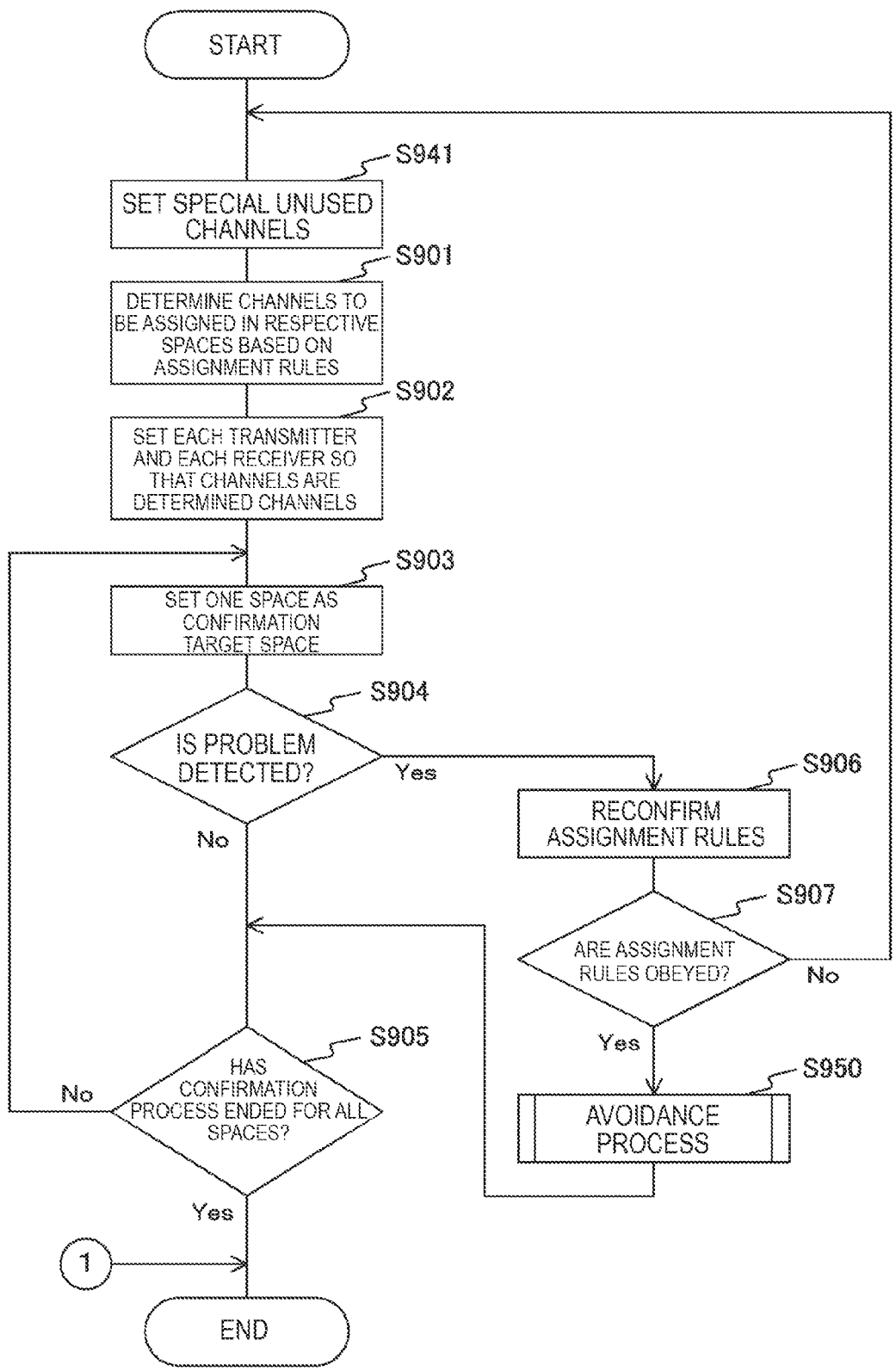
FIG. 31 is a flowchart illustrating an example of the processing order of a channel assignment control process performed by an information processing device according to the third embodiment of the present technology.

FIG. 31 is a flowchart illustrating an example of the processing order of a channel assignment control process performed by the information processing device 200 according to the third embodiment of the present technology. Since FIG. 31 is a modification example of FIG. 14, the same reference numerals are given to portions common to those shown in FIG. 14 and the description thereof will not be repeated.

First, the determination unit 240 sets a special unused channel (step S941). For example, when the assignment table shown in FIG. 25 is used, a pair of A6 and B6 is set as the special unused channels. For example, when the assignment table shown in FIG. 27 is used, a pair of A7 and B7 is set as the special unused channels. For example, when the assignment table shown in FIG. 30 is used, a pair of A1 and B1 is set as the special unused channels.

When the assignment rules are obeyed (step S907), an avoidance process is performed (step S950). The avoidance process will be described in detail with reference to FIG. 32.

Figure 32:
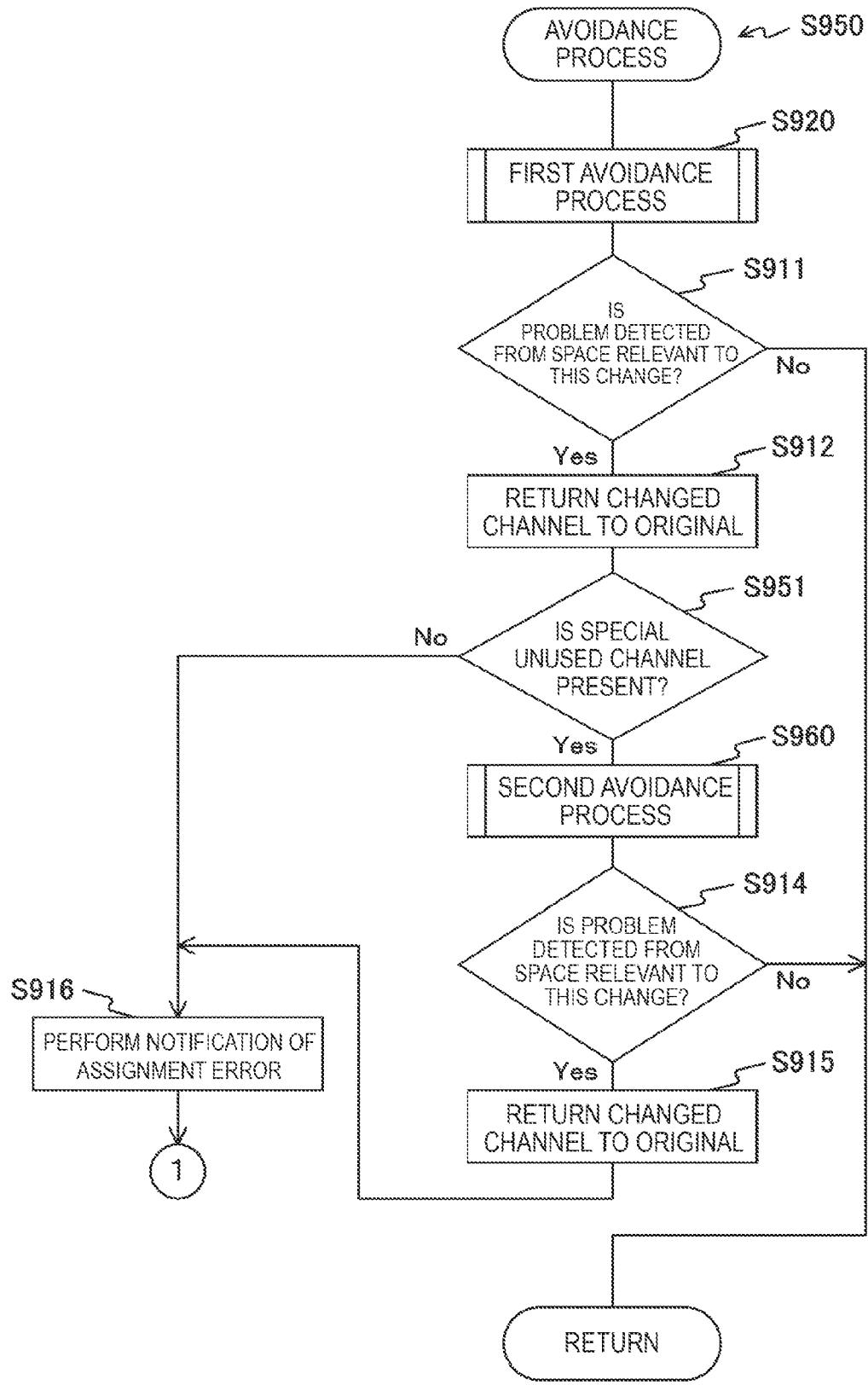
FIG. 32 is a flowchart illustrating an avoidance process (the processing order of step S950 shown in FIG. 31) in the processing order of the channel assignment control process performed by the information processing device according to the third embodiment of the present technology.

FIG. 32 is a flowchart illustrating the avoidance process (the processing order of step S950 shown in FIG. 31) in the processing order of the channel assignment control process performed by the information processing device 200 according to the third embodiment of the present technology. Since FIG. 32 is a modification example of FIG. 15, the same reference numerals are given to portions common to those shown in FIG. 15 and the description thereof will not be repeated.

After a returning process of returning the changed channel to the original is performed (step S912), the control unit 250 determines whether the unused channel is present between the special unused channels based on the assignment information stored in the assignment information storage unit 230 (step S951).

When the unused channel is not present (step S951), a user is notified of an assignment error due to the fact that it is difficult to avoid the problem (step S916). Conversely, when the unused channel is present (step S951), a second avoidance process is performed (step S960). The second avoidance process will be described in detail with reference to FIG. 33.

Figure 33:
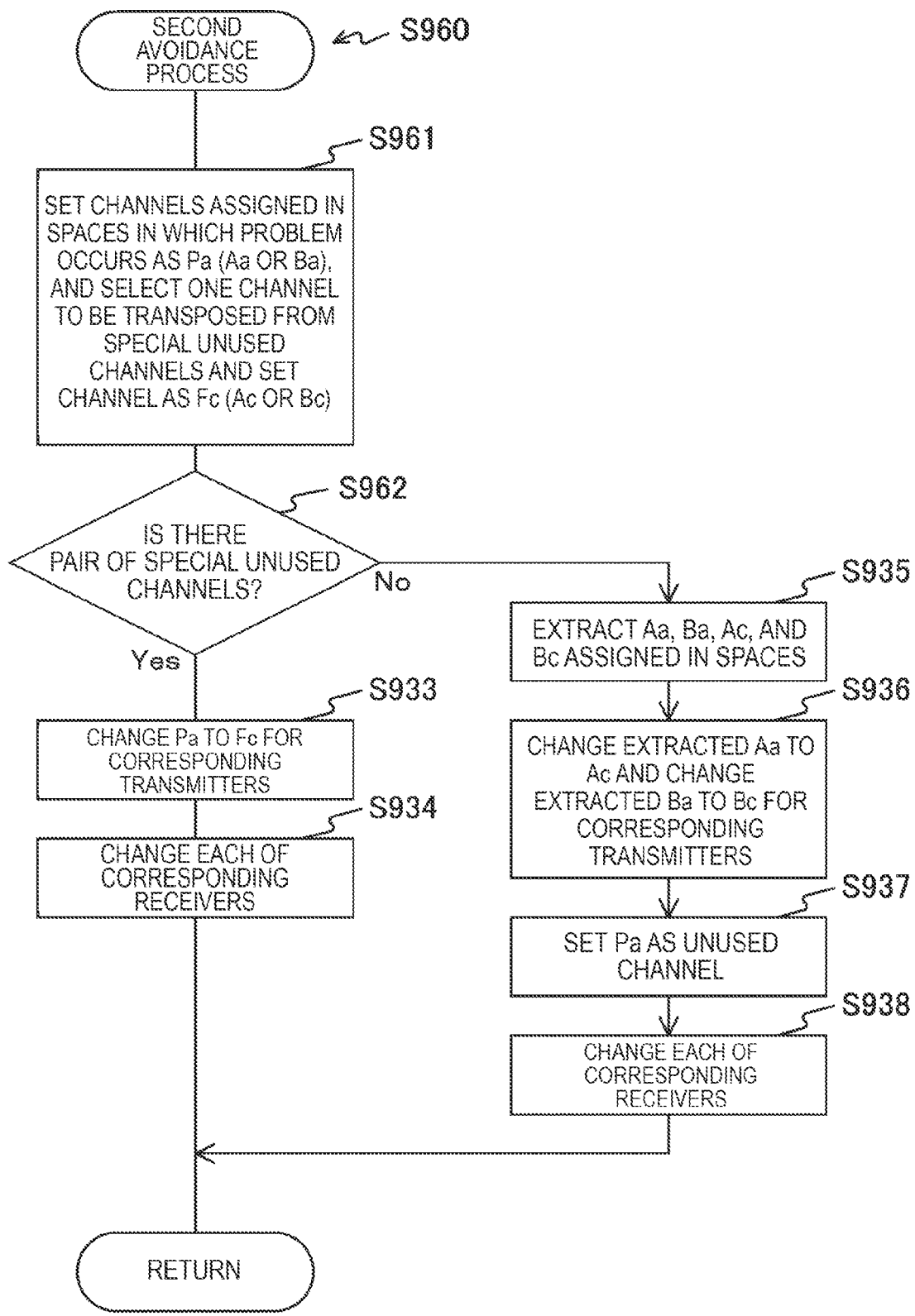
FIG. 33 is a flowchart illustrating a second avoidance process (the processing order of step S960 shown in FIG. 32) in the processing order of the channel assignment control process performed by the information processing device according to the third embodiment of the present technology.

FIG. 33 is a flowchart illustrating the second avoidance process (the processing order of step S960 shown in FIG. 32) in the processing order of the channel assignment control process performed by the information processing device 200 according to the third embodiment of the present technology. Since FIG. 33 is a modification example of FIG. 17, the same reference numerals are given to portions common to those shown in FIG. 17 and the description thereof will be partially omitted.

First, the determination unit 240 sets, as Pa (Aa or Ba), the channel assigned in a space in which it is detected that the problem occurs (step S961). Further, the determination unit 240 selects one channel to be transposed from the special unused channels (unused channels) and sets the channel as Fc (Ac or Bc) (step S961).

Next, the determination unit 240 determines whether there is a pair of unused channels (for example, a pair of A7 and B7) (step S962). When there is a pair of unused channels (step S962), the determination unit 240 changes Pa to Fc for the corresponding spaces (step S933). Conversely, when there is no pair of unused channels (step S962), the determination unit 240 extracts Aa, Ba, Ac, and Bc from the channels assigned in the spaces (step S935).

Thus, according to the third embodiment of the present technology, the frequency in the previous stage of the ch initial setting and the assignment of ch can be appropriately set. That is, with regard to the channel assignment, when fourteen channels are assigned in terms of the specification of a receiver, unused channels (the special unused channels) at the time of screen assignment are determined in advance. Further, the assignment of the special unused channels is determined by separating the frequency from another use channel group. Specifically, in the assignment of ZigBee correspondent CH, "one skip" is allowed in the middle. For example, in the example shown in FIG. 25, CH23 is used as assignment CH excluding CH21. Further, the unused channels (the special unused channels) to be transposed can be set using ch which is not a middle channel and is an end channel and which is not assigned to the own neighbor channel. For example, in the example shown in FIG. 30, CH11 can be used an assignment CH excluding CH13. Thus, ch that has no influence on any of the substitutions is set as an unused ch (special unused channel).

Thus, in the third embodiment of the present technology, the combination can be appropriately set so that the use ch does not overlap a predetermined channel of WiFi. That is, appropriate countermeasures can be possible even when the satisfactory quality of WiFi may not be maintained after the setting. Therefore, even when a problem occurs due to the influence of WiFi in any of the use channels, the interference of WiFi can be reliably avoided through substitution using the special unused channel. That is, when the short-range wireless communications are simultaneously performed in the plurality of spaces, the channels to be used can be appropriately set.

4. Fourth Embodiment

In the first to thirds embodiment of the present technology, the example in which A and B are used as the channel assignments has been described. However, the same applies when something other than A and B is used. For example, the same applies when A, B, and C are used as the channel assignments (here, A, B, and C have different communication rates). For example, when the number of assignments is twenty one, A can be set as seven, B can be set as seven, and C can be set as seven. Further when the number of assignments is twelve, A can be set as four, B can be set as four, and C can be set as four. Furthermore, the number of assignments may not necessarily be identical for A, B, and C.

In a fourth embodiment of the present technology, an example in which A, B, and C are used as channel assignment will be described. The configuration of the communication system according to the fourth embodiment of the present technology is substantially the same as the configuration shown in FIG. 1 and the like. Therefore, the same reference numerals are given to constituent elements common to those of the first embodiment of the present technology, and the description thereof will be partially omitted.
[Example of Structure of Assignment Table]

FIG. 34 is a diagram illustrating an example of channels set in a communication system 100 according to a fourth embodiment of the present technology. In the example shown in FIG. 34, an assignment example of A, B, and C is shown under the condition that the number of CHs to be set is fourteen.

The same CH (11) is assigned to A1, B1, and C1 for the audio data. Likewise, when letters are different but the suffixed number is the same, the same CH is assigned.

At this time, CH19, 21, and 23 are opened for the assignment of the audio data which is likely to be interfered from WiFi. Thus, as described above, in at least ch-8, 9, 10, and 11 of WiFi, there is no interference in an overlapping manner with the assignment channels shown in FIG. 34. Specifically, ch-8 of WiFi is four intervals of CH18, 19, 20, and 21, and ch-9 of WiFi is four intervals of CH19, 20, 21, and 22. Further, ch-10 of WiFi is four intervals of CH20, 21, 22, and 23 and ch-11 of WiFi is four intervals of CH21, 22, 23, and 24. That is, the interference of WiFi can be appropriately avoided.
[Assignment Example of Channels]

FIGS. 35a and 35b are diagrams illustrating assignment examples of the channels in the communication system 100 according to the fourth embodiment of the present technology. Since the example shown in FIGS. 35a and 35b is a modification example of FIGS. 10c and 10d, the description of portions common to those of FIGS. 10a to 10f will be partially omitted. The determination of the assignment is performed through an assignment determination process performed by the determination unit 240.

Next, assignment rules will be described mainly with reference to FIG. 35a. For example, a group (first group) constituted by A, B, and C is indicated by dotted rectangles 81 and 84. A group (second group) constituted by A, B, and C is indicated by dotted rectangles 82 and 83. Thus, a group (indicated by a dotted rectangle 85) constituted by twelve channels is formed. After the first group 81 and the second group 82, the lines of first and second groups are transposed and assigned.

Next, assignment rules will be described mainly with reference to FIG. 35b. For example, a group (first group) constituted by A and C is indicated by dotted rectangles 91 and 94. A group (second group) constituted by B and C is indicated by dotted rectangles 92 and 93. Thus, a group (indicated by a dotted rectangle 95) constituted by twelve channels is formed. After the first group 91 and the second group 92, the lines of first and second groups are transposed and assigned.

Thus, in the assignment examples shown in FIGS. 35a and 35b, the basic assignment rules (1) to (3) are obeyed. Further, the assignment is achieved so that the condition shown in FIG. 11b is clear.
[Example of Structure of Assignment Table]

FIG. 36 is a diagram illustrating an example of channels set in the communication system 100 according to the fourth embodiment of the present technology. FIG. 36 shows an application example of FIG. 34.

When the use ch is assumed to be CH15, 17, 19, 21, and 25 for the audio data, there is no mutual influence in ch-1 of WiFi. In FIG. 36, WiFi does not overlap even for the caption data. Specifically, in ch-1 of WiFi, there is mutual influence with four intervals of CH11, 12, 13, and 14. That is, in the application example shown in FIG. 36, none of the caption data and the audio data is influenced at all from ch-1 of WiFi.

In the examples shown in FIGS. 34 to 36, combinations of A5, B5, and C4 are set as unused CHs. In this case, the avoidance examples (shown in FIGS. 12a to 12d and FIGS. 13a to 13c) at the time of the occurrence of crosstalk or interference described in the first embodiment of the present technology can be applied.

Thus, in the fourth embodiment of the present technology, the channel assignments using three different rates and the standard assignment examples of these channels have been described. The above-described basic assignment rules can be obeyed and coexist with predetermine channels of WiFi. That is, even when the number of channels is very small, three speeds of A, B, and C can be selected. Further, by using three rates, the simultaneous operation can be realized without mutual interference with the predetermined channels of WiFi.

For example, when three or more same frequency channels are used as a plurality of channel assignments in the system that performs the multiple and simultaneous operation within the same section such as a movie theater, a case (a relation among A, B, and C) in which the channels are not mutually recognized is assumed. In this case, in the fourth embodiment of the present technology, the assignment is performed in the determined frequency area in the assignment of ZigBee correspondent CH and an unused frequency area is set. Thus, the simultaneous operation with WiFi can be realized using A to C (A, B, and C have different communication rates) as the channel assignment. That is, when the short-range wireless communications are simultaneously performed in the plurality of spaces, the channels to be used can be appropriately set.

5. Fifth Embodiment

The examples in which the channels to be used in the spaces on the same floor are set have been described in the first to fourth embodiments of the present technology. Here, among large-scale cineplexes, there are also cineplexes in which movie theaters (theaters) are disposed on a plurality of floors. Thus, even when the movie theaters (theaters) are disposed on the plurality of floors, it is important to appropriately set channels to be used in spaces.

Accordingly, in a fifth embodiment, an example in which the channels to be used in the spaces assigned in the plurality of floors are appropriately set will be described. The configuration of a communication system according to the fifth embodiment of the present technology is substantially the same as the configuration shown in FIG. 1, etc. Therefore, the same reference numerals are given to constituent elements common to those of the first embodiment of the present technology, and the description thereof will be partially omitted.

[Example of Configuration of Movie Theaters (Theaters)]

Figure 37:
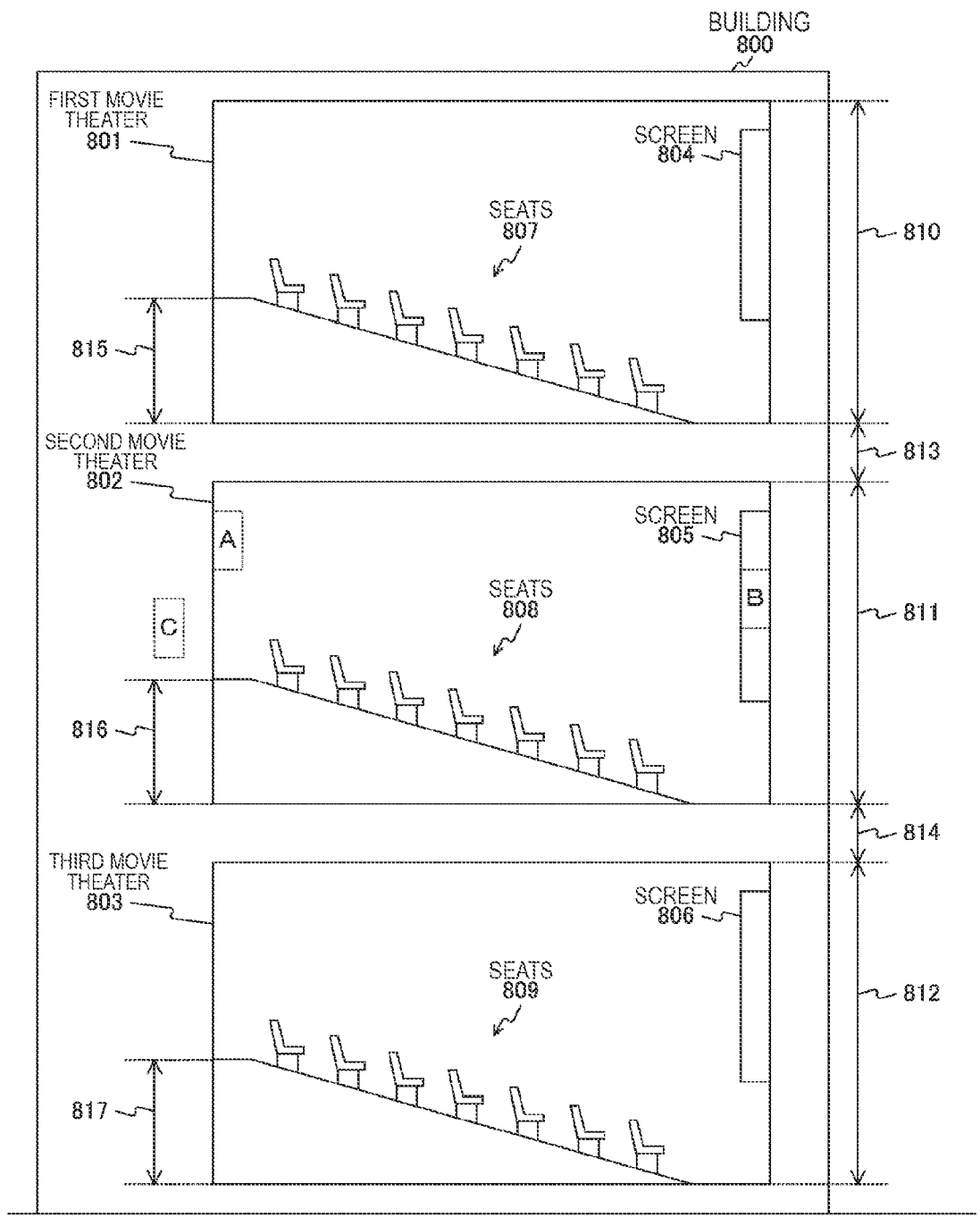
FIG. 37 is a block diagram simply illustrating the configuration of movie theaters (theaters) in which a communication system is installed according to a fifth embodiment of the present technology.

FIG. 37 is a block diagram simply illustrating the configuration of a movie theater (theaters) in which a communication system 100 is installed according to the fifth embodiment of the present technology. FIG. 37 is a sectional view when movie theaters (a first movie theater 801 to a third movie theater 803) are installed in three floors of a building 800. In FIG. 37, only one movie theater is illustrated on each floor to facilitate the description, but a plurality of movie theaters are assumed to be installed on each floor.

Screens 804 to 806 and seats 807 to 809 are installed in the first movie theater 801 to the third movie theater 803, respectively.

Here, differences between the grounds (ceilings) of the upper and lower stories and the walls of the plurality of spaces on the same story (the same floor) will be described.

In general, since the lower part has to support the upper part in the upper and lower floor directions, the thickness and structure of the grounds (ceilings) of the upper and lower floors are thicker and stronger than the right and left walls of the spaces. For example, as indicated by arrows 810 to 812, the distances between the first movie theaters 801 to the third movie theaters 803 are ensured considerably in the vertical direction (upper and lower directions). Further, as indicated by arrows 813 and 814, the grounds (ceilings) of the upper and lower stories are strong and thick.

In general, in movie theaters (theaters), seats are oblique with respect to a screen in many cases so that audience members can easily view a movie from the seats. That is, in general, seats are oblique upward in movie theaters (theaters) in many cases. In this case, the ground on the rear side is raised, and thus the surface of the ground of a movie theater has a multi-layered structure. Therefore, the height (the length of each of the upper and lower stories) of the inside of the movie theater is greater compared to a normal case, and thus the distance of the same story in the vertical direction is longer in many cases. Due the characteristics of a movie theater, it is necessary to ensure a broad ground area, and thus the strength of the upper and lower stories is considered to be stronger compared to a normal case.

For example, as indicated by arrows 815 to 817, the seats 807 to 809 are installed to be raised as the seats are distant from the screens 804 to 806. That is, in the first movie theater 801 to the third movie theater 803, the ground of the rear side is raised, and thus the surface of the ground has a multi-layered structure.

Thus, in the grounds (ceilings) of the upper and lower stories, attenuation of radio waves increases in many cases due to the thicker cement structure or the like.

Next, an installation place of a transmitter (for example, the transmitter 300 shown in FIGS. 1 and 2) in the second movie theater 802 will be described. For example, the transmitter is preferably installed in the inside of the second movie theater 802 such as the rear position (the position of a dotted rectangle A), the front position (the position of a dotted rectangle B), or a side position in the second movie theater 802. However, the transmitter may be installed at other positions inside the second movie theater 802. Further, the transmitter may be installed outside the second movie theater 802. For example, the transmitter can be installed at a position (the position of a dotted rectangle C) near a movie projector inside a projection room located on the rear side of the second movie theater 802. However, when the transmitter is installed outside the second movie theater 802, an antenna of the transmitter is preferably oriented toward the inside of the second movie theater 802. Further, the same also applies to the first movie theater 801 and the third movie theater 803.

Here, in the wall structure of the plurality of spaces assigned in the same floor, the wall is thick for the purpose of soundproofing or the like rather than the requirement of intensity. Therefore, for example, as shown in FIG. 11*b*, there is a high probability that the influence can be avoided by separation of up to five adjacent rooms.

However, when the plurality of spaces assigned in the upper and lower floors are defined as the plurality of spaces in the same story, the definition may be complicated. Further, when the same rules are applied to the vertical direction in addition to the plane, the influence can be avoided. However, there is a concern that kinds of channels may be insufficient in the assignment of the channels.

Accordingly, attenuation near 2.4 GHz will be described. For example, a calculation example for rooms on two upper floors (or two lower floors) of the upper and lower floors will be described.

For example, in regard to the structure and the thickness of the grounds (ceilings) of the spaces of the upper and lower floors, as described above, an intensity equal to or greater than a given value is necessary. Accordingly, for example, the thickness of the cement in the structure of the grounds (ceilings) of the spaces of the upper and lower stories is set to 100 mm, and the height (the height of each floor) of each space of the upper and lower stories is set to 3 m. In this case, an amount of attenuation is calculated for the spaces of two upper stories (or two lower stories). On the assumption that 2 is set for the ground (ceiling) and 2 is also set for the space, the calculation expression becomes $-(39.78+20\times\log(3\times2)+2\times15.0)=-85.3$ dBm. As described above, for example, since detection can be made even in the pause in about $-90$ dBm, there is a probability that the problem of the crosstalk may occur. However, since this environment is not a free space, the coefficient n can be expected to be 2.0 or more. Thus, further attenuation can be considered. For this reason, when the distance is two floors away in the vertical direction, there is a probability that the influence can be avoided even in $-85.3$ dBm.

Depending on the structure of a building, for example, the calculation can be performed considering that one ground (ceiling) corresponds to two or three walls.

Here, a case in which the movie theaters are distant in the upward oblique direction or the downward oblique direction with respect to the vertical direction rather than the immediately upper side or the immediately lower side of the vertical direction will be assumed. Even in this case, it can be expected that the thickness of the cement actually increases or the coefficient n also increases to the extent of the oblique crossing, compared to the case in which the thickness of the cement crosses immediately above (or immediately below), and thus there is a high probability of further attenuation. Further, when the space is a movie theater (theater), the floor is generally longer in the height direction and the thickness of the cement increases due to the stronger ground or the like. Thus, the amount of attenuation is considered to further increase.

As described above, the crosstalk does not occur even in the rooms of two upper floors (or two lower floors) of the upper and lower floors. The definition of the crosstalk and the interference is the same as the definition described above. That is, a state in which an audience member can hear an audio or the like from another space through the completely identical channel is defined as crosstalk. Further, a state in which a frequency band of a predetermined channel is shared with an unnecessary own system or another wireless system and there is some influence is defined as interference.

[Assignment Example of Channels]

FIGS. 38a to 41d are diagrams illustrating assignment examples of channels in the communication system 100 according to the fifth embodiment of the present technology. The assignment determination is performed through an assignment determination process performed by the determination unit 240.

Here, when the plurality of channels are assigned to a plurality of partitioned spaces assigned in a plurality of floors and the channel assignment is inappropriately performed, there is a concern that the interference or the crosstalk may occur due to the influence of the channel from another space. Therefore, when the plurality of channels are assigned to a plurality of partitioned spaces on a plurality of floors (for example, as shown in FIG. 37, the plurality of channels are assigned when the movie theaters are present in the upper and lower stories), it is necessary to assign the channels based on predetermined rules.

Accordingly, principle rules (basic assignment rules) of the channel assignment will be described in (11) to (13) below.

(11) Use of completely identical channels (for example, A1 and A1) is avoided whenever possible. However, when it is necessary to use the completely identical channels, the completely identical channels are assigned as far away as possible.

(12) When a plurality of partitioned spaces are assigned in lines of the upper and lower floors, the same ch (for example, A1 and A1) are assigned so that the same channels are not lined up in the upper and lower floors adjacent in the vertical direction.

(13) Besides (12) described above, the same channels are assigned so that the same channels are not lined up in the upper and lower floors adjacent in the oblique direction of the vertical direction.

Here, in the plurality of partitioned spaces assigned in two lines in the upper and lower floor adjacent in the vertical direction, recommended assignment rules (recommendation assignment rules) are described in (14) to (17) below for the stable wireless system.

(14) When the plurality of partitioned spaces are assigned in lines of the upper and lower floors, different signs of the same number (for example, A1 and B1) are assigned not to be lined up in the upper and lower floors adjacent in the vertical direction.

(15) When the completely identical An and An (for example, A1 and A1) or Bm and Bm (for example, B4 and B4) are assigned to the spaces in the upper and lower floors, An and An or Bm and Bm are assigned to be separated as far as possible. Further, when the completely identical An and An (for example, A1 and A1) or Bm and Bm (for example, B4 and B4) are assigned in two lines (that is, assigned in one line in the upper floor and assigned in one line in the lower floor) in the upper and lower floors, An and An or Bm and Bm are assigned in different lines.

(16) Unused channels are ensured. In this case, the unused channels are ensured to have a paired relation (for example, A6 and B6). A use example of the unused channels ensured to have the paired relation will be described in detail with reference to FIGS. 42a to 42d.

(17) When An and Bm have a relation of (n=m) (for example, A1 and B1), An and Bm are assigned not to be close in the right, left, front, rear, and oblique of the spaces and in the upper and lower floors and An and Bm are assigned in different lines.

Further, the basic assignment rules and the recommendation assignment rules are referred to as assignment rules together.

FIGS. 38a to 38d show an assignment example of wireless channels when the assignment rules (the basic assignment rules and the recommendation assignment rules) of (11) to (17) are not obeyed. Specifically, FIGS. 38a to 38d show the assignment example of the wireless channels, when the plurality of partitioned spaces in the same story are assigned in two lines and the spaces are present in four floors. The number of spaces assigned in two lines in the same floor is six. A rectangle shown in FIGS. 38a to 38d simply indicates one partitioned space on the same floor. The numeral shown in each rectangle indicates a kind of wireless channel assigned in the space. A rectangle indicated by diagonal lines therein means a space in which the assignment rules (11) to (17) are not obeyed.

FIG. 38a shows each space on the first floor, FIG. 38b shows each space on the second floor, FIG. 38c shows each space on the third floor, and FIG. 38d shows each space on the fourth floor.

Among the spaces forming one line of the upper side shown in FIG. 38b, the left corner space (A1) is a space in which the basic assignment rule of (12) is not obeyed with respect to the pace (the space of A1 shown in FIG. 38a) located immediately below on one lower floor.

Among the spaces forming one line of the lower side shown in FIG. 38b, the middle space (A4) is a space in which the basic assignment rule of (13) is not obeyed with respect the space (the space of A4 shown in FIG. 38a) located in the oblique direction one floor lower.

Among the spaces forming one line of the upper side shown in FIG. 38b, the right corner space (B3) is a space in which the recommendation assignment rule of (14) is not obeyed with respect to the space (the space of A3 shown in FIG. 38a) located immediately one floor lower.

Among the spaces forming one line of the upper side shown in FIG. 38c, the middle space (A2) has an immediately lower relation with the space (the space of A2 shown in FIG. 38a) immediately below two floors lower. As described above, however, there is a high probability that the crosstalk does not occur even in the space immediately only two floors below (or only two floors below) in the upper and lower stories. Therefore, in the space (A2) shown in FIG. 38c, there is a high probability that the assignment can be permitted depending on the actual structure or the like of the upper and lower stories.

Among the spaces forming one line of the upper side shown in FIG. 38d, the right corner space (A3) is a space of an assignment example in which the assignment rules (the basic assignment rules and the recommendation assignment rules) are obeyed.

For example, in an actual operation, it is assumed that the interference does not occur in a space having a relation of an oblique assignment with respect to the vertical direction of the upper and lower floors or a space with the different signs of the same number in the vertical direction of the upper and lower floors. The space having the relation of the oblique assignment with respect to the vertical direction of the upper and lower floors is, for example, the space (A4) shown in FIG. 38b. The space with the different signs of the same number in the vertical direction of the upper and lower floors is, for example, the space (B3) shown in FIG. 38b. For example, in the upper and lower floors, the occurrence or non-occurrence of the interference considerably depends on a space (for example, a cineplex) in which the space is present. Further, the position, orientation, configuration, or the like of the transmitter is assumed to have an influence on the occurrence or non-occurrence of the interference.

Therefore, for example, the assignment of the space (A4) shown in FIG. 38b and the space (B3) shown in FIG. 38b can be permitted in some cases depending on the actual structure or the like of the upper and lower stories. That is, although the spaces are spaces in which the basic assignment rule of (13) and the recommendation assignment rule of (14) are not obeyed, the assignment of these spaces can be permitted in some cases depending on the position, orientation, configuration, or the like of the transmitter.

As described above, in the assignment in the upper and lower floors, for example, the assignment of the same ch (for example, A1 and A1 or B1 and B1) to spaces immediately above by one, immediately below by one, and adjacent in the oblique direction with respect to the vertical direction is preferably avoided. Further, for example, when the same ch (for example, A1 and A1 or B1 and B1) are assigned to spaces immediately two above, immediately two below by in the vertical direction and spaces located to face immediately one above and located immediately one below, the assignment of these spaces may be permitted depending on the position and orientation of the transmitter, the structure of a building, or the like. The assignment of the same-numbered ch (for example, A1 and B1 or A2 or B2) is not completely prohibited and may be permitted depending on the position and orientation of the transmitter, the structure of a building, or the like.

Figure 39:
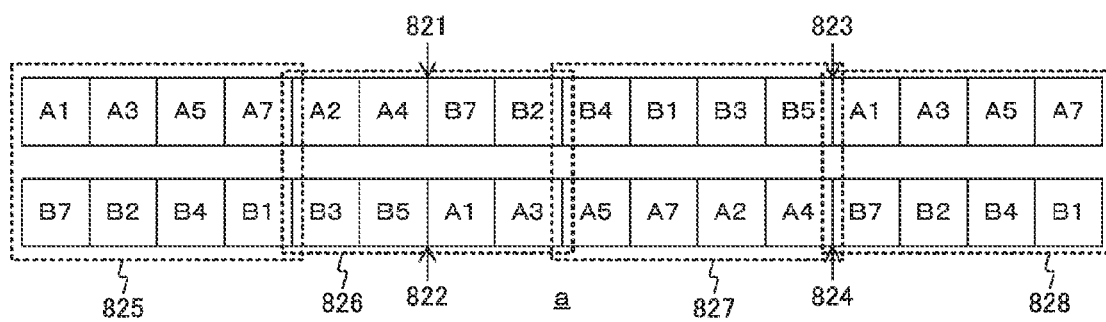
FIG. 39 is a diagram illustrating an assignment example of the channels in the communication system according to the fifth embodiment of the present technology.

FIG. 39 shows an assignment example of wireless channels when 32 partitioned spaces are assigned in two lines on the same floor. The example shown in FIG. 39 is substantially the same as the example shown in FIGS. 10c and 10d. For example, the spaces correspond to 32 movie theaters assigned in two lines along a straight-shaped passage which is formed between the movie theaters in the cineplex. In FIG. 39, A6 and B6 having a paired relation are ensured as unused channels.

As in the example shown in FIGS. 10c and 10d, for example, a group (group A) constituted by An is assigned from the left end of the upper side line to the position indicated by an arrow 821. Likewise, a group (group B) constituted by Bm is assigned from the left end of the lower side line to the position indicated by an arrow 822. However, the channels other than the unused channels (A6 and B6) are assigned. After the groups A and B (after the positions indicated by the arrows 821 and 822), the lines of An and Bm are transposed and assigned. That is, the group A is assigned from the position indicated by the arrow 822 to the position indicated by an arrow 824, and the group B is assigned from the position indicated by the arrow 821 to the position indicated by an arrow 823. Likewise, after the positions indicated by the arrows 823 and 824, the lines of the An and Bm are transposed and assigned.

FIGS. 40a to 40d show assignment examples of wireless channels when 32 partitioned spaces are assigned in two lines in a plurality of floors. That is, FIG. 40a shows an assignment example of the wireless channels when eight spaces are assigned in two lines on first floor. FIG. 40b shows an assignment example of the wireless channels, when eight spaces are assigned in two lines on the second floor. FIG. 40c shows an assignment example of the wireless channels when eight spaces are assigned in two lines in the floor of the third story. FIG. 40d shows an assignment example of the wireless channels, when eight spaces are assigned in two lines in the floor of the fourth story.

Here, FIGS. 40a to 40d show examples in which the assignment of the wireless channels shown in FIG. 39 is used as the assignment example of the wireless channels to the spaces assigned in a plurality of. Specifically, for example, the wireless channels of the spaces shown in FIG. 39 are divided and the assignment of the divide wireless channels is applied to each floor shown in FIGS. 40a to 40d.

For example, the wireless channels of the spaces shown in FIG. 39 are divided for every eight spaces. For example, the wireless channels of the eight spaces surrounded by dotted rectangles 825 to 828 are divided as one group. Then, the assignment of the divided wireless channels is applied to each floor shown in FIGS. 40a to 40d. Specifically, the assignment of the wireless channels of eight spaces surrounded by the dotted rectangle 825 is used on the first floor shown in FIG. 40a. The assignment of the wireless channels of eight spaces surrounded by the dotted rectangle 826 is used on the second floor shown in FIG. 40b. The assignment of the wireless channels of eight spaces surrounded by the dotted rectangle 827 is used on the third floor shown in FIG. 40c. The assignment of the wireless channels of eight spaces surrounded by the dotted rectangle 828 is used on the second floor shown in FIG. 40d. Further, the assignment of the upper and lower floors may be transposed.

When multiple floors are structured in an actual theater, six screens are disposed on one floor in many cases. In this case, the assignment examples shown in FIGS. 40a to 40d can be used.

Here, even when the wireless channels are assigned in the plurality of floors, on the same floor, it is necessary to obey the assignment rules described in the first to fourth embodiments of the present technology. This is because the walls of the same floor are generally walls which do not have the same strong and thick structure as the walls indicated by the arrows 813 and 814 in FIG. 37. That is, for example, it is necessary to assign the same ch (for example, A1 and A1 or B5 and B5) five or more spaces away in the same line. Therefore, as shown in FIGS. 40a to 40d, when the eight spaces are assigned in two lines on the same floor, the same ch may not be assigned in the same floor.

Further, it is necessary to avoid assigning the same-numbered ch (that is, difference of A and B) immediately near and closely oriented (or practically, obliquely opposite and adjacent by two), but the same-number ch can be obliquely assigned to face each other by three. Therefore, on the first floor shown in FIG. 40a, A1 and B1 can be assigned to obliquely face by three.

As described above, even on the different floors, the same ch may not be assigned in the immediately upper direction and the immediately lower direction. Practically, the same ch are preferably not assigned to be separated immediately two floors above, immediately two floors below, in the vicinity immediately one floor above, and in the vicinity immediately one floor below. However, the same ch can be assigned to be separated immediately three floors above, immediately three floors below, in the vicinity immediately two floors above, and in the vicinity immediately below by two stories. For example, since the first floor shown in FIG. 40*a* and the fourth floor shown in FIG. 40*d* are separated immediately three floors above and immediately three floors below, the same assignment can be set. Further, B1 on the first floor shown in FIG. 40*a* and B1 on the third floor shown in FIG. 40*c* are two upper and lower floor and are obliquely deviated by two. Therefore, B1 on the first floor shown in FIG. 40*a* and B1 on the floor of the third story shown in FIG. 40*c* can be assigned.

Thus, by using the wireless channels of the spaces in the same floor shown in FIG. 39, the wireless channels of the spaces in the plurality of floors can be assigned easily in conformity with the assignment rules.

In FIGS. 40*a* to 40*d*, the assignment examples in which the wireless channels are assigned to eight spaces in each of the plurality of floors have been described. However, the assignment examples shown in FIGS. 40*a* to 40*d* can be applied to a case in which the number of spaces assigned on each floor is not eight. For example, when the number of spaces assigned on each floor is less than eight, the assignment of the wireless channels can be determined by deleting the wireless channel of an unnecessary space among the assigned spaces shown in FIGS. 40*a* to 40*d*. Accordingly, the assignment examples of wireless channels when five spaces are assigned on each of three floors are shown in FIGS. 41*a* to 41*d*.

FIGS. 41*a* to 41*d* show the assignment examples of wireless channels when five spaces are assigned on each of three floors. In FIGS. 41*a* to 41*d*, the spaces corresponding to the spaces shown in FIGS. 40*a* to 40*d* are indicated by rectangles and, for example, unnecessary spaces are indicated by dotted rectangles.

That is, FIG. 41*a* shows an assignment example of the wireless channels when five spaces are assigned in two lines on the first floor. FIG. 41*b* shows an assignment example of the wireless channels when five spaces are assigned in two lines on the second floor. FIG. 41*c* shows an assignment example of the wireless channels when five spaces are assigned in two lines on the third floor. In the examples shown in FIGS. 41*a* to 41*d*, since five spaces are assigned on each of the three floors, the fourth floor is not present. Accordingly, in FIG. 41*d*, only the dotted rectangles are shown.

Thus, when the number of spaces assigned on each floor is less than eight, the assignment of the wireless channels can be determined easily by applying the assignment examples of the wireless channels of the case in which the number of spaces assigned on each floor is eight.

FIGS. 42*a* to 42*d* are diagrams illustrating the flow of a method of avoiding crosstalk or interference by the determination unit 240 according to the fifth embodiment of the present technology. FIGS. 42*a* to 42*d* show avoidance examples in which when unassigned channels are present, channels which are not influenced among the unassigned channels are transposed. In the left sides of FIGS. 42*a* to 42*c*, assignment states before avoidance are shown. In the right sides of FIGS. 42*a* to 42*c*, assignment states after the avoidance are shown. The assignments of the channels shown in the left sides of FIGS. 42*a* to 42*c* are the same as those of FIGS. 41*a* to 41*c*. The avoidance method shown in FIGS. 13*a* to 13*c* is applied as the avoidance method shown in FIGS. 42*a* to 42*d*.

In FIGS. 42*a* to 42*c*, a case in which a given problem (for example, audio interruption) occurs in the spaces in which the channels B3 and B7 shown in FIG. 42*b* are assigned is assumed. Further, a case in which there are unused channels (A6 and B6) is assumed. Even when another problem (for example, caption fragmentation) occurs, an avoidance process is the same. Therefore, the description thereof will not be repeated here.

For example, when a given problem (for example, audio interruption) occurs in the space in which the channel B7 shown in FIG. 42*b* is assigned, an unused channel (A6 or B6) can be transposed. For example, when a given problem (for example, audio interruption) occurs in the space in which the channel B3 shown in FIG. 42*b* is assigned, an unused channel (A6 or B6) can be transposed likewise.

For example, when a given problem (for example, audio interruption) occurs in the spaces in which the channels B3 and B7 shown in FIG. 42*b* are assigned, an unused channel (A6 or B6) can be transposed. In this case, it is necessary to pay attention to conformity of the recommendation assignment rule (6) in the same story.

Thus, by performing the transposition, the basic assignment rules can be automatically maintained. That is, by performing the transposition in this way, the configuration can be realized without mutual interruption in the channels assigned in advance.

When the transposition ends, it is confirmed that the audio interruption or caption fragmentation does not occur in the transposed channels at the time of turning on the power of the entire cineplex. In this case, on a receiver side, the settings are reflected only for the receivers in which the channels B3 and B7 to be set are changed. Then, in all of the movie theaters, the avoidance process ends when it is confirmed that no problem occurs.

Thus, in the fifth embodiment of the present technology, even when the insufficient ch ranges not only in the same story, but also up to the upper and lower stories, the channels can be appropriately assigned. Accordingly, the channels to be used in the spaces assigned in each of a plurality of floors can be appropriately set.

6. Modification Example

In the first to fifth embodiments of the present technology, the examples in which the transmitter includes two RF modules and the receiver includes one RF module have been described. However, the embodiments of the present technology can be also applied to a transmitter including one RF module and a receiver including a plurality of RF modules.

Next, in this modification example, a transmitter including one RF module and a receiver including a plurality of RF modules will be described.

[Example of Internal Configuration of Transmitter]

Figure 43:
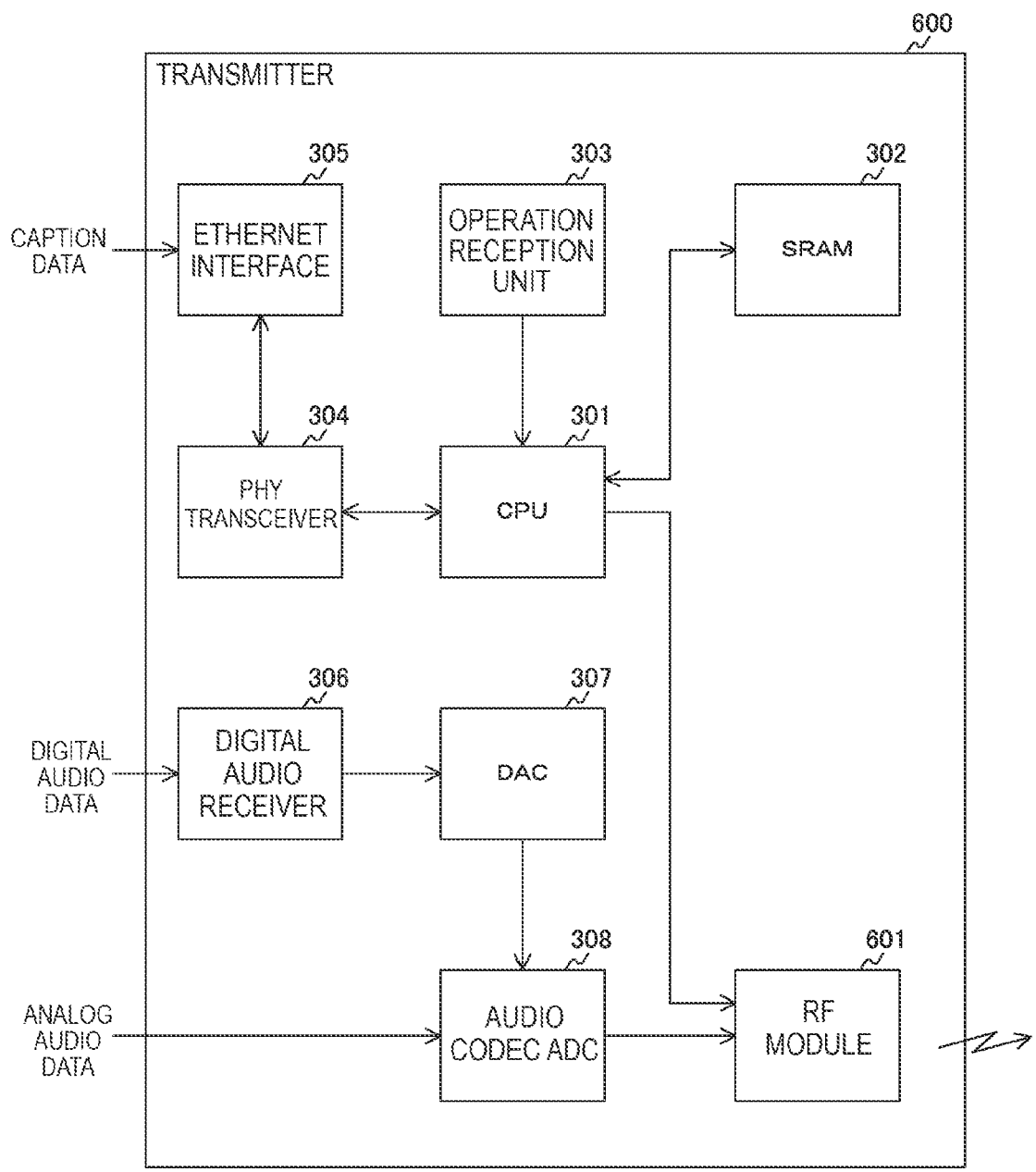
FIG. 43 is a block diagram illustrating an example of an internal configuration of a transmitter according to a modification example of the present technology.

FIG. 43 is a block diagram illustrating an example of an internal configuration of a transmitter 600 according to a modification example of the embodiment of the present technology. Since the transmitter 600 is a transmitter configured by modifying a part of the transmitter 300 shown in FIG. 5, the same reference numerals are given to constituent elements common to those of the transmitter 300.

Specifically, the transmitter 600 is an example of a transmitter that includes one RF module (RF module 601) wirelessly transmitting two independent pieces of information (for example, audio data and caption data).

The RF module 601 sequentially switches wireless transmission of two independent pieces of information (for example, audio data and caption data) under the control of the CPU 301.

[Example of Functional Configuration of Transmitter]

Figure 44:
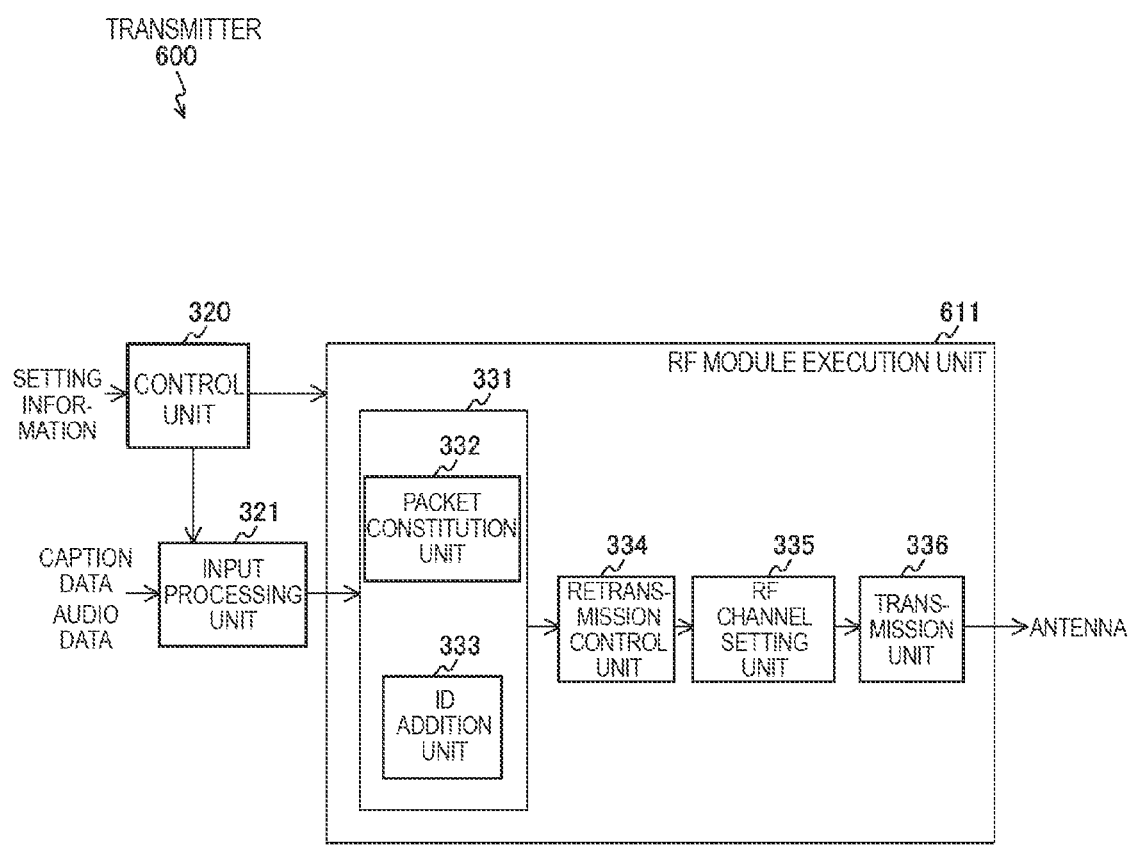
FIG. 44 is a block diagram illustrating an example of a functional configuration of the transmitter according to a modification example of the embodiment of the present technology.

FIG. 44 is a block diagram illustrating an example of a functional configuration of the transmitter 600 according to a modification example of the embodiment of the present technology. Since the transmitter 600 is a transmitter configured by modifying a part of the transmitter 300 shown in FIG. 6, the same reference numerals are given to constituent elements common to those of the transmitter 300.

An RF module execution unit 611 sequentially switches wireless transmission of two independent pieces of information (for example, audio data and caption data) under the control of the control unit 320.

Thus, the transmitter 600 can sequentially transmit the audio data and predetermined data along one communication path.

[Example of Internal Configuration of Receiver]

Figure 45:
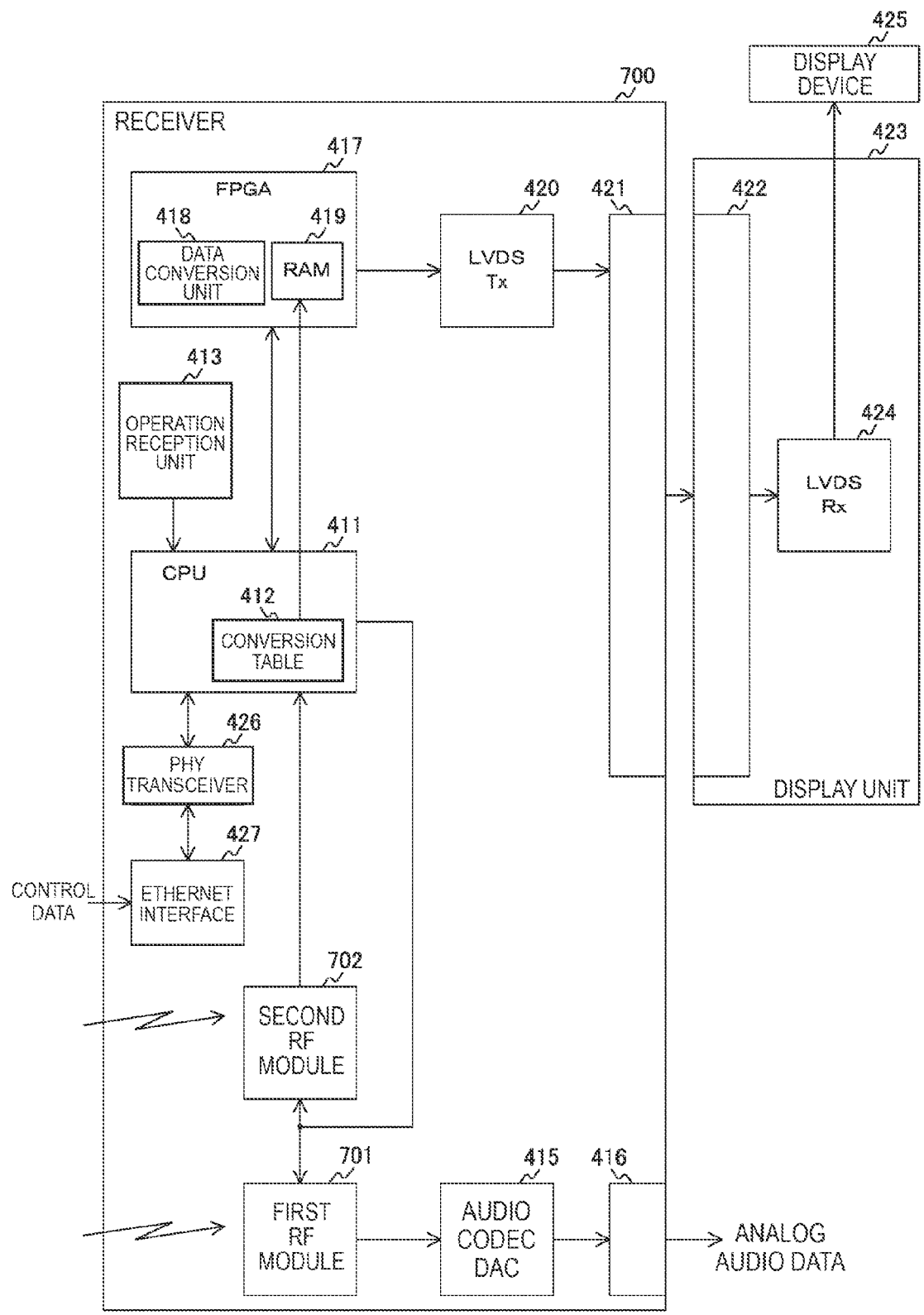
FIG. 45 is a block diagram illustrating an example of an internal configuration of a receiver according to a modification example of the embodiment of the present technology.

FIG. 45 is a block diagram illustrating an example of an internal configuration of a receiver 700 according to a modification example of the embodiment of the present technology. Since the receiver 700 is a transmitter configured by modifying a part of the receiver 400 shown in FIG. 7, the same reference numerals are given to constituent elements common to those of the receiver 400.

Specifically, the receiver 700 is an example of a receiver that includes two RF modules (a first RF module 701 and a second RF module 702) that receive two independent pieces of information (for example, audio data and caption data). The first RF module 701 and the second RF module 702 correspond to the RF module 414 shown in FIG. 7.

[Example of Functional Configuration of Receiver]

FIG. 46 is a block diagram illustrating an example of a functional configuration of the receiver 700 according to a modification example of the embodiment of the present technology. Since the receiver 700 is a receiver configured by modifying a part of the receiver 400 shown in FIG. 8, the same reference numerals are given to constituent elements common to those of the receiver 400.

Specifically, the receiver 700 is an example of a receiver that includes two RF module execution units (a first RF module execution unit 711 and a second RF module execution unit 712) that receive two independent pieces of information (for example, audio data and caption data). The first RF module execution unit 711 and the second RF module execution unit 712 correspond to the RF module execution unit 440 shown in FIG. 8.

Here, the decoding unit 446 switches data to be decoded among the data output from the first RF module execution unit 711 and the second RF module execution unit 712 in response to an instruction from the control unit 430.

Thus, in the communication system 100 according to the embodiments of the present technology, each receiver and each transmitter described above can be used. That is, the receiver of the communication system 100 can be used as a receiver that can be used in each of a plurality of spaces in which a partition is present between the adjacent spaces. Further, the transmitter of the communication system 100 can be used as a transmitter that is installed in each space and performs short-range wireless communication (for example, IEEE 802.15.4 scheme) simultaneously with a plurality of receivers present in the same space. In the communication system 100, a case in which the number of channels relevant to the short-range wireless communication necessary based on the number of the plurality of spaces is greater than the settable number of channels relevant to the short-range wireless communication is assumed. Even in this case, in the embodiments of the present technology, the channels with the same frequency are set in each transmitter installed in at least two spaces among the plurality of spaces based on the predetermined rules.

The channels with the same frequency can be set to channels (for example, A1 and A1 or B1 or B1) which have the same communication rate and can be simultaneously identified by the receivers. Further, the channels with the same frequency can be set to plural kinds of channels (for example, A1 and B1 or A2 and B2) which have different communication rates and the plural kinds of channels are not mutually detectable by the receivers.

In the communication system 100, two kinds of channels (for example, A1 and B1 or A2 and B2) relevant to the short-range wireless communication may be assigned in each space. In this case, each receiver may be configured to receive data (for example, audio data and caption data) relevant to the two kinds of channels in each space. Further, each receiver may be configured to receive data relevant to one of the channels by switching two kinds of channels.

Thus, the embodiments of the present technology can be configured as follows (Configuration Examples 1 to 5)

Configuration Example 1

A communication system includes: a receiver that is used in each of a plurality of spaces among which a partition is present between the adjacent spaces; and a transmitter that is installed in each of the spaces and simultaneously performs short-range wireless communication with the plurality of receivers installed in the same space. When the number of channels relevant to the short-range wireless communication and necessary based on the number of the plurality of spaces is greater than the settable number of channels relevant to the short-range wireless communication, channels with the same frequency are set in the transmitters installed in at least two spaces among the plurality of spaces based on a predetermined rule.

Configuration Example 2

In the communication system described in Configuration Example 1, the channels with the same frequency have the same communication rate and are identifiable simultaneously in the receivers.

Configuration Example 3

In the communication system described in Configuration Example 1, the channels with the same frequency include plural kinds of channels which have different communication rates and the plural kinds of channels are not mutually detectable in the receivers.

Configuration Example 4

In the communication system described in Configuration Example 1, two kinds of channels relevant to the short-range wireless communication are assigned to the spaces and the receivers receive data relevant to the two kinds of channels in each space.

Configuration Example 5

In the communication system described in Configuration Example 4, the receivers receive data relevant to one of the channels by switching the two kinds of channels.

Here, in an integrated movie theater in which a plurality of screens are collected, a frequency 2.4 GHz band (2.4 GHz to 2.5 GHz) becomes easily common in a worldwide operation for use when information such as audio is transmitted using an individual wireless scheme in each screen. An industrial, scientific and medical (ISM) band is a frequency band which can be used without wireless license. Further, the ISM band is decided by the International Telecommunication Union (ITU). In Japan, wireless license is not necessary when an output is equal to or less than 10 mW.

Examples of a wireless scheme using the 2.4 GHz band include WiFi (IEEE 802.11b/g/n), Bluetooth (registered trademark) (IEEE 802.15.1), and ZigBee (IEEE 802.15.4).

In IEEE 802.11, 11b has 1ch to 14ch (only in Japan and up to 13 ch in other countries) and 11g (11n) has 1 to 13 ch. However, a ch interval is merely 5 MHz, but a channel width of the same one communication is 22 MHz. Therefore, only channels (for example, three channels of 1 ch, 6 ch, and 11 ch) separated by five have to be selected to prevent interference of a radio wave from occurring. Further, about sixteen units can generally be used for stable communication per channel.

IEEE 802.15.1 is a communication scheme in which 79 RF channels (intervals of 1 MHz) hop at random and is regarded to be strong against interference. Further, communication of visibility of about 100 m can be performed by a standard in which a transmission power increases. On the other hand, in this scheme, the maximum number of slaves simultaneously connectable to one master apparatus is seven.

In IEEE 802.15.4, 26 channels can all be simultaneously used for communication, since a 2 MHz band is used for 26 RF channels (intervals of 5 MHz). In this scheme, a maximum of 65535 terminal units can be connected and one coordinator can transmit data to a plurality of end devices. This scheme is targeted for short-range communication as the characteristic of power saving. However, since a transmission power level is permitted up to 10 to 100 mW (depending on a standard of each country), a communication system of 100 m can be structured.

Thus, in an IEEE 802.11 scheme, about sixteen units can be used for each channel stability transmission in that only three channels can be selected without interference. Further, in an IEEE 802.15.1 scheme, only seven units can be connected in one system.

Here, for example, use of a case in which a plurality of audience members are reception targets as in a movie theater will be considered. For example, when twenty audience members are assumed to simultaneously use receivers in each screen, an operation is performed using the number of units greater than the stable number of receivers in the IEEE 802.11 scheme. Therefore, there is a concern that the operation becomes unstable. Further, in IEEE 802.15.1, at least three systems are necessary in a screen, since one system lacks the necessary number of connection units. Therefore, there is a problem of instability and complexity.

In IEEE 802.15.4 scheme (for example, ZigBee), the number of connectable nodes per network is up to 65535 ($2^{16}-2$). Further, a broadcast method can be also operated.

However, when an operation is performed using the number of channels greater than the number of channels (sixteen channels of ch11 to ch26) of IEEE 802.15.4 scheme (@2400 MHz band), the same ch may be necessarily used. Further, there is a concern that instability is caused since mutual interference occurs in a simultaneous operation nearby. Further, the CSMA-CA scheme is an effective avoidance scheme, but there is a concern that a detection timing becomes unstable due to a deviation of a rule of a transmission clock between interfering transmitters.

Here, a case in which an operation is performed using the IEEE 802.15.4 scheme will be assumed. For example, a case in which broadcast transmission is used for simultaneous use of a plurality of users in ten screens of a movie theater will be assumed.

When two channels of the IEEE 802.15.4 scheme are used to independently transmit caption data and audio data wirelessly in each screen, sixteen channels can each be assigned up to eight screens. However, in the two remaining screens, it is necessary to select a common channel. Here, when the selected channel is present nearby, satisfactory wireless communication may not be performed in some cases.

For example, when IDs are the same in the same channel, data may be received from a commonly selected channel which is distant (crosstalk).

Here, when PAN-ID defined in the IEEE 802.15.4 scheme is put aside and discrimination is possible even in the same channel, an interval at which a packet is not received on a time axis occurs in a process of receiving the packet and performing PAN-ID discrimination. That is, when an originally necessary packet is asynchronously obtained at an interval in which a received packet is determined to be an unnecessary packet and is not processed, the packet is lost. In this case, in transmission (for example, transmission occupying several tenths of a communication capacity) such as wireless transmission of audio data, irrelevant data is regarded as an "interfering wave" even when the avoidance process or the retransmission process described above is performed. Therefore, there is a concern that communication may not be satisfactorily performed. In this case, for example, the audio data appears as audio interruption (interference).

In the asynchronous packet relation described as PAN-ID discrimination, the IEEE 802.15.4 scheme defines a CSMA-CA scheme. Therefore, there is a method of enabling communication without mutual overlap. However, a transceiver does not operate when an interference radio wave from another transmitter is equal to or less than a discrimination threshold value. However, since both transmitters are seen at the position of a receiver, the receiver enters an asynchronous state. Further, even when the CSMA-CA scheme operates, an asynchronous state caused due to a minute deviation of an operational frequency which at least two receivers each have may occur in a waveform overlapping manner, for example, a cycle of 30 minutes. This may cause a problem in audio data.

Here, for example, since a wireless scheme of the communication system 100 uses a 2.4 GHz band, another wireless system using the 2.4 GHz band of WiFi or the like may transmit an interfering wave, and thus there is a concern that the communication system may be influenced. Further, since the communication systems 100 operate in a cinema complex, the plurality of communication systems 100 are simultaneously activated. Therefore, it is necessary to cause the communication systems not to influence each other.

Thus, in the embodiments of the present technology, when a plurality of systems are simultaneously constructed in an area, appropriate communication can be achieved by realizing the assignment at the time of exceeding the set channels, while preventing the own crosstalk.

In the embodiments of the present technology, even when interference occurs due to another WiFi or the like, the interference can be effectively avoided, and thus appropriate communication can be achieved.

In the embodiments of the present technology, even when different pieces of information such as audio data and caption data are independently transmitted wirelessly, stable communication can be achieved.

Thus, in the embodiments of the present technology, for example, wireless channels can be appropriately set when the communication system 100 is introduced in, for example, a cinema complex. Further, even when audio interruption or caption interruption occurs after the setting of the wireless channels, the audio interruption or the caption interruption can be appropriately avoided. That is, when short-range wireless communication is performed simultaneously in a plurality of spaces, the channels to be used can be appropriately set.

Here, the present technology can be applied to other examples in addition to the above-described embodiments and the modification example. Hereinafter, application examples of the present technology will be described.

[System Transmitting Data Other than Caption Data and Audio Data]

In the embodiments of the present technology, the examples of a theater system transmitting caption data and audio data have been described, but the present technology can be applied to systems other than the theater system. For example, even when data other than caption data and audio data is transmitted, the embodiments of the present technology can be applied. For example, when busy data (for example, video data) as a transmission capacity is transmitted instead of audio data and data (for example, discrete transmission information data) having a relative allowance as a transmission capacity is transmitted instead of caption data, the embodiments of the present technology can be applied.

[Selection of Communication Rate]

In the embodiments of the present technology, the examples in which two communication rates (for example, 250 kbps and 500 kbps) are selected in two schemes have been described. However, 250 kbps may be intentionally excluded among the options. At this time, since 250 kbps is covered in another IEEE 802.15.4 standard, crosstalk may occur in some cases. However, when two rates are selected from 500 kbps, 667 kbps, 1 Mbps, and 2 Mbps, another IEEE 802.15.4 may become an interfering radio wave. Therefore, the influence of another IEEE 802.15.4 can be further reduced. Therefore, very appropriate communication can be achieved.

[Relation Between Surrounded Space and Transmission Output]

A transmission output may be changed depending on a surrounded space. For example, since the space is a large space such as a theater, high power is used. When the space is a small space such as a karaoke room, the power is reduced. Therefore, the simultaneous operation can be realized in each case. At this time, while ensuring a sufficient reception radio wave intensity in a necessary area, an interfering radio wave can be reduced from the viewpoint of others. That is, while communication is realized in the space, crosstalk and interference can be configured not to occur in other spaces.

[Application Other than Compliance of IEEE 802.15.4]

The embodiments of the present technology can be applied to a system in which there are wireless channels having a relation in which the wireless channels are not mutually discriminated even when the wireless channels are the same frequency channel.

[Position of Transmitter]

The example in which the position of the transmitter is behind the screen is shown in FIGS. 1 and 2. However, the transmitter may be installed at the position at which the screen is installed or may be installed to the left or right of the movie theater or on the ceiling.

The above-described embodiments are merely examples in which the present technology is realized and the matters of the embodiments and the specific matters of the claims have a correspondent relation. Likewise, the specific matters of the claims and the matters of the embodiments of the present technology having the same names as those of the claims have a correspondent relation. However, the present technology is not limited to the embodiments, but may be modified in various ways within the scope of the present technology without departing from the gist of the present technology.

The processing orders described in the above-described embodiments may be comprehended as a method including a series of processes or may be comprehended as a problem causing a computer to execute the series of orders or a recording medium that stores the program. Examples of the recording medium include a Compact Disc (CD), a Mini-Disc (MD), a Digital Versatile Disc (DVD), a memory card, and a Blu-ray Disc (registered trademark).

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing device including:

a determination unit that, when in each of a plurality of spaces short-range wireless communication is simultaneously performed in each space using a plurality of wireless communication devices, determines a channel to be used in each space for each space based on a predetermined rule; and a control unit that performs control of setting the channel determined in accordance with the space in which the wireless communication device is used in the wireless communication device.

(2) The information processing device according to (1), wherein, when a number of the plurality of spaces is greater than a number of channels of the wireless communication devices, the determination unit determines the channel to be used in the plurality of spaces for each space and sets a plurality of communication rates as communication rates used for the short-range wireless communication for each channel.

(3) The information processing device according to (1) or (2), wherein, when first channels which are identical are used in the plurality of spaces, the determination unit determines the channel in a manner that first and second spaces in which the first channels are used are a predetermined distance apart from each other.

(4) The information processing device according to any one of (1) to (3), further including:

a detection unit that detects first spaces which are spaces in which there is a wireless communication device receiving a predetermined interfering wave from among the wireless communication devices that perform the short-range wireless communication using the determined channel, wherein the determination unit sets channels determined for the first spaces as first channels, determines channels which rarely receive an influence of the predetermined interfering wave in the first spaces as candidate channels based on the predetermined rule, and determines the candidate channels as channels to be newly used for all spaces in which the first channels are determined.

(5) The information processing device according to (4), wherein the candidate channel is a channel which is determined as a channel to be used in one of the plurality of spaces or is a channel which is unused in any of the plurality of spaces.

(6) The information processing device according to (4), wherein the candidate channel is a channel which does not receive an influence of an interfering wave caused due to a specific wireless LAN.

(7) The information processing device according to any one of (1) to (6),
wherein the plurality of wireless communication devices include a transmitter and a receiver, and
wherein the transmitter transmits at least one of audio data or predetermined data to the receiver.

(8) The information processing device according to (7), wherein the transmitter sequentially transmits the audio data and the predetermined data along one communication path.

(9) The information processing device according to (7),
wherein the transmitter transmits the audio data and the predetermined data at different frequencies along a plurality of communication paths, and
wherein the determination unit determines the plurality of channels for one space as the channels to be used in the respective spaces.

(10) The information processing device according to (7),
wherein the transmitter transmits the audio data and the predetermined data at different communication rates along a plurality of communication paths, and
wherein the determination unit determines the channel to be used in each of the spaces and a plurality of communication rates for one space as the communication rates.

(11) The information processing device according to (9) or (10), wherein the transmitter does not perform a retransmission process on the audio data and performs the retransmission process only on the predetermined data.

(12) The information processing device according to any one of (1) to (11),
wherein identification information is granted to the predetermined data, and
wherein the receiver identifies the predetermined data using the identification information granted to the predetermined data.

(13) The information processing device according to any one of (1) to (12), wherein a frequency of the short-range wireless communication is a 2.4 GHz band.

(14) The information processing device according to any one of (1) to (13), wherein a wireless scheme of the short-range wireless communication complies with IEEE 802.15.4.

(15) The information processing device according to any one of (1) to (14), wherein a partition is present between adjacent spaces among the plurality of spaces.

(16) A communication system including:
a plurality of wireless communication devices that perform short-range wireless communication; and
an information processing device that includes
a determination unit that, when, in each of a plurality of spaces in which a partition is present between adjacent spaces, the short-range wireless communication is simultaneously performed in each space using the plurality of wireless communication devices, determines a channel to be used in each space based on a predetermined rule, and
a control unit that performs control of setting the channel determined in accordance with the space in which the wireless communication device is used in the wireless communication device.

(17) A communication system including:
a receiver that is used in each of a plurality of spaces among which a partition is present between adjacent spaces; and
a transmitter that is installed in each of the spaces and simultaneously performs short-range wireless communication with the plurality of receivers installed in an identical space;
wherein, when a number of channels relevant to the short-range wireless communication and necessary based on a number of the plurality of spaces is greater than a settable number of channels relevant to the short-range wireless communication, channels with an identical frequency are set in the transmitters installed in at least two spaces among the plurality of spaces based on a predetermined rule.

(18) The communication system according to (17), wherein the channels with the identical frequency have an identical communication rate and are identifiable simultaneously in the receivers.

(19) The communication system according to (17), wherein the channels with the identical frequency include a plurality of kinds of channels which have different communication rates and the plurality of kinds of channels are not mutually detectable in the receivers.

(20) A channel setting method including:
determining, when, in each of a plurality of spaces in which a partition is present between adjacent spaces, short-range wireless communication is simultaneously performed in each space using a plurality of wireless communication devices, a channel to be used in each space for each space based on a predetermined rule; and
setting the channel determined in accordance with the space in which the wireless communication device is used in the wireless communication device.

The present disclosure contains subject matters related to those disclosed in Japanese Priority Patent Application JP 2012-044923 filed in the Japan Patent Office on Mar. 1, 2012 and Japanese Priority Patent Application JP 2012-154413 filed in the Japan Patent Office on Jul. 10, 2012, the entire contents of which are hereby incorporated by reference.

What is claimed is:
1. An information processing device comprising:
a determination unit that, when in each of a plurality of spaces short-range wireless communication is simultaneously performed in each space using a plurality of wireless communication devices, determines a channel and a communication rate to be used in each space based on a predetermined rule that limits crosstalk and/or interference between wireless communication devices in the plurality of spaces;
a detection unit that acquires a detection result which indicates crosstalk and/or interference in one or more of the plurality of spaces; and
a control unit that performs control of setting the channel determined in accordance with the space in which the wireless communication device is used, wherein the control unit determines whether a crosstalk and/or interference problem occurs based on the detection result and performs an avoidance process when the crosstalk and/or interference problem occurs and the control unit determines that channel assignment in the plurality of spaces is in accordance with the predetermined rule.

2. The information processing device according to claim 1, wherein, when a number of the plurality of spaces is greater than a number of channels of the wireless communication devices, the determination unit determines the channel to be used in the plurality of spaces for each space and sets a plurality of communication rates as communication rates used for the short-range wireless communication for each channel.

3. The information processing device according to claim 1, wherein, when first channels which are identical are used in the plurality of spaces, the determination unit determines the channel in a manner that first and second spaces in which the first channels are used are a predetermined distance apart from each other.

4. The information processing device according to claim 1,
wherein the detection unit detects first spaces which are spaces in which there is a wireless communication device receiving a predetermined interfering wave from among the wireless communication devices that perform the short-range wireless communication using the determined channel, and
wherein the determination unit sets channels determined for the first spaces as first channels, determines channels which rarely receive an influence of the predetermined interfering wave in the first spaces as candidate channels based on the predetermined rule, and determines the candidate channels as channels to be newly used for all spaces in which the first channels are determined.

5. The information processing device according to claim 4, wherein the candidate channel is a channel which is determined as a channel to be used in one of the plurality of spaces or is a channel which is unused in any of the plurality of spaces.

6. The information processing device according to claim 4, wherein the candidate channel is a channel which does not receive an influence of an interfering wave caused due to a specific wireless LAN.

7. The information processing device according to claim 1,
wherein the plurality of wireless communication devices include a transmitter and a receiver, and
wherein the transmitter transmits audio data and predetermined data to the receiver.

8. The information processing device according to claim 7, wherein the transmitter sequentially transmits the audio data and the predetermined data along one communication path.

9. The information processing device according to claim 7,
wherein the transmitter transmits the audio data and the predetermined data at different frequencies along a plurality of communication paths, and
wherein the determination unit determines the plurality of channels for one space as the channels to be used in the respective spaces.

10. The information processing device according to claim 7,
wherein the transmitter transmits the audio data and the predetermined data at different communication rates along a plurality of communication paths, and wherein the determination unit determines the channel to be used in each of the spaces and a plurality of communication rates for one space as the communication rates.

11. The information processing device according to claim 9, wherein the transmitter does not perform a retransmission process on the audio data and performs the retransmission process only on the predetermined data.

12. The information processing device according to claim 1,
wherein identification information is granted to the predetermined data, and
wherein the receiver identifies the predetermined data using the identification information granted to the predetermined data.

13. The information processing device according to claim 1, wherein a frequency of the short-range wireless communication is a 2.4 GHz band.

14. The information processing device according to claim 1, wherein a wireless scheme of the short-range wireless communication complies with IEEE 802.15.4.

15. The information processing device according to claim 1, wherein a partition is present between adjacent spaces among the plurality of spaces.

16. The information processing device according to claim 1, wherein the avoidance process includes transposing channels in at least some of the plurality of spaces.

17. A communication system comprising:
a plurality of wireless communication devices that perform short-range wireless communication; and
an information processing device that includes
a determination unit that, when, in each of a plurality of spaces in which a partition is present between adjacent spaces, the short-range wireless communication is simultaneously performed in each space using the plurality of wireless communication devices, determines a channel and a communication rate to be used in each space based on a predetermined rule that limits crosstalk and/or interference between wireless communication devices in the plurality of spaces,
a detection unit that acquires a detection result which indicates crosstalk and/or interference in one or more of the plurality of spaces; and
a control unit that performs control of setting the channel determined in accordance with the space in which the wireless communication device is used,
wherein the control unit determines whether a crosstalk and/or interference problem occurs based on the detection result and performs an avoidance process when the crosstalk and/or interference problem occurs and the control unit determines that channel assignment in the plurality of spaces is in accordance with the predetermined rule.

18. The communication system according to claim 17, wherein the avoidance process includes transposing channels in at least some of the plurality of spaces.

19. A channel setting method comprising:
determining, when, in each of a plurality of spaces in which a partition is present between adjacent spaces, short-range wireless communication is simultaneously performed in each space using a plurality of wireless communication devices, a channel and a communication rate to be used in each space based on a predetermined rule that limits crosstalk and/or interference between wireless communication devices in the plurality of spaces;

acquiring a detection result which indicates crosstalk and/or interference in one or more of the plurality of spaces;

setting the channel determined in accordance with the space in which the wireless communication device is used;

determining whether a crosstalk and/or interference problem occurs based on the detection result; and performing an avoidance process when the crosstalk and/or interference problem occurs and channel assignment in the plurality of spaces is determined to be in accordance with the predetermined rule.

20. The channel setting method according to claim 19, wherein the avoidance process includes transposing channels in at least some of the plurality of spaces.

* * * * *